(12) United States Patent
Adjakple et al.

(10) Patent No.: US 11,943,652 B2
(45) Date of Patent: Mar. 26, 2024

(54) PRIORITIZATION PROCEDURES FOR NR V2X SIDELINK SHARED CHANNEL DATA TRANSMISSION

(71) Applicant: InterDigital Patent Holdings, Inc., Wilmington, DE (US)

(72) Inventors: Pascal M. Adjakple, Great Neck, NY (US); Qing Li, Princeton Junction, NJ (US); Joseph M. Murray, Schwenksville, PA (US); Lakshmi R. Iyer, King of Prussia, PA (US); Mohamed Awadin, Plymouth Meeting, PA (US); Yifan Li, Conshohocken, PA (US); Allan Y. Tsai, Boonton, NJ (US); Guodong Zhang, Woodbury, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/256,352

(22) PCT Filed: Jun. 28, 2019

(86) PCT No.: PCT/US2019/039744
§ 371 (c)(1),
(2) Date: Dec. 28, 2020

(87) PCT Pub. No.: WO2020/006366
PCT Pub. Date: Jan. 2, 2020

(65) Prior Publication Data
US 2021/0153065 A1  May 20, 2021

Related U.S. Application Data

(60) Provisional application No. 62/841,536, filed on May 1, 2019, provisional application No. 62/691,302, filed on Jun. 28, 2018.

(51) Int. Cl.
*H04W 28/02* (2009.01)
*H04L 27/26* (2006.01)
(Continued)

(52) U.S. Cl.
CPC ... *H04W 28/0263* (2013.01); *H04L 27/26025* (2021.01); *H04W 4/40* (2018.02);
(Continued)

(58) Field of Classification Search
CPC .............. H04W 28/0263; H04W 4/40; H04W 28/0268; H04W 28/0278; H04W 80/02;
(Continued)

(56) References Cited

U.S. PATENT DOCUMENTS 8,130,718 B2  3/2012  Shaheen
9,294,926 B2  3/2016  Pragada et al.
(Continued)

FOREIGN PATENT DOCUMENTS

CN  101841880 A  9/2010
CN  102123512 A  7/2011
(Continued)

OTHER PUBLICATIONS

3rd Generation Partnership Project; (3GPP) TR 23.852 V12.0.0, 3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12), Sep. 2013, 157 pages.
(Continued)

*Primary Examiner* — Afshawn M Towfighi
(74) *Attorney, Agent, or Firm* — Flaster Greenberg PC

(57) ABSTRACT

Methods and apparatuses are described herein for prioritizing sidelink communication transmissions. In accordance with one example embodiment, an apparatus may transmit,
(Continued)

to a network node, assistance parameters associated with sidelink communication comprising quality of service (QoS) parameters. The apparatus may receive, from the network node, configuration parameters associated with sidelink communication that comprise a logical channel configuration, a mapping of a QoS parameter to a sidelink radio bearer, and a mapping of the sidelink radio bearer to a sidelink logical channel. The apparatus may receive a sidelink resource grant and may select, based on the logical channel configuration, one or more sidelink logical channels to be served by the sidelink resource grant. The apparatus may transmit a generated a medium access control (MAC) protocol data unit (PDU), comprising data associated with the selected one or more sidelink logical channels, using the received sidelink resource grant.

20 Claims, 28 Drawing Sheets

(51) Int. Cl.
*H04W 4/40* (2018.01)
*H04W 80/02* (2009.01)
*H04W 92/18* (2009.01)

(52) U.S. Cl.
CPC ... *H04W 28/0268* (2013.01); *H04W 28/0278* (2013.01); *H04W 80/02* (2013.01); *H04W 92/18* (2013.01)

(58) Field of Classification Search
CPC . H04W 92/18; H04W 72/1263; H04W 76/14; H04W 72/1236; H04W 72/1242; H04W 72/14; H04L 27/26025
See application file for complete search history.

(56) References Cited

U.S. PATENT DOCUMENTS

| | | | |
|---|---|---|---|
| 2001/0043579 | A1 | 11/2001 | Tourunen et al. |
| 2005/0254469 | A1 | 11/2005 | Verma et al. |
| 2006/0126565 | A1* | 6/2006 | Shaheen ............... H04W 36/14 370/331 |
| 2006/0211447 | A1 | 9/2006 | Purkayastha et al. |
| 2008/0259870 | A1 | 10/2008 | Olvera-Hernandez et al. |
| 2009/0233600 | A1 | 9/2009 | Johansson et al. |
| 2011/0086635 | A1 | 4/2011 | Grob-Lipski |
| 2011/0170495 | A1 | 7/2011 | Earnshaw et al. |
| 2012/0057547 | A1 | 3/2012 | Loehr et al. |
| 2012/0077510 | A1 | 3/2012 | Chen et al. |
| 2013/0039185 | A1 | 2/2013 | Teyeb et al. |
| 2013/0045740 | A1 | 2/2013 | Gayde et al. |
| 2013/0072131 | A1 | 3/2013 | Guey et al. |
| 2013/0072201 | A1 | 3/2013 | Nakamura et al. |
| 2013/0084867 | A1 | 4/2013 | Sirotkin |
| 2013/0088983 | A1 | 4/2013 | Pragada et al. |
| 2013/0115955 | A1 | 5/2013 | Deng et al. |
| 2013/0272132 | A1 | 10/2013 | Heo et al. |
| 2013/0281082 | A1 | 10/2013 | Drazynski et al. |
| 2013/0286851 | A1 | 10/2013 | Moser et al. |
| 2013/0301423 | A1 | 11/2013 | Sirotkin et al. |
| 2014/0073329 | A1 | 3/2014 | Kang et al. |
| 2014/0155065 | A1 | 6/2014 | Centonza et al. |
| 2014/0286159 | A1 | 9/2014 | Etemad et al. |
| 2014/0376515 | A1 | 12/2014 | Lei et al. |
| 2015/0078360 | A1 | 3/2015 | Wang et al. |
| 2015/0092688 | A1 | 4/2015 | Jeong et al. |
| 2015/0131552 | A1 | 5/2015 | He |
| 2015/0271809 | A1 | 9/2015 | Kato et al. |
| 2015/0304921 | A1 | 10/2015 | Hong et al. |
| 2015/0319666 | A1 | 11/2015 | Kang et al. |
| 2015/0358876 | A1 | 12/2015 | Liang et al. |
| 2016/0088624 | A1 | 3/2016 | Lee et al. |
| 2016/0119861 | A1 | 4/2016 | Jin |
| 2016/0150452 | A1 | 5/2016 | Kitaji |
| 2017/0048745 | A1 | 2/2017 | Yi et al. |
| 2017/0048903 | A1 | 2/2017 | Yi et al. |
| 2017/0257876 | A1 | 9/2017 | Loehr et al. |
| 2017/0353819 | A1 | 12/2017 | Yin et al. |
| 2017/0353972 | A1 | 12/2017 | Babaei et al. |
| 2018/0139724 | A1 | 5/2018 | Loehr et al. |
| 2018/0279147 | A1 | 9/2018 | Kazmi et al. |
| 2019/0053251 | A1 | 2/2019 | Loehr et al. |
| 2019/0268918 | A1* | 8/2019 | Baghel .............. H04W 72/0406 |
| 2019/0342895 | A1* | 11/2019 | Loehr ............... H04W 28/0278 |
| 2021/0022091 | A1* | 1/2021 | Li ....................... H04W 52/383 |
| 2021/0235464 | A1 | 7/2021 | Loehr et al. |
| 2021/0410084 | A1* | 12/2021 | Li ....................... H04W 52/265 |

FOREIGN PATENT DOCUMENTS

| | | |
|---|---|---|
| CN | 102415187 A | 4/2012 |
| CN | 102547858 A | 7/2012 |
| CN | 103380635 A | 10/2013 |
| CN | 104704871 A | 6/2015 |
| CN | 107079530 A | 8/2017 |
| EP | 2026618 A1 | 2/2009 |
| EP | 2416605 A1 | 2/2012 |
| EP | 3206452 A1 | 8/2017 |
| JP | 2010-521878 A | 6/2010 |
| KR | 10-2013-0008157 A | 1/2013 |
| WO | 2010/105677 A1 | 9/2010 |
| WO | 2011/057056 A1 | 5/2011 |
| WO | 2012/044372 A1 | 4/2012 |
| WO | 2013/009147 A2 | 1/2013 |
| WO | 2013/120274 A1 | 8/2013 |
| WO | 2014/109558 A1 | 7/2014 |
| WO | 2015/057343 A1 | 4/2015 |
| WO | 2015/109204 A1 | 7/2015 |
| WO | 2016/025163 A1 | 2/2016 |
| WO | 2016/210048 A1 | 12/2016 |
| WO | 2017/137231 A1 | 8/2017 |
| WO | 2018/075828 A1 | 4/2018 |
| WO | 2018/085568 A1 | 5/2018 |
| WO | 2020/006366 A1 | 1/2020 |

OTHER PUBLICATIONS

3rd Generation Partnership Project; (3GPP) TS 22.234 V11.0.0, 3rd Generation Partnership Project; Technical Specification Group Services and System Aspects; Requirements on 3GPP system to Wireless Local Area Network (WLAN) interworking (Release 11), Sep. 2012, 15 pages.

3rd Generation Partnership Project; (3GPP) TS 23.234 V11.0.0, 3rd Generation Partnership Project; Technical Specification Group Services and System Aspects; 3GPP system to Wireless Local Area Network (WLAN) interworking; System description (Release 11), Sep. 2012, 84 pages.

3rd Generation Partnership Project; (3GPP) TS 23.402 V12.5.0, 3rd Generation Partnership Project; Technical Specification Group Services and System Aspects; Architecture Enhancements for Non-3GPP Accesses (Release 12), Jun. 2014, 291 pages.

3rd Generation Partnership Project; (3GPP) TS 29.273 V12.4.0, 3rd Generation Partnership Project; Technical Specification Group Core Network and Terminals; Evolved Packet System (EPS); 3GPP EPS AAA interfaces (Release 12), Jun. 2014, 153 pages.

3rd Generation Partnership Project; (3GPP) TS 29.274 V12.5.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), Jun. 2014, 310 pages.

3rd Generation Partnership Project; (3GPP) TS 29.281 V11.6.0 3rd Generation Partnership Project; Technical Specification Group Core Network and Terminals; General Packet Radio System (GPRS) Tunnelling Protocol User Plane (GTPv1-U) (Release 11), Mar. 2013, 27 pages.

(56) References Cited

OTHER PUBLICATIONS

3rd Generation Partnership Project; (3GPP) TS 33.402 V12.3.0, 3rd Generation Partnership Project; Technical Specification Group Services and System Aspects; 3GPP System Architecture Evolution (SAE); Security aspects of non-3GPP accesses (Release 12), Mar. 2014, 55 pages.
3rd Generation Partnership Project; (3GPP) TS 36.300 V11.10.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Jun. 2014, 210 pages.
3rd Generation Partnership Project; (3GPP) TS 36.322 V12.0.0, 3rd Generation Partnership Project; Technical Specification Group Radio Access Network; Evolved Universal Terrestrial Radio Access (E-UTRA); Radio Link Control (RLC) protocol specification (Release 12), Jun. 2014, 40 pages.
3rd Generation Partnership Project; (3GPP) TS 36.323 V12.0.0, 3rd Generation Partnership Project; Technical Specification Group Radio Access Network; Evolved Universal Terrestrial Radio Access (E-UTRA); Packet Data Convergence Protocol (PDCP) specification (Release 12), Jun. 2014, 28 pages.
3rd Generation Partnership Project; (3GPP) TS 36.401 V11.2.0, 3rd Generation Partnership Project; Technical Specification Group Radio Access Network; Evolved Universal Terrestrial Radio Access Network (E-UTRAN) Architecture description (Release 11) Sep. 2013, 20 pages.
3rd Generation Partnership Project; (3GPP) TS36.401 V10.1.0, 3rd Generation Partnership Project; Technical Specification Group Radio Access Network; Evolved Universal Terrestrial Radio Access Network (E-UTRAN) Architecture description (Release 10), Mar. 2011, 20 pages.
3rd Generation Partnership Project; (3GPP), TS 36.331 V12.2.0, 3rd Generation Partnership Project; Technical Specification Group Radio Access Network; Evolved Universal Terrestrial Radio Access (E-UTRA); Radio Resource Control (RRC); Protocol specification (Release 12) Jun. 2014, 365 pages.
3rd Generation Partnership Project; (3GPP), TS 36.420 V12.0.0, 3rd Generation Partnership Project; Technical Specification Group Radio Access Network; Evolved Universal Terrestrial Radio Access Network (E-UTRAN); X2 general aspects and principles (Release 12) Jun. 2014, 12 pages.
3rd Generation Partnership Project; (3GPP), TS 36.422 V11.0.0, 3rd Generation Partnership Project; Technical Specification Group Radio Access Network; Evolved Universal Terrestrial Radio Access Network (E-UTRAN); X2 signalling transport (Release 11), Sep. 2012, 8 pages.
3rd Generation Partnership Project; (3GPP), TS 36.423 V12.2.0, 3rd Generation Partnership Project; Technical Specification Group Radio Access Network; Evolved Universal Terrestrial Radio Access Network (E-UTRAN); X2 application protocol (X2AP) (Release 12) Jun. 2014, 151 pages.
3rd Generation Partnership Project; (3GPP), TS 36.424 V12.0.0, 3rd Generation Partnership Project; Technical Specification Group Radio Access Network; Evolved Universal Terrestrial Radio Access Network (E-UTRAN); X2 data transport (Release 12) Mar. 2014, 8 pages.
Braden, R., "Requirements for Internet Hosts-Communication Layers", Internet Engineering Task Force (IETF), RFC 1122, Oct. 1989, 116 pages.
Deering, S. and Hinden, R., "Internet Protocol, Version 6 (Ipv6) Specification drafl-ietf- 6man-rfc2460bis-08", Network Working Group, Internet draft, Nov. 15, 2016, 39 pages.
ETSI, "LTE; Evolved Universal Terrestrial Radio Access Network (E-UTRAN); X2 Application Protocol (X2AP)", 3G PP TS 36.423 version 11.7 .0 Release 11, Technical Specification, Jan. 2014, 145 pages.
IEEE "Part 11: Wireless LAN Medium Access Control (MAC) and Physical Layer (PHY) Specifications", 802.11, IEEE Standard for Information technology—Telecommunications and information exchange between systems Local and metropolitan area networks—Specific requirements, IEEE Computer Society, IEEE Std 802.11(Trademark)-2012.
International Application No. PCT/US2015/016867: International Search Report and Written Opinion dated Jun. 1, 2015, 14 pages.
Internet Engineering Task Force (IETF), "Transmission Control Protocol Darpa Internet Program Protocol Specification", RFC 793, Sep. 1981, 91 pages.
Internet Engineering Task Force (IETF), Internet Protocol Darpa Internet Program Protocol Specification, RFC 791, Sep. 1981, 51 pages.
Nichols et al., "Definition of the Differentiated Services Field (DS Field) in the IPv4 and IPv6 Headers", Network Working Group, RFC 2474, Dec. 1998, 20 pages.
Postel, J., "User Datagram Protocol", RFC 768, Aug. 28, 1980, 3 pages.
Stewart, R., "Stream Control Transmission Protocol", Network Working Group, RFC 4960, Sep. 2007, 152 pages.
3GPP TR 22.886, Technical Specification Group Services and System Aspects; Study on enhancement of 3GPP Support for 5G V2X Services; (Release 15), V15.1.0, Mar. 2017, pp. 1-58.
3GPP TS 24.386: User Equipment (UE) to V2X control function; protocol aspects; Stage 3 (Release 14), V14.3.0, Jan. 2018, pp. 1-37.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 3GPP TS 36.300 V15.1.0, Mar. 2018, pp. 1-341.
3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.1.0, Mar. 2018, pp. 1-786.
3rd Generation Partnership Project; Technical Specification Group Radio Access Network; NR; Medium Access Control (MAC) protocol specification (Release 15), 3GPP TS 38.321 V15.0.0, Dec. 2017, pp. 1-55.
3rd Generation Partnership Project; Technical Specification Group Services and System Aspects; Enhancement of 3GPP support for V2X scenarios; Stage 1 (Release 15), 3GPP TS 22.186 V15.2.0, Sep. 2017, pp. 1-16.
R2-1809292, Introduction of V2X duplication to TS 36.323, CATT, 3GPP TSG-RAN WG2 Meeting #102, Busan, Korea, May 21-25, 2018, pp. 1-6.
3rd Generation Partnership Project; Technical Specification Group Core Network and Terminals; V2X services Management Object (MO) (Release 15), 3GPP TS 24.385 V15.1.0, Sep. 2018, pp. 1-85.
3rd Generation Partnership Project; Technical Specification Group Core Network and Terminals; V2X services Management Object (MO), (Release 15), 3GPP TS 24.385 V15.0.0, Jun. 2018, pp. 1-81.
3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.1.0, Mar. 2018, pp. 1-109.
3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.5.0, Mar. 2019, pp. 1-149.
3rd Generation Partnership Project; Technical Specification Group Radio Access Network; NR; Radio Resource Control (RRC) protocol specification (Release 15), 3GPP TS 38.331 V15.2.0, Jun. 2018, pp. 1-304.
3rd Generation Partnership Project; Technical Specification Group Radio Access Network; NR; Radio Resource Control (RRC) protocol specification (Release 15), 3GPP TS 38.331 V15.5.1, Apr. 2019, pp. 1-149.
3rd Generation Partnership Project; Technical Specification Group Services and System Aspects; Architecture enhancements for 5G System (5GS) to support Vehicle-to-Everything (V2X) services (Release 16), 3GPP TS 23.287 V0.3.0, Apr. 2019, pp. 1-40.
3rd Generation Partnership Project; Technical Specification Group Services and System Aspects; Architecture enhancements for 5G System (5GS) to support Vehicle-to-Everything (V2X) services (Release 16), 3GPP TS 23.287 V1.0.0, May 2019, pp. 1-47.

(56) References Cited

OTHER PUBLICATIONS

Huawei et al., "Correction to MCS selection for V2X sidelink communication", R2-1804299, 3GPP TSG-RAN WG2 Meeting #101bis, Apr. 2018, p. 6.

3rd Generation Partnership Project (3GPP); Technical Specification Group Radio Access Network; Evolved Universal Terrestrial Radio Access (E-UTRA); Physical layer procedures (Release 14), 3GPP TS 36.213 V14.4.0, Sep. 2017, 461 pages.

3rd Generation Partnership Project (3GPP); Technical Specification Group Services and System Aspects; Proximity-based services (ProSe); Stage 2 (Release 15), 3GPP Ts 23.303 V15.1.0, Jun. 2018, 130 pages.

3rd Generation Partnership Project; Technical Specification Group Services and System Aspects; Study on architecture enhancements for EPS and 5G System to support advanced V2X services, (Release 16); 3GPP TR 23.786 V0.8.0, Aug. 2018; 78 pages.

Catt, " Sidelink SR/BSR in Uu Interface", 3GPP TSG-RAN WG2 Meeting #105 R2-1900219, Athens, Greece, Feb. 25-Mar. 1, 2019, 5 pages.

Ericsson / "gNB-Scheduled Resource Allocation For Sidelink", 3GPP TSG-RAN WG2 #106 TDoc, R2-1907354, Reno, USA, May 13-17, 2019, 4 pages.

Huawei, HiSilicon, "Discussion on SL BSR procedure for NR SL Mode-1", 3GPP TSG-RAN WG2 Meeting #106, R2-1907449, Reno, USA, May 13-17, 2019, 8 pages.

MediaTek Inc., "Prioritization of UL and SL transmission", 3GPP TSG-RAN WG2 Meeting #105bis, R2-1903722, Xi'an, China, Apr. 8-12, 2019, 3 pages.

OPPO (rapporteur), "Summary of [Offline#704] UL/SL prioritization", 3GPP TSG-RAN WG2 Meeting #106 R2-1908291 Reno, US, May 13-17, 2019, 8 pages.

OPPO, " Left issues on MAC for NR-V2X", 3GPP TSG-RAN WG2 Meeting #106, R2-1905568, Reno, US, May 13-May 17, 2019, 6 pages.

* cited by examiner

PRIORITIZATION PROCEDURES FOR NR V2X SIDELINK SHARED CHANNEL DATA TRANSMISSION

CROSS-REFERENCE TO RELATED APPLICATIONS

This application is the National Stage of International Patent Application No. PCT/US2019/039744, filed Jun. 28, 2019, which claims the benefit of U.S. Provisional Patent Application No. 62/691,302, filed Jun. 28, 2018, and U.S. Provisional Patent Application No. 62/841,536, filed May 1, 2019, which are hereby incorporated by reference in their entirety.

BACKGROUND

As Vehicle-to-X Communication (V2X) applications advance, use cases demanding greater amounts of resources are being supported. For example, the transmission of short messages may be complemented with the transmission of larger messages comprising, for example, raw sensor data, vehicles' intention data, coordination and confirmation of future maneuvers, and the like. The expected data rate, reliability, latency, communication range, and speed requirements for these applications may be more demanding than legacy systems. For example, advanced V2X application throughput is expected to be a hundred times higher than that of the LTE V2X basic safety application throughput. However, legacy LTE V2X logical channel prioritization (LCP) procedures for sidelink data transmissions, such as those used for V2X, have several limitations that present challenges in meeting the requirements for advanced V2X applications.

Accordingly, there is a need for LCP procedures for advanced V2X applications for use in new radio (NR) systems and a need for rules prioritizing sidelink and uplink (UL) transmissions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for prioritizing sidelink communication transmissions. In accordance with one example embodiment, an apparatus may receive a configuration associated with vehicle-to-x communication (V2X) configuration parameters. The apparatus may receive, from a network, a sidelink grant. The apparatus may select a plurality of logical channels to be served by the sidelink grant. The apparatus may select a proximity-based service (ProSe) destination associated with a logical channel having a highest priority of the selected plurality of logical channels. The apparatus may transmit, to the ProSe destination, via the logical channel having a highest priority of the selected plurality of logical channels. The wireless communication device may determine transmission parameters associated with a radio resource grant.

In accordance with one example embodiment, an apparatus may transmit, to a network node connected to the apparatus via the network, one or more assistance parameters associated with sidelink communication, wherein the one or more assistance parameters comprise one or more quality of service (QoS) parameters. The apparatus may receive, from the network node, one or more configuration parameters associated with sidelink communication, wherein the one or more configuration parameters comprise a logical channel configuration, a mapping of a QoS parameter to a sidelink radio bearer, and a mapping of the sidelink radio bearer to a sidelink logical channel of a plurality of sidelink logical channels of the apparatus. The apparatus may receive a sidelink resource grant. The apparatus may select, based on the logical channel configuration, one or more sidelink logical channels of the plurality of the sidelink logical channels to be served by the sidelink grant. The apparatus may generate a medium access control (MAC) protocol data unit (PDU) comprising data associated with the selected one or more sidelink logical channels. The apparatus may transmit the generated MAC PDU using the received sidelink resource grant.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Figure 1:
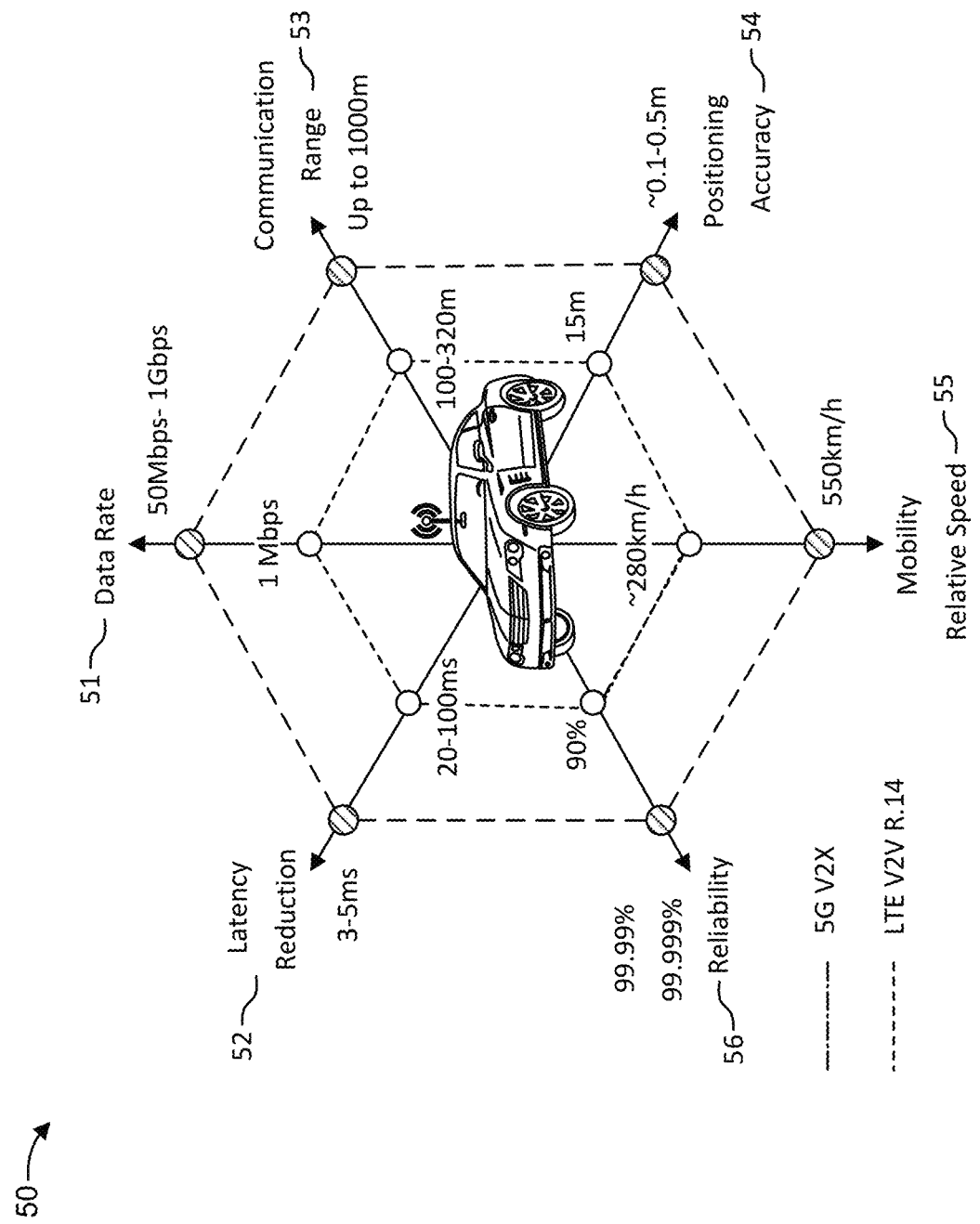
FIG. 1 is a diagram of an overview of 5G eV2X requirements versus LTE V2V R14 requirements.

Methods and apparatuses are described herein for prioritizing V2X sidelink communication transmissions over uplink (UL) transmissions. An enhanced V2X Management Object (MO) is described herein, which may be may be used for provisioning V2X configuration parameters into a user equipment (UE). Methods are described herein for (1) performing sidelink logical channel prioritization (LCP), (2) performing UL data LCP that address the impacts of SL related transmissions, and (3) determining the prioritization of a V2X sidelink communication transmission versus an UL transmission for scenarios where the V2X traffic priority with respect to the UL traffic varies dynamically. In the embodiments described herein, the terms V2X service, V2X message or V2X application data packet may be used interchangeably.

The techniques described herein address the issue of sidelink LCP in view of New Radio (NR) V2X (Vehicle-to-X Communication) requirements, which are more diverse and more stringent than that of LTE V2X. These techniques address the issue of inter-UE prioritization between sidelink transmission versus uplink transmission over the Uu interface, taking into account the fact that such prioritization in legacy systems is based on absolute sidelink LCH priority configured into the UE, as opposed to relative priority between SL transmission and UL transmission.

The following abbreviations and definitions may be used herein:

3 GPP 3$^{rd}$ Generation Partnership Project
AS Access Stratum
BSD Bucket Size Duration
BSR Buffer Status Report
BWP Bandwidth Part
CE Control Element
C-RNTI Cell Radio Network Temporary Identifier
DPR Data Volume and Power Headroom Report
eNB Evolved Node B
eV2X Enhanced Vehicle-to-X Communication
eMBB enhanced Mobile Broadband
E-UTRAN Evolved UMTS Terrestrial Radio Access Network
GA Geographical Area
gNB NR NodeB
HARQ Hybrid Automatic Repeat Request
HSS Home Subscriber Server
ITS Intelligent Transport System
ITS-AID ITS Application Identifier
LCG Logical Channel Group
LCH Logical Channel
LCID Logical Channel Identity
LCP Logical Channel Prioritization
LTE Long Term Evolution
MAC Medium Access Control
MME Mobility Management Entity
mMTC massive Machine Type Communication
MO Management Object
NR New Radio
PBR Prioritized Bit Rate
PDB Packet Delay Budget
PDCP Packet Data Convergence Protocol
PDN Packet Data Network
PDU Protocol Data Unit
P-GW PDN Gateway
PHR Power Headroom Report
PLMN Public Land Mobile Network
PPPP ProSe Per Packet Priority
PPPR ProSe Per Packet Reliability
ProSe Proximity-Based Services
PSID Provider Service Identifier
PUCCH Physical Uplink Control Channel
SC sidelink Control
SCS SubCarrier Spacing
SCI sidelink Control Information
S-GW Serving Gateway
SL sidelink
SPS Semi-Persistent Scheduling
SR Scheduling Request
RAN Radio Access Network
RAT Radio Access Technology
RLC Radio Link Control
RNTI Radio Network Temporary Identifier
RRC Radio Resource Control
SL-SCH sidelink Shared Channel
TTI Transmission Time Interval
UE User Equipment
UL Uplink
UL-CCCH Uplink Common Control Channel
UMTS Universal Mobile Telecommunications System
URLLC Ultra-Reliable and Low Latency Communications
USIM Universal Subscriber Identify Module
V2I Vehicle-to-Infrastructure Communication
V2N Vehicle-to-Network Communication V2P Vehicle-to-Pedestrian Communication V2V Vehicle-to-Vehicle Communication V2X Vehicle-to-X Communication NR V2X use cases and requirements are addressed by the techniques described herein. SA1 has identified numerous use cases for advanced V2X services with the consideration of desirable new applications in the automotive industry. These use cases for advanced V2X services may be categorized into four use case groups such as vehicles platooning, extended sensors, advanced driving and remote driving as follows:

Vehicle Platooning enables vehicles to dynamically form a platoon travelling together. The vehicles in the platoon obtain information from a leading vehicle to manage this platoon. This information may allow the vehicles to drive closer than normal in a coordinated manner, going to the same direction and travelling together.

Extended Sensors enable the exchange of raw or processed data gathered through local sensors or live video images among vehicles, road site units, devices of pedestrian and V2X application servers. The vehicles may increase the perception of their environment beyond what their own sensors may detect to enable a more broad and holistic view of the local situation. High data rate is one of the characteristics of the extended sensors use case group.

Advanced Driving enables semi-automated or full-automated driving. Each vehicle and/or RSU may share its own perception data obtained from its local sensors with vehicles in proximity and that allows vehicles to synchronize and coordinate their trajectories or maneuvers. Each vehicle may share its driving intention with vehicles in proximity as well.

Remote Driving enables a remote driver or a V2X application to operate a remote vehicle for those passengers who cannot drive by themselves or remote vehicles located in dangerous environments. When variation is limited and routes are predictable, such as in the case of public transportation, driving based on cloud computing may be used. High reliability and low latency are the main requirements of the remote driving use case group.

FIG. 1 depicts an overview 50 of 5G eV2X requirements versus LTE V2V R14 requirements. The 5G eV2X target data rate 51 is approximately one hundred times higher than the LTE V2V Rel-14 data rate, e.g. from a range of 1-10 Mbps to 1 Gbps or above. Similarly, the 5G eV2X target end-to-end latency 52 is five to twenty times lower than that of LTE Rel-14 V2V, e.g. a latency reduction from a range of 20-100 ms to a range of 3-5 ms. The 5G eV2X target communication range 53 is two to three time larger than that of LTE Rel-14 V2X, e.g. an increase in communication range from a range of 100-320 m to 1000 m or above. The 5G eV2X positioning target accuracy 54 is ten times higher than that of LTE Rel-14 V2X, e.g. an accuracy increase from a range of 5-15 m to a range of 0.1-0.5 m. Similarly, the 5G eV2X target mobility relative speed 55 is two times higher than that of LTE Rel-14 V2V, e.g. an increase in target relative speed from 280 km/h to 550 km/h. Similarly, the 5G eV2X target reliability 56 is 1000 times higher than that of LTE V2V, e.g. an increase in reliability requirement from 90% to 99.99% or more.

Figure 2:
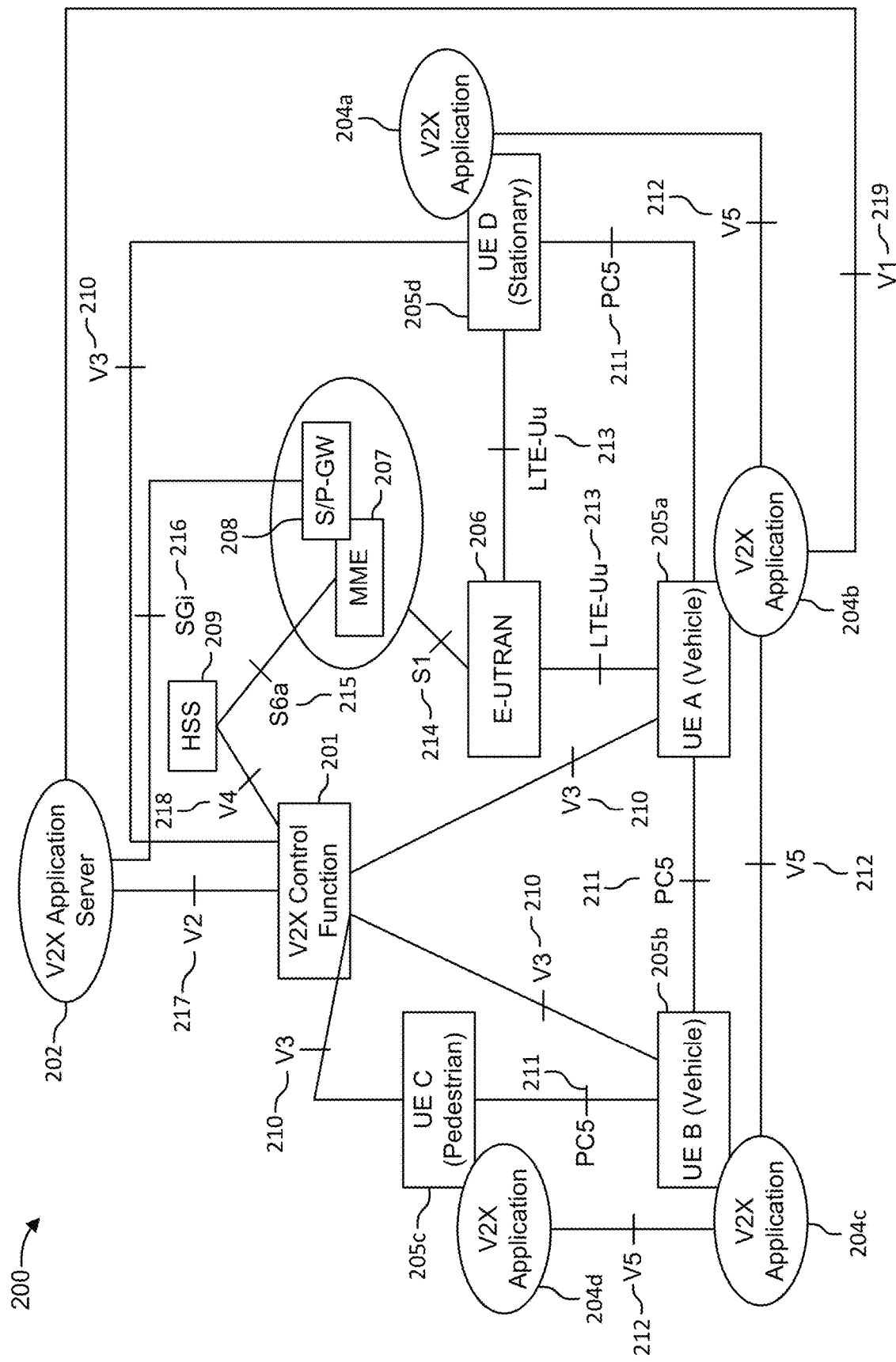
FIG. 2 depicts a high level diagram of the non-roaming architecture for PC5 and LTE-Uu based V2X communication.

FIG. 2 depicts a non-roaming architecture 200 for PC5 and LTE-Uu based V2X communication. The V2X Control Function 201 is the logical function that may be used for network related actions required for V2X. The V2X Control Function 201 may communicate with a V2X Application Server 202 via the V2 reference point 217. The V2X Control Function 201 may be used to provision a UE (e.g., UE 205a, UE 205b, UE 205c, or UE 205d) with necessary parameters (e.g., destination Layer-2 IDs, radio resource parameters, V2X Application Server 202 address information, mapping between service types and V2X frequencies) in order to use V2X communication. These parameters may be pre-configured in the UE, or, if in coverage, may be provisioned by signaling over the V3 reference point 210 from the V2X Control Function 201 in the Home Public Land Mobile Network (HPLMN). The UE may exchange V2X control information with the V2X Control Function 201 over the V3 reference point 210. A V2X application (e.g., V2X application 204a, V2X application 204b, V2X application 204c, or V2X application) may be associated with each UE (e.g., UE 205a, UE 205b, UE 205c, or UE 205d, respectively). V2X applications may communicate via the V5 reference point 212. A V2X Application may communication with the V2X Application Server 202 via the V1 reference point 219.

The UEs (e.g., UE 205a, UE 205b, UE 205c, or UE 205d) may communicate with the Evolved-UMTS Terrestrial Radio Access Network (E-UTRAN) 206 via the LTE-Uu interface 213. The E-UTRAN 206 may access the Mobility Management Entity (MME) 207 via the S1 interface 214. The V2X Control Function 201 may access the Home Subscriber Server (HSS) 209 via the V4 reference point 218. The MME 207 may access the HSS 209 via the S6a reference point 215. The V2X Application Server 202 may access the PDN Gateway or Serving Gateway (SIP-GW) 208 via the SGi reference point 216.

When PC5 211 is used for the transmission of V2X messages, the following principles may be followed for both network scheduled operation mode (e.g. mode 3) and UE autonomous resources selection mode (e.g. mode 4):

ProSe Per-Packet Priority (PPPP) may apply to the V2X communication over PC5 211;

The application layer may set the PPPP for each V2X message when passing it to lower layer for transmission;

The mapping of application layer V2X message priority to PPPP may be configured on the UE;

The setting of the PPPP value may reflect the latency required in both the UE and the Evolved Node B (eNB), e.g. the low Packet Delay Budget (PDB) may be mapped to the high priority PPPP value;

The mapping between V2X service types and V2X frequencies;

The mapping of Destination Layer-2 ID(s) and the V2X services, e.g., PSID or ITS-AIDs of the V2X application (e.g., V2X application 204a, V2X application 204b, V2X application 204c, or V2X application 204d); and The mapping of the PPPP to packet delay budget.

When the network scheduled operation mode is used, the following principles may apply:

A UE may provide priority information reflecting the PPPP to the eNB for resources request;

When the eNB receives a request for a PC5 resource from the UE, the eNB may deduce the packet delay budget from the priority information reflecting PPPP from the UE;

The eNB may use the priority information reflecting the PPPP for priority handling and UE-PC5-AMBR for capping the UE PC5 transmission in the resources management;

The UE may provide the Destination Layer-2 ID(s) of the V2X services to the eNB for resources requested; and When the eNB receives a request for PC5 resource from a UE, the eNB may determine the V2X frequency(ies) in which the V2X service is to be scheduled.

When the autonomous resources selection mode is used, the following additional principles apply:

The UE may derive the packet delay budget of the V2X message from the PPPP based on the provisioned mapping information; and The UE may derive the frequency in which a V2X service is to be transmitted, from the mapping between V2X service types and V2X frequencies.

Figure 3:
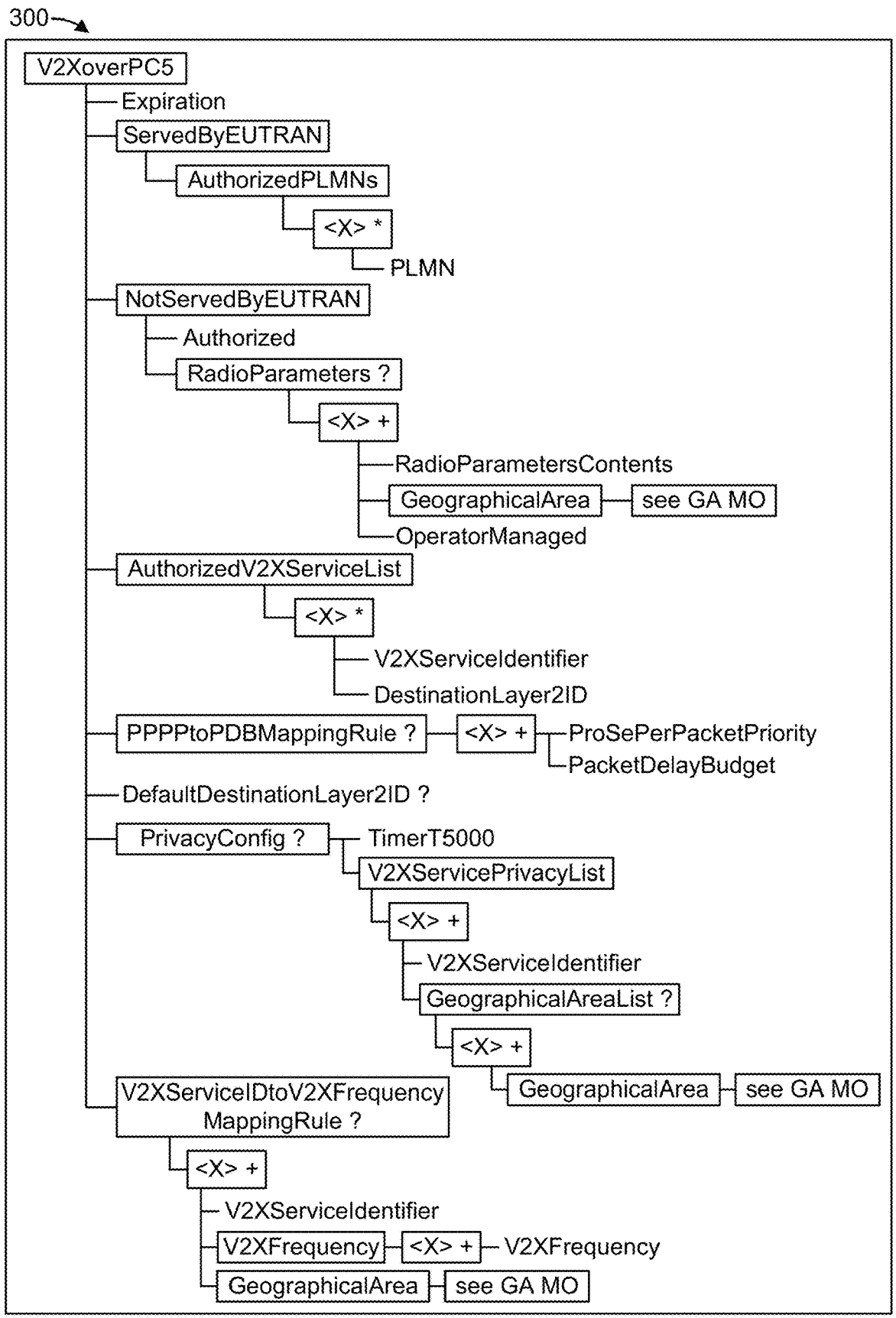
FIG. 3 is a diagram of the LTE V2X over PC5 Communication Management Object.

FIG. 3 depicts the configuration parameters in the form of an LTE V2X over PC5 Communication MO 300 for V2X communication over PC5 for LTE V2X Communication Provisioning.

Figure 4:
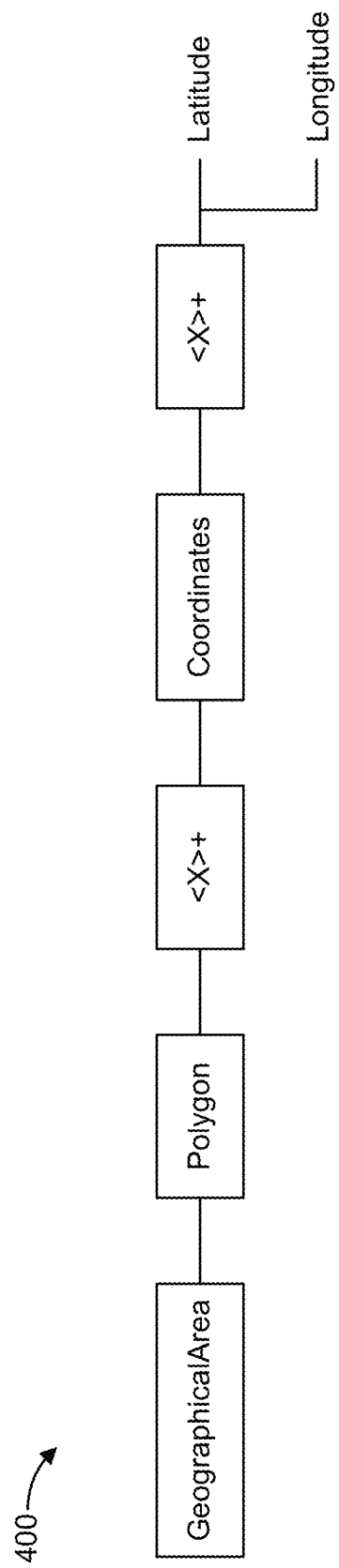
FIG. 4 is a diagram of a Geographical Area (GA) Management Object.

FIG. 4 depicts configuration parameters in the form of a Geographical Area (GA) MO 400.

For sidelink HARQ operation, there may be one sidelink HARQ Entity at the medium access control (MAC) entity for transmission on SL-SCH, which may maintain a number of parallel sidelink processes. For example, for V2X sidelink communication, the maximum number of transmitting sidelink processes associated with the sidelink HARQ Entity may be eight.

A sidelink process may be configured for transmissions of multiple MAC PDUs. For example, for transmissions of multiple MAC PDUs, the maximum number of transmitting sidelink processes with the sidelink HARQ entity may be two. A delivered and configured sidelink grant and its associated HARQ information may be associated with a sidelink process, which may be associated with a HARQ buffer. If the sidelink process is configured to perform transmissions of multiple MAC PDUs for V2X sidelink communication, the process may maintain a counter SL_RESOURCE_RESELECTION_COUNTER. For other configurations of the sidelink process, this counter may not be available.

The transmission of V2X sidelink communication may be prioritized over UL transmissions if the following conditions are met:

if the MAC entity is not able to perform UL transmissions and V2X sidelink transmissions simultaneously;

if the UL transmission is not prioritized by the upper layer; and if the value of the highest priority of the sidelink logical channel(s) in the MAC PDU is lower than thresSL-TxPrioritization.

A UE may establish multiple logical channels. An logical channel identity (LCD) included within the MAC subheader may identify a logical channel within the scope of one source layer-2 ID and destination layer-2 ID combination. Parameters for LCP may not be configured. The access stratum (AS) may be provided with the PPPP of a PDU transmitted over the PC5 interface by a higher layer. There may be a PPPP associated with each logical channel. The PDB of the PDU may be determined from the PPPP. The low PDB may be mapped to the high priority PPPP value.

A sidelink LCP procedure may be applied when a new transmission is performed. Each sidelink logical channel has an associated priority, which may comprise the PPPP. Multiple sidelink logical channels may have the same associated priority. The mapping between priority and LCD may be left for UE implementation.

The MAC entity may perform the following LCP procedure either for each sidelink control information (SCI) transmitted in a sidelink control (SC) period in sidelink communication, or for each SCI corresponding to a new transmission in V2X sidelink communication:

The MAC entity may allocate resources to the sidelink logical channels in the following steps:

Consider sidelink logical channels not previously selected for this SC period and the SC periods (if any) that are overlapping with this SC period, to have data available for transmission in sidelink communication.

Select a ProSe destination, having the sidelink logical channel with the highest priority, among the sidelink logical channels having data available for transmission.

For each MAC PDU associated to the SCI the following steps may be performed:

Allocate resources to the sidelink logical channel with the highest priority among the sidelink logical channels belonging to the selected ProSe destination and having data available for transmission;

If any resources remain, sidelink logical channels belonging to the selected ProSe destination may be served in decreasing order of priority until either the data for the sidelink logical channel(s) or the SL grant is exhausted, whichever comes first. Sidelink logical channels configured with equal priority may be served equally.

During the scheduling procedure described above the UE may also follow the rules below:

the UE does not segment a radio link control (RLC) SDU (or partially transmitted SDU) if the whole SDU (or partially transmitted SDU) fits into the remaining resources;

if the UE segments an RLC SDU from the sidelink logical channel, it may maximize the size of the segment to fill the grant as much as possible;

maximize the transmission of data; and if the MAC entity is given a sidelink grant size that is equal to or larger than 10 bytes (for sidelink communication) or 11 bytes (for V2X sidelink communication) while having data available for transmission, the MAC entity may not transmit only padding.

The above sidelink LCP procedure has no provision similar to that used in the Uu interface logical channel prioritization procedure, such as logical channel prioritized bit rate to avoid lower priority channel starvation. Similarly, the sidelink logical channel procedure has no built-in provision for restrictions of logical channels that can be served by a given resource grant, such as the one specified for NR LCP procedure, in order to fulfill requirements imposed by restrictions such as latency restrictions, numerology restrictions or allowed serving cells restrictions (for example in support of packet duplication).

In LTE or NR a buffer status reporting (BSR) procedure over the Uu interface may be used to provide the serving eNB or gNB with information about UL data volume in the MAC entity. Also in LTE, the sidelink Buffer Status reporting procedure may be used to provide the serving eNB with information about the amount of sidelink data available for transmission in the SL buffers associated with the MAC entity. Radio resource control (RRC) may control BSR reporting for the sidelink by configuring the two timers: the periodic-BSR-TimerSL and the retx-BSR-TimerSL. Each sidelink logical channel may belong to a ProSe destination. Each sidelink logical channel may be allocated to a logical channel group (LCG) depending on the priority of the sidelink logical channel and the mapping between the LCG ID and the priority that is provided by upper layers. The LCG may be defined per ProSe destination. A sidelink BSR similar to the Uu interface BSR may be a regular BSR, a periodic BSR, or a padding BSR.

A MAC PDU may contain at most one sidelink BSR MAC control element, even when multiple events trigger a sidelink BSR by the time a first sidelink BSR has been transmitted. In this case the regular sidelink BSR and the periodic sidelink BSR may have precedence over the padding sidelink BSR.

The MAC entity may restart retx-BSR-TimerSL upon reception of an SL grant.

All triggered regular sidelink BSRs may be canceled in case the remaining configured SL grant(s) validly are able to accommodate all pending data available for transmission in V2X sidelink communication. Triggered sidelink BSRs may be cancelled in case the MAC entity has no data available for transmission for any of the sidelink logical channels. Triggered sidelink BSRs may be canceled when a sidelink BSR (except for a Truncated sidelink BSR) is included in a MAC PDU for transmission. All triggered sidelink BSRs may be canceled, and retx-BSR-TimerSL and periodic-BSR-TimerSL may be stopped, when upper layers configure autonomous resource selection.

The MAC entity may transmit at most one regular/periodic sidelink BSR in a transmission time interval (TTI). If the MAC entity is requested to transmit multiple MAC PDUs in a TTI, it may include a padding sidelink BSR in any of the MAC PDUs that do not contain a Regular/Periodic sidelink BSR.

All sidelink BSRs transmitted in a TTI may reflect the buffer status after MAC PDUs have been built for the TTI. Each LCG may report at most one buffer status value per TTI, and this value may be reported in all sidelink BSRs that are reporting buffer status for this LCG.

A padding sidelink BSR may not be allowed to cancel a triggered regular/periodic sidelink BSR. A padding sidelink BSR may be triggered for a specific MAC PDU, and the trigger may be cancelled when the MAC PDU has been built.

Figure 5:
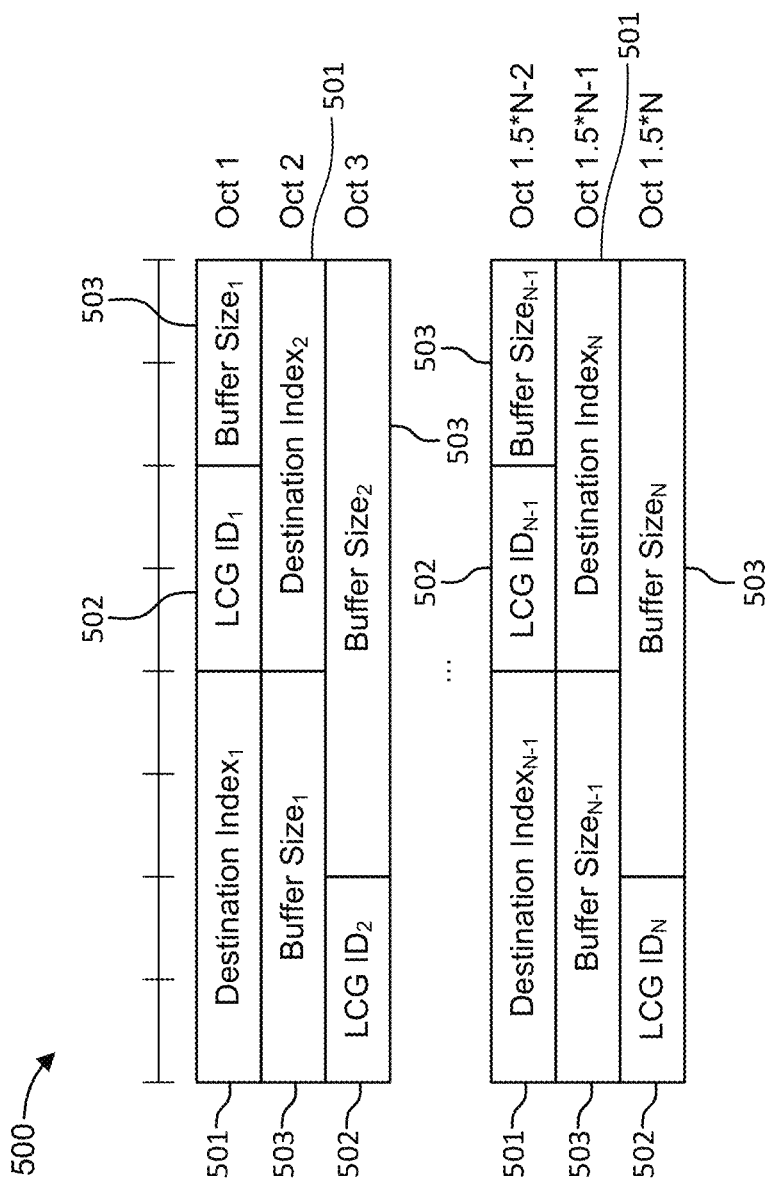
FIG. 5 is a diagram of a sidelink BSR and truncated sidelink BSR MAC control element for even N.

FIG. 5 depicts a sidelink BSR and truncated sidelink BSR MAC control element for even N 500. The example of FIG. 5 depicts the BSR MAC control elements (CEs) sidelink BSR and truncated sidelink BSR MAC CEs comprising a destination index field 501, one LCG ID field 502, and one corresponding buffer size field 503 per reported target group. The destination index field 501 may identify the destination for V2X sidelink communication. The length of this field may be, for example, 4 bits. The value may be set to the index of the destination reported to the eNB in the sidelink UE information message as part of the V2X destination list. The LCG ID field 502 may identify the group of logical channel(s) whose buffer status is being reported. The length of the field may be, for example, 2 bits. The buffer size field 503 may identify the total amount of data available across all logical channels of an LCG of a ProSe destination after all MAC PDUs for the TTI have been built. The amount of data may be indicated in a number of bytes. It may include all data that is available for transmission in the RLC layer and in the PDCP layer. Buffer sizes of LCGs may be included in decreasing order of the highest priority of the sidelink logical channel belonging to the LCG irrespective of the value of the destination index field 501.

Figure 6:
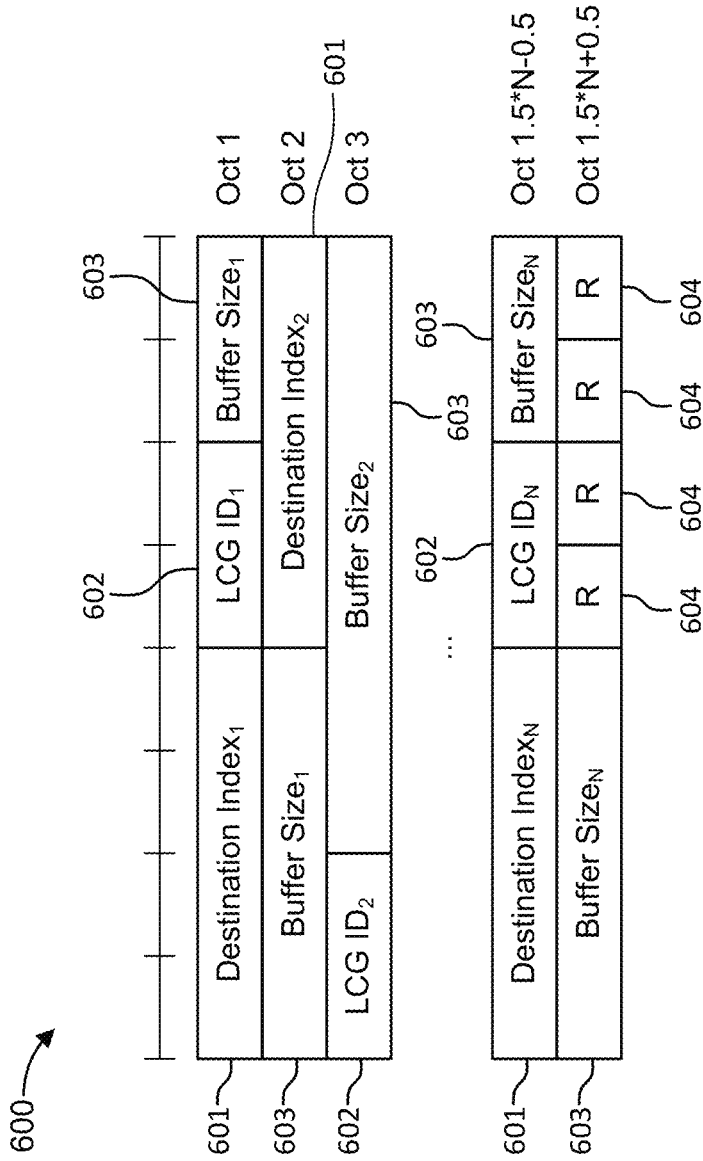
FIG. 6 is a diagram of a sidelink BSR and truncated sidelink BSR MAC control element for odd N.

FIG. 6 depicts a sidelink BSR and Truncated sidelink BSR MAC control element for odd N 600. The example of FIG. 6 depicts the BSR MAC control elements (CEs) sidelink BSR and truncated sidelink BSR MAC CEs comprising a destination index field 601, one LCG ID field 602, and one corresponding buffer size field 603 per reported target group, and reserved bits 604.

A LTE V2X sidelink communication scheduling request may rely on the LTE Uu scheduling request mechanism, which is also the baseline for the NR Uu scheduling request mechanism.

In NR, the MAC entity may be configured with a zero, one, or more scheduling request (SR) configurations. An SR configuration may comprise a set of PUCCH resources for SR across different bandwidth parts (BWPs) and cells. For a logical channel, at most one PUCCH resource for SR is configured per BWP.

Each SR configuration may correspond to one or more logical channels. Each logical channel may be mapped to zero or one SR configuration, which may be configured by RRC. The SR configuration of the LCH that triggered the BSR, if such a configuration exists, may be considered as corresponding to the SR configuration for the triggered SR.

For a BSR triggered by the expiry of the BSR retransmission timer, the corresponding SR configuration for the triggered SR is that of the highest priority LCH (if such a configuration exists) that has data available for transmission at the time the BSR is triggered.

RRC may configure the following parameters for the scheduling request procedure:
 sr-ProhibitTimer (per SR configuration);
 sr-TransMax (per SR configuration);
 sr-ConfigIndex.

The following UE variables may be used for the scheduling request procedure:
 SR_COUNTER (per SR configuration).

If an SR is triggered and there are no other SRs pending corresponding to the same SR configuration, the MAC entity may set the SR_COUNTER of the corresponding SR configuration to 0.

When an SR is triggered, it may be considered as pending until it is canceled.

All pending SR(s) triggered prior to the MAC PDU assembly may be canceled and each respective sr-ProhibitTimer may be stopped when the MAC PDU is transmitted. This this PDU may include a BSR MAC Control Element (CE), which contains buffer status up to (and including) the last event that triggered a BSR prior to the MAC PDU assembly. All pending SR(s) may be canceled when the UL grant(s) can accommodate all pending data available for transmission.

Only PUCCH resources on a BWP that is active at the time of SR transmission occasion may be considered valid.

For Rel-15, sidelink packet duplication is supported for V2X sidelink communication and may be performed at PDCP layer of the UE. Regarding the sidelink packet duplication for transmission, a PDCP PDU may be duplicated at the PDCP entity. The duplicated PDCP PDUs of the same PDCP entity may be submitted to two different RLC entities and associated with two different sidelink logical channels respectively. The duplicated PDCP PDUs of the same PDCP entity may be transmitted on different sidelink carriers. A UE using autonomous resource selection (regardless of its RRC state) may autonomously activate or deactivate sidelink packet duplication based on (pre)configuration. For a scheduled resource allocation (mode 3), the eNB is informed of the ProSe Per Packet Reliability (PPPR) information of the V2X transmission requested by the UE. The PPPR information may comprise the amount of data associated with one (or more) PPPR values that the UE has in the buffer and the destination of the V2X messages associated with one (or more) PPPR values that the UE has in the buffer.

The main use cases supported by Release 14 LTE V2V include basic safety with relatively low data rates in the order of 1-10 Mbps, where vehicles' status information such as position, speed, and heading are exchanged with nearby vehicles, infrastructure nodes, or pedestrians. As V2X applications advance, transmission of short messages about vehicles' own status data may be complemented with transmission of larger messages containing raw sensor data, vehicles' intention data, coordination, confirmation of future maneuvers, etc. For these advanced applications, the expected requirements to meet the needed data rate, reliability, latency, communication range, and speed may more stringent than illustrated in FIG. 1. Advanced V2X application throughput is expected to be a hundred times higher than that of the LTE V2X basic safety application throughput. For example, sensor raw data sharing between UEs supporting V2X applications may require data rates as high as 1 Gbps. The NR LCP procedure for sidelink communications may re-use the LTE sidelink LCP procedure or the newly specified NR Uu interface LCP procedure, but each of them have their own limitations with respect to NR sidelink requirements.

The current LTE V2X LCP procedure for sidelink data transmission has at least the following limitations:

(1) It is designed to primarily support low data rate transmission with no built-in logical channel starvation avoidance mechanism. For example, the current LTE sidelink LCP procedure does not support a built-in mechanism, for example a prioritized bit rate, in order to avoid the starvation of low priority logical channels by higher priority logical channels configured to serve applications with high data rate requirements.

(2) It is not designed to support configuration mapping restrictions for each sidelink logical channel such as:

(2a) SubCarrier Spacing (SCS) transmission restrictions (2b) Allowable latency restrictions. For example, the NR sidelink, similar to the NR Uu interface, may be characterized by a variable transmission opportunity timing or a variable transmission time duration, and as a result, a sidelink logical channel may be restricted to using certain resource grants because of the logical channel allowed latency requirement.

(2c) Other potential restrictions such as data duplications related restriction RATs/3GPP release co-existence related restrictions. For example, considering carrier frequency restrictions, a RAT restriction or 3GPP release restriction, for example to take into account the co-existence between V2X devices with different RATs or 3GPP release capabilities, depending on the adopted design, some of these restrictions may be visible to LCP procedure.

(3) The criteria for the selection of the transmission destination (e.g. ProSe destination) during the LCP procedure, only takes into account the priority (e.g., PPPP) of the logical channels toward that destination, specifically the logical channel with the highest priority. Furthermore more, in a given transmission opportunity, once selected, all logical channels of the selected destination must be served before logical channels on other destination are selected. In LTE V2X, the UE may be configured with PPPP to PDB mapping, but this mapping is left to implementation and not specified. One issue with this transmission destination selection approach is that in the case of NR V2X with a diverse set of services beyond just basic safety services, data of higher priority logical channels on some other destinations may fail to meet their transmission latency requirement and even be discarded, while lower priority channels on the selected destination are being served. Another issue with the current LTE V2X transmission destination selection approach is with respect to the ability to efficiently allocate resource grants while taking into account logical channel mapping restrictions other than allowed latency restriction. The current destination selection approach may result in selecting a transmission destination for whom at least the highest priority logical channel cannot be served by the available grant, or the grant among the available grants whose transmission time is next, with the risk of unnecessary failing to meet allowed latency requirements, dropping data and waste of radio resource grants.

The NR Uu LCP procedure is designed to support high data rates with built-in mechanisms to support a prioritized data rate, logical channel mapping restrictions such as SCS restrictions, allowed latency restrictions, but it is designed in the context of the NR Uu interface requirements and doesn't support capabilities for transmission destination selection or other potential logical channel mapping restrictions (for example, service to frequency mapping restrictions).

In view of the discussion above, there is a need for a new NR sidelink LCP procedure that builds on the existing LTE sidelink LCP procedure and NR Uu LCP procedure. There is also a need to investigate any impact, a grant type (e.g., mode 3 or mode 4 grant type) may have on the LCP procedures.

In Rel-15 LTE, for the LCP procedure, the MAC entity may take into account the following relative priority in decreasing order:

MAC CE for C-RNTI or data from UL-CCCH;
MAC CE for Data Volume and Power Headroom Report (DPR);
MAC CE for SPS confirmation;
MAC CE for BSR, with the xception of BSR included for padding;
MAC CE for PHR, Extended PHR, or Dual Connectivity PHR;
MAC CE for sidelink BSR, with the exception of sidelink BSR included for padding;
Data from any Logical Channel, except data from UL-CCCH;
MAC CE for recommended bit rate query;
MAC CE for BSR included for padding; and
MAC CE for sidelink BSR included for padding.

In Rel-15 NR, logical channels may be prioritized in accordance with the following order (highest priority listed first):

C-RNTI MAC CE or data from UL-CCCH;
Configured Grant Confirmation MAC CE;
MAC CE for BSR, with the exception of BSR included for padding;
Single Entry PHR MAC CE or Multiple Entry PHR MAC CE;
Data from any logical channel, except data from UL-CCCH;
MAC CE for BSR included for padding.

This description denotes, non-padding BSR, MAC CE for BSR with the exception of BSR included for padding. This description similarly denotes non-padding sidelink BSR, MAC CE for sidelink BSR with the exception of BSR included for padding. In Rel-15 LTE, non-padding BSR is prioritized over non-padding sidelink BSR, which is prioritized over data from any logical channel, except data from the UL-CCCH. Similarly, in Rel-15 NR, non-padding BSR is prioritized over data from any logical channel, except data from the UL-CCCH.

The prioritization rules above do not take into account the relative priority between sidelink transmissions versus uplink transmissions. For example, the BSR is always prioritized over the sidelink BSR even when the UL data that triggers the BSR may be of lower priority than the sidelink data that triggers the sidelink BSR.

As defined above, the term "BSR" refers to the procedure used to provide the serving eNB (in the case of LTE) or gNB (in the case of NR) with information about the amount of data available for transmission in the UL buffers associated with the MAC entity while "sidelink BSR" may refer to the procedure used to provide the serving eNB with information about the amount of sidelink data available for transmission in the sidelink buffers associated with the MAC entity.

There is also a need for rules for prioritization of sidelink data versus UL data transmission. In legacy LTE V2X (e.g., TS 36.321), the transmission of V2X sidelink communication is prioritized over uplink transmissions if the following conditions are met:
(1) if the MAC entity is not able to perform uplink transmissions and transmissions of V2X sidelink communication simultaneously at the time of the transmission; and
(2) if uplink transmission is not prioritized by upper layer; and
(3) if the value of the highest priority of the sidelink logical channel(s) in the MAC PDU is lower than the sidelink transmission prioritization threshold value (thresSL-TxPrioritization), if this value is configured.

In LTE V2X specification and in line with the above conditions, uplink transmission is prioritized over sidelink transmission if the following conditions are met:
(1) if the MAC entity is not able to perform uplink transmissions and transmissions of V2X sidelink communications simultaneously at the time of the transmission; and
(2) if uplink transmission is not prioritized by upper layers, for example, if the UE has an emergency PDN connection, the UE may send an indication to the lower layers to prioritize transmission over the emergency PDN connection as compared to transmission of V2X communication over PC5 (e.g., TS 24.386); or
(3) if the value of the highest priority of the sidelink logical channel(s) in the MAC PDU is higher than or equal to the sidelink transmission prioritization threshold value (thresSL-TxPrioritization), if this value is configured.

As discussed above, the NR system may support a diverse set of services including ultra reliable and very low latency services (URLLC) in addition to Enhanced Mobile Broadband (eMBB) and Massive Machine Type Communication (mMTC) type of services over the Uu interface. Advanced V2X, which is expected to support basic safety services and various degrees of URLLC services such as vehicle platooning, extended sensors, advanced driving, remote driving, is also expected support infotainment services and other less time critical services over the sidelink including sidelink through a relay-UE node. Furthermore, either sidelink transmissions or uplink transmissions may be based on a grant free resource allocation, where the UE autonomously selects the resource transmission. In view of these NR requirements and these advanced V2X requirements, beside emergency calls, some uplink transmissions may be critical and more time sensitive than some V2X communication, while other V2X transmissions may be critical and more time sensitive than uplink transmissions. For example, for a relay-UE node, some non-emergency uplink transmission may be more critical and more time sensitive than a sidelink transmission. Therefore, the LTE V2X prioritization approach, where sidelink transmission is prioritized over uplink transmission based on an absolute priority threshold configured for the sidelink transmission, regardless of uplink transmission priority may not be appropriate. Accordingly, there is a need for new prioritization rules between sidelink transmissions and uplink transmissions.

In the legacy systems, sidelink transmission opportunities follow a periodicity of a fixed transmission time interval and fixed transmission duration. NR sidelink transmissions may be based on an NR RAT design where transmission opportunities have a variable transmission time interval with no predefined periodicity, and variable transmission durations. As a result, multiple overlapping sidelink grants (e.g. a grant for sidelink transmission) may co-exist in the UE. Similarly, multiple uplink grants (e.g. grants for uplink transmission) may co-exist in the UE. As a result, rules for prioritization of sidelink transmissions versus uplink transmissions need to be enhanced.

Figure 7:
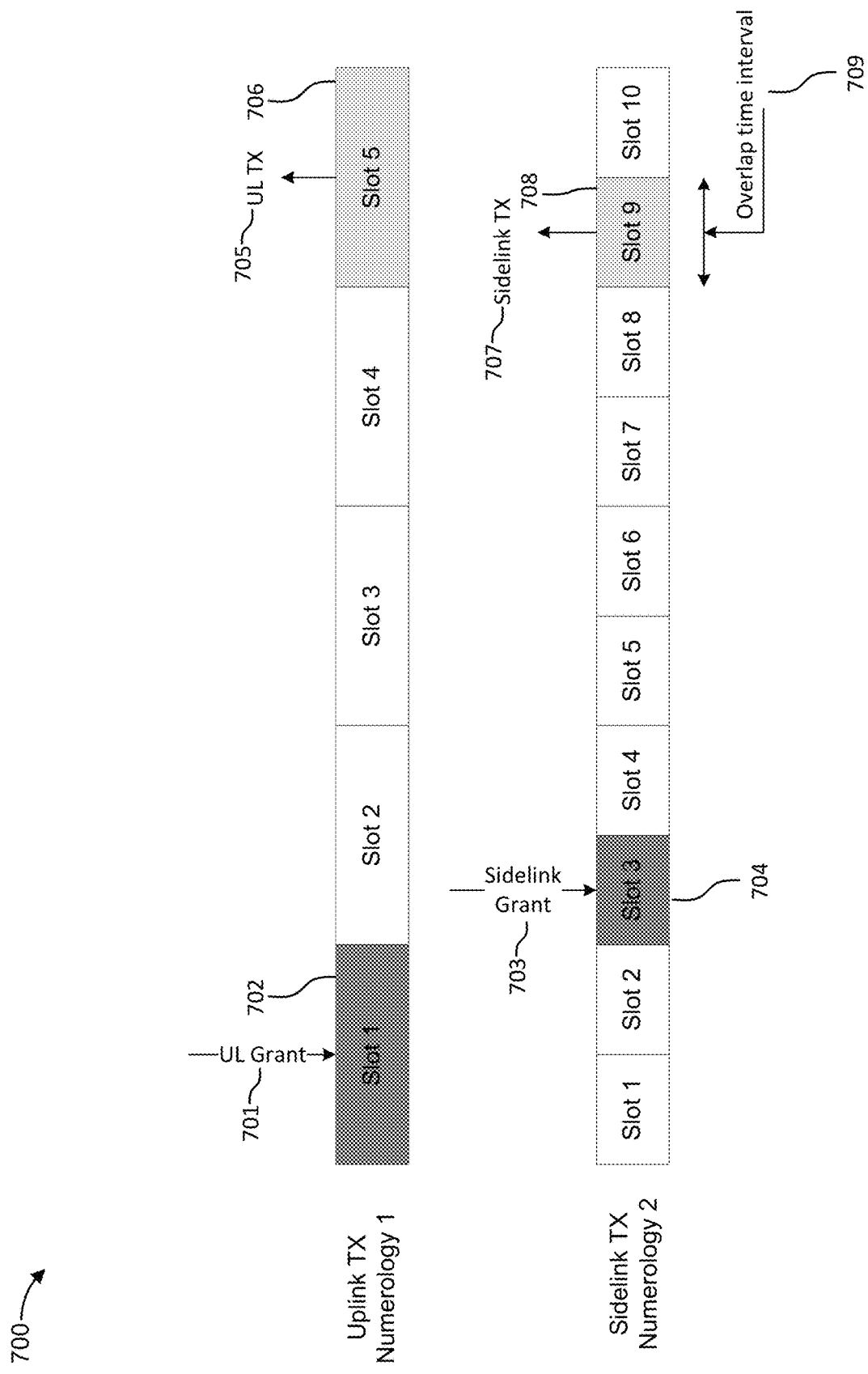
FIG. 7 is a diagram of a case where both the grants fully overlap, the earliest allowed transmission starting points are the same, but the two grants have different durations.

FIG. 7 is a diagram 700 showing grants that fully overlap. FIG. 7 shows the UL grant 701 in slot 1 702 and the sidelink grant 703 in slot 3 704. FIG. 7 also shows that the UL Tx grant 705 in slot 5 706 fully overlaps with the sidelink Tx 707 grant in slot 9 708. The overlap time interval 709 is the duration of slot 9 708. The earliest allowed transmission starting points of the UL Tx grant 705 and the sidelink Tx 707 are the same, but the two grants have different durations, slot 5 706 and slot 9 708.

Figure 8:
FIG. 8, is a diagram of a case where both the grants fully overlap, the latest allowed transmission end points are the same, but the two grants have different durations.

FIG. 8 is a diagram 800 showing grants that fully overlap. FIG. 8 shows the UL grant 801 in slot 1 802 and the sidelink grant 803 in slot 4 804. FIG. 8 also shows that the UL Tx grant 805 in slot 5 806 fully overlaps with the sidelink Tx 807 grant in slot 10 808. The overlap time interval 809 is the duration of slot 10 808. The latest allowed transmission end points of the UL Tx grant 805 and the sidelink Tx 807 are the same, but the two grants have different durations.

Figure 9:
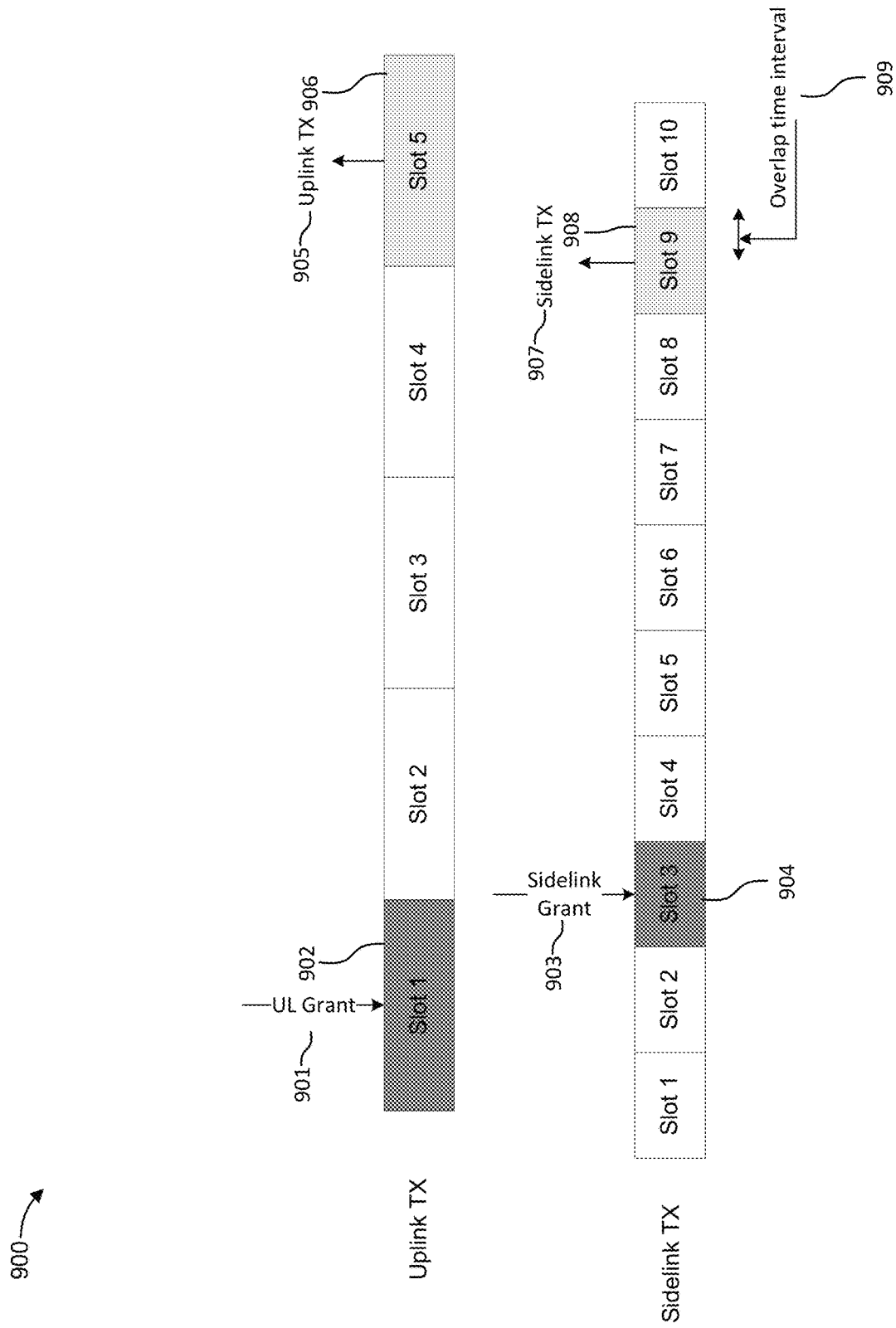
FIG. 9 is a diagram of a case where the grants are of different durations, partially overlap where either the earliest allowed transmission starting point and the latest allowed transmission end point of each of the grants are different.

FIG. 9 is a diagram 900 showing grants that are in different durations and partially overlap. FIG. 9 shows the UL grant 901 in slot 1 902 and the sidelink grant 903 in slot 3 904. FIG. 9 also shows that the UL Tx grant 905 in slot 5 906 partially overlaps with the sidelink Tx 907 grant in slot 9 908. The overlap time interval 909 is a portion of the duration of slot 9 908. The earliest allowed transmission starting point of the UL Tx grant 905 and the sidelink Tx 907 are different.

Figure 10:
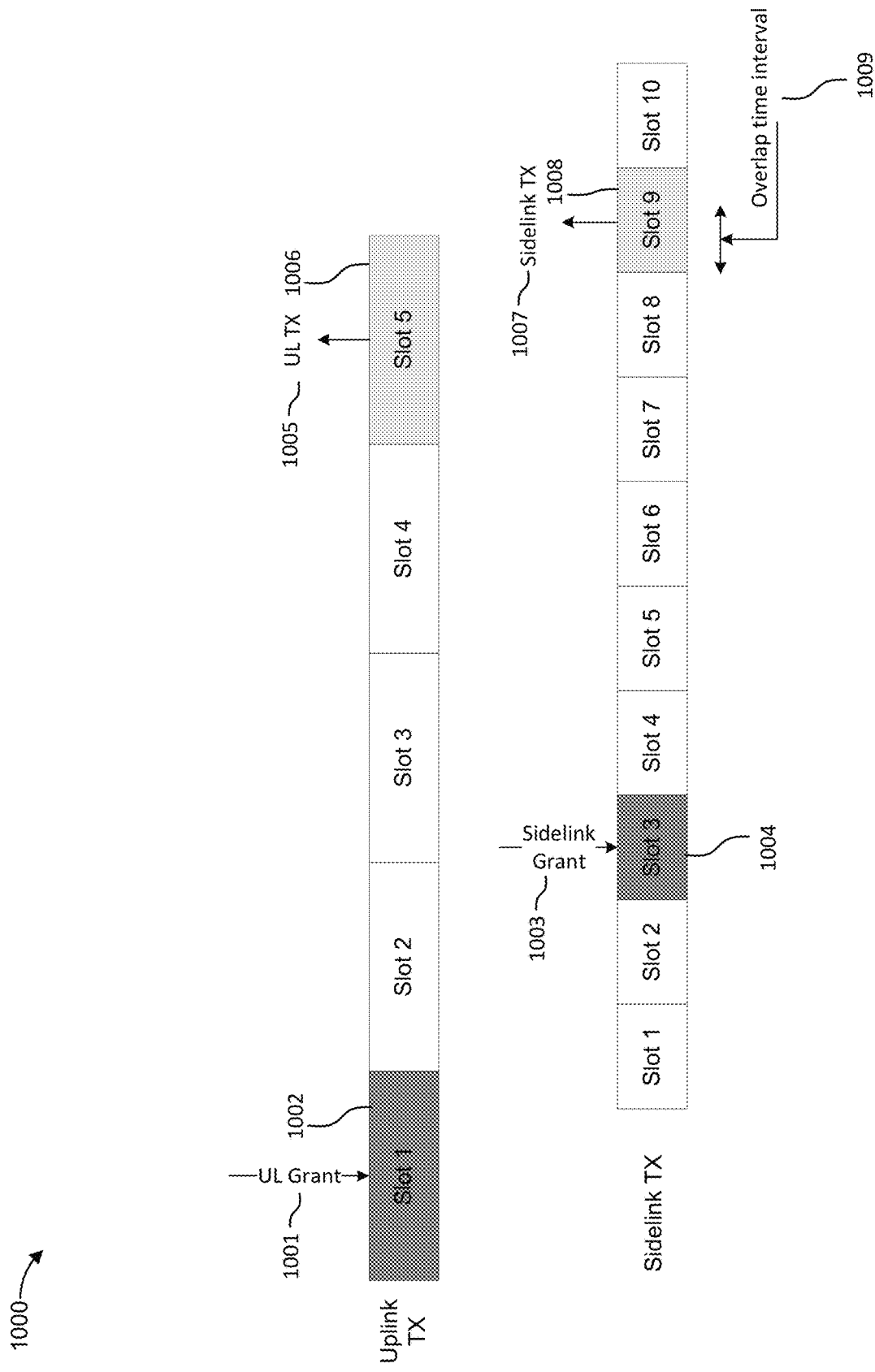
FIG. 10 is a diagram of a case where the grants are of different durations, partially overlap where either the earliest allowed transmission starting point and the latest allowed transmission end point of each of the grants are different.

FIG. 10 is a diagram 1000 showing grants that are of different durations and partially overlap. FIG. 10 shows the UL grant 1001 in slot 1 1002 and the sidelink grant 1003 in slot 3 1004. FIG. 10 also shows that the UL Tx grant 1005 in slot 5 1006 partially overlaps with the sidelink Tx 1007 grant in slot 9 1008. The overlap time interval 1009 is a portion of the duration of slot 9 1008. The latest allowed transmission end point of the UL Tx grant 1005 and the sidelink Tx 1007 are different.

Figure 11:
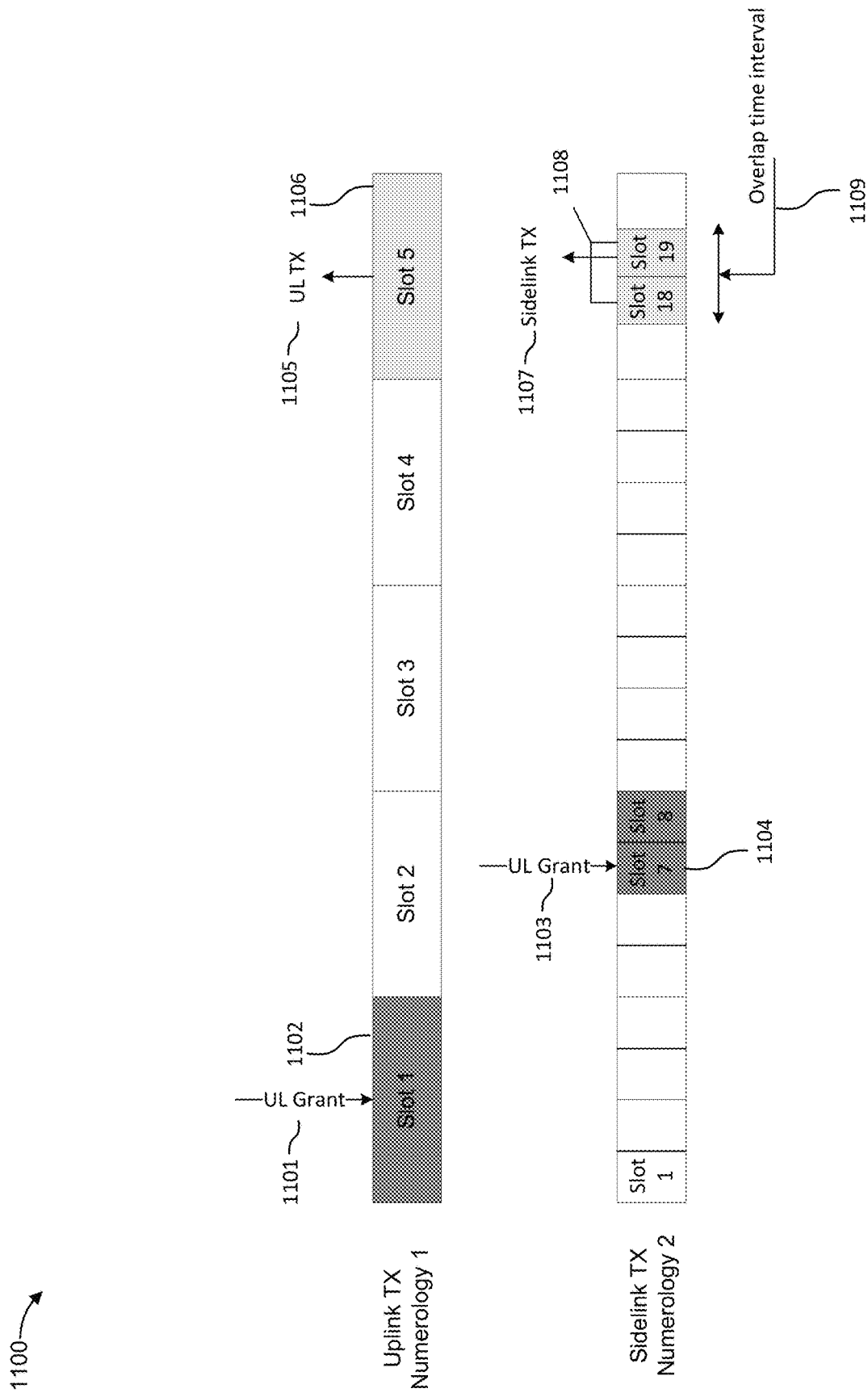
FIG. 11 is a diagram of a case where the grants are of different durations, fully overlap where the earlier allowed transmission starting and the latest allowed transmission end point of each of the grant are different.

FIG. 11 is a diagram 1100 showing grants that are of different durations and fully overlap. FIG. 11 shows the UL grant 1101 in slot 1 1102 and the sidelink grant 1103 in slots 7 and 8 1104. FIG. 11 also shows that the UL Tx grant 1105 in slot 5 1106 fully overlaps with the sidelink Tx 1107 grant in slots 18 and 19 1108. The overlap time interval 1109 is the duration of slots 18 and 19 1108. In this example, the earlier allowed transmission starting and the latest allowed transmission end point of each of the grants are different.

The methods and apparatuses described herein provide solutions to the above limitations. One solution described herein includes an enhanced V2X MO, which may be used for the provisioning of V2X configuration parameters in the UE.

Another solution described herein includes methods to perform sidelink LCP. The methods include configuring the MAC with relevant V2X configuration parameters, e.g., LCP control parameters. The methods also include performing selection of the logical channel(s) served by the sidelink grant, which may be based on any combination of the following: a set of allowed V2X serving cells, a set of allowed SCSs, an allowed latency, an allowed SL-SCH-duration, an allowed SL-SCH K2 duration, a set of allowed RATs/RAT versions, a set of allowed BWPs, and a set of allowed transmission profiles. The methods also include selecting the ProSe destination(s) among the selected SL LCHs having data available for transmission. The methods also include performing resource allocation for a SL LCH when performing a new SL transmission.

Another solution described herein includes methods for performing UL LCP that address the impacts of SL related transmissions. The methods include determining when to prioritize transmission of V2X SL BSRs over UL BSRs. The methods also includes determining when to prioritize V2X SL transmissions over UL transmissions.

Another solution described herein includes methods to determine the prioritization of V2X sidelink communication transmissions versus uplink transmissions for scenarios where the V2X traffic priority may vary dynamically with respect to the uplink traffic. The methods also include using sidelink PPPR or uplink PPPR to determine the prioritization of V2X sidelink transmissions versus uplink transmissions. The methods also include determining the prioritization of V2X sidelink transmissions versus uplink transmissions for overlapping grants.

Another solution described herein includes methods for determining the transmission parameters associated with a radio resource grant.

In support of the NR V2X solutions described herein, an NR V2X MO may comprise the following V2X configuration parameters in addition to the configuration parameters in the LTE V2X MO:

Prioritized Bit Rate (PBR) for each authorized V2X service;
Bucket Size Duration (BSD) for each authorized V2X service;
List of allowed SCSs for each authorized V2X service;
List of allowed of V2X BWPs for each authorized V2X service;
List of allowed RATs for each authorized V2X service;
List of allowed RAT versions for each authorized V2X service;
List of allowed transmission profiles for each authorized V2X service;
List of allowed carrier frequencies for each authorized V2X services;
List of PPPP per allowed carrier frequencies for each authorized V2X services; or
PPPR to packet duplication mapping rule that comprises the list of PPPR values or PPPR ranges and the corresponding number of duplicated data paths. E.g., for each PPPR value or PPPR range, there may be a configured number of parallel paths for data duplication. The number of paths may be, for example, 2, 3, or more.

The NR V2X MO may also comprise a mapping of transmission modes (unicast, groupcast or broadcast) and the V2X services e.g., PSID or ITS-AIDs of the V2X application. For example, a transmission mode may be configured for each V2X service. A default transmission mode may be configured for use for V2X services that are not configured with a mapping of transmission mode. One or more default transmission modes may be configured for each V2X service. The mapping of transmission mode and V2X services may be achieved with a structure in the NR V2X MO that explicitly associates V2X service with transmission mode. Alternatively, the association may be implicit, wherein the mapping of V2X service and destination Layer-2 ID for broadcast transmission, groupcast transmission, and unicast transmission are configured using a separate or a dedicated Information Element (IE) or data structure. A mapping of transmission modes and the V2X services may comprise mapping of transmission modes and service data flows or packet filter sets. For example, mapping of transmission modes and V2X services may comprise several mappings wherein each mapping comprises a transmission mode and a service data flow or packet filter set. In an alternative embodiment, a mapping of transmission modes and V2X services may comprise, for each V2X service, of a mapping between the V2X service and more than one transmission mode, e.g. the association between V2X service and the transmission mode is done at the service level where each service e.g., PSID or ITS-AID, may be associated with more than one transmission mode.

The NR V2X MO may also comprise a mapping of PC5 QoS Identifier (PQIs) and the V2X services. For example, a PQI may be configured for each authorized V2X service. One or more default PQIs may also be configured for use by V2X services that are not configured with a mapping of PQI. A V2X service may comprise more than one service data flow or packet filter set. A mapping of PQIs and the V2X services may comprise a mapping of PQIs and service data flows or packet filter sets. For example, a mapping of a PQI and V2X service may comprise several mappings where each mapping includes a PQI and a service data flow or packet filter set. In an alternative embodiment, mapping of PQIs and V2X services may comprise, for each V2X service, a mapping between the V2X service and more than one PQIs, for example, the association between a V2X service and a PQI is generated at the service level where each service (e.g., PSID or ITS-AID) may be associated with more than one transmission mode.

The NR V2X MO may also comprise a mapping of a transmission range and the V2X services (e.g., PSID or ITS-AIDs) of the V2X application, for example, groupcast or unicast. A transmission range may be configured for each V2X service. A default transmission range may be configured for use for V2X services that are not configured with a mapping of transmission ranges. A default transmission range may be configured for each V2X service, for example, in the case of a groupcast or unicast transmission. A mapping of transmission ranges and the V2X services may comprise a mapping of transmission ranges and service data flows or packet filter sets. For example, a mapping of transmission ranges and V2X services may comprise several mappings where each mapping includes a transmission range and a service data flow or packet filter set. In an alternative embodiment, a mapping of transmission ranges and V2X services may comprise, for each V2X service, a mapping between the V2X service and more than one transmission range, for example, the association between the V2X service and transmission range is generated at the service level where each service (e.g., PSID or ITS-AID) may be associated with more than one transmission range. The mapping of transmission ranges and V2X services, and the mapping of transmission modes and V2X services may be jointly generated using the same IE or data structure.

The NR V2X MO may also comprise a list of allowed PC5 QoS rules where each QoS rule comprises the QFI of the associated QoS Flow, a packet filter set, and a precedence value.

The NR V2X MO may also comprise a mapping of QFIs (QoS Flow Identifier) and PQIs, a mapping of PQIs and logical channels, a mapping of QFI and sidelink bearers, a mapping of PQIs to QoS characteristics, e.g. QoS Profiles, or a mapping of resource allocation modes and logical channel or mapping of resource allocation mode and QoS Flow. As used herein, the term QFI may also be referred to as PC5 QoS Flow Identifier (PFI).

Figure 12:
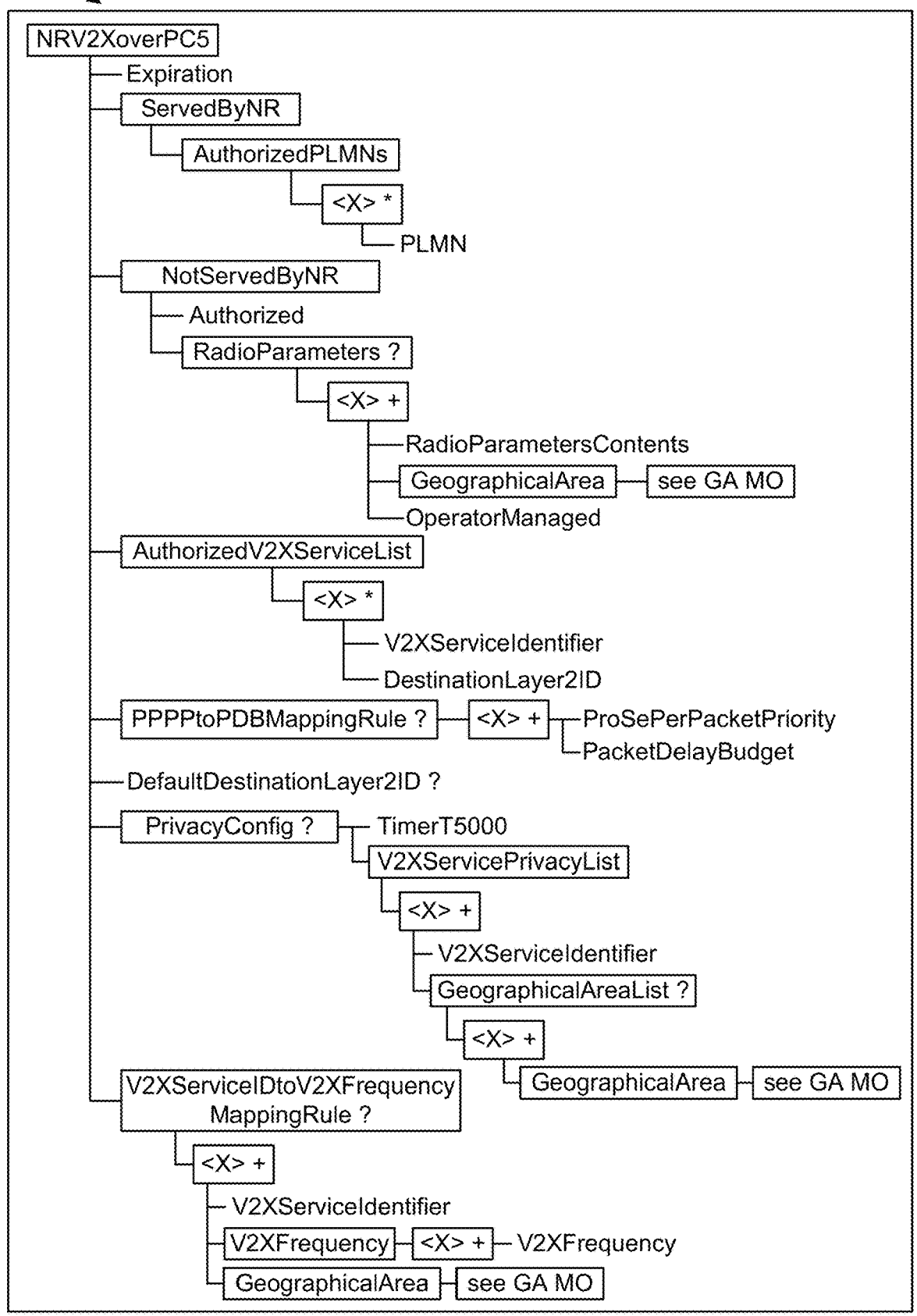
FIG. 12 is a diagram of an NR Basic V2X over PC5 Communication Management Object.

FIG. 12 depicts an NR Basic V2X over PC5 Communication MO 1200.

Figure 13:
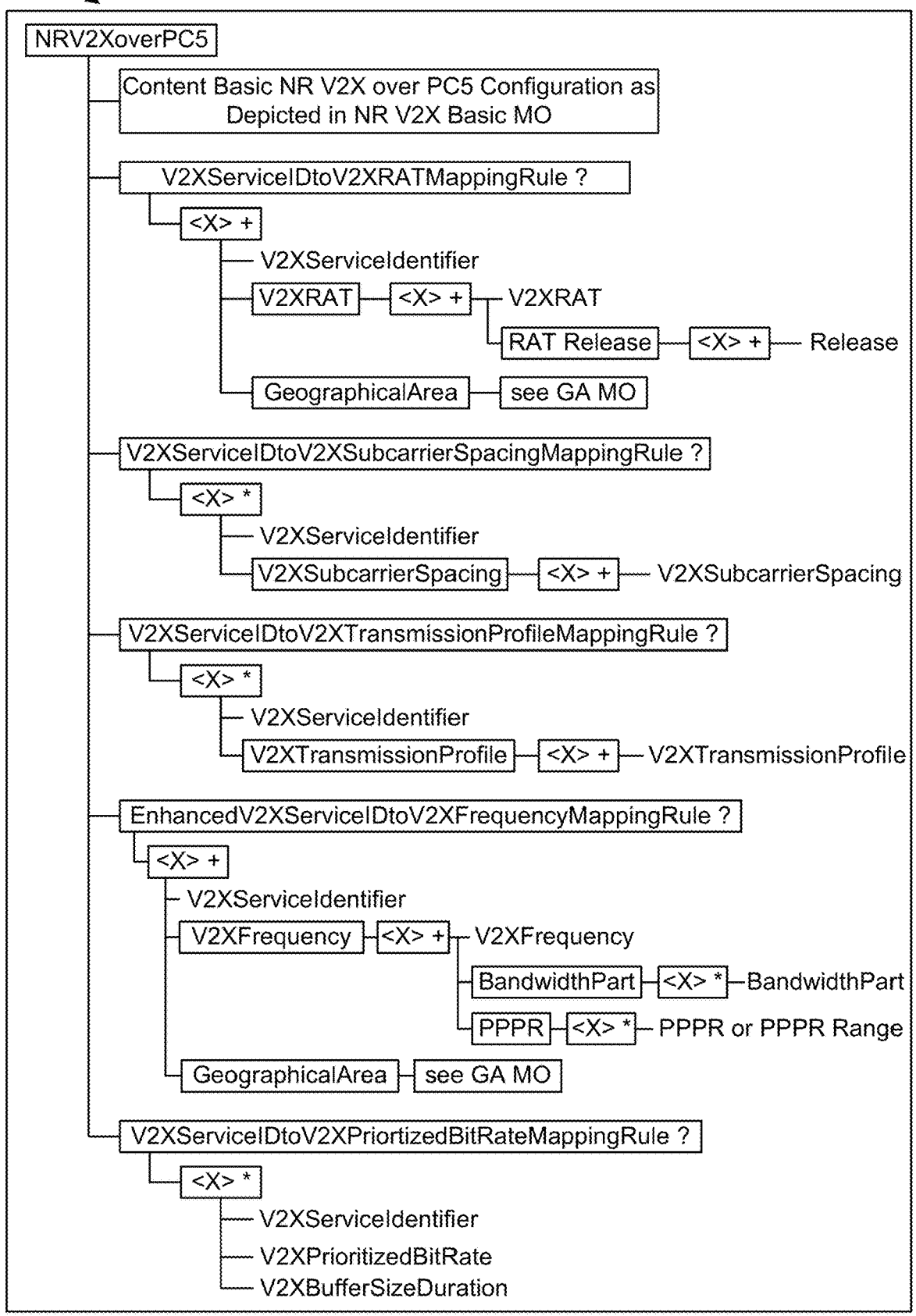
FIG. 13 is a diagram of an NR Extended V2X over PC5 Communication Management Object.

FIG. 13 depicts an NR Extended V2X over PC5 Communication MO 1300.

Figure 14:
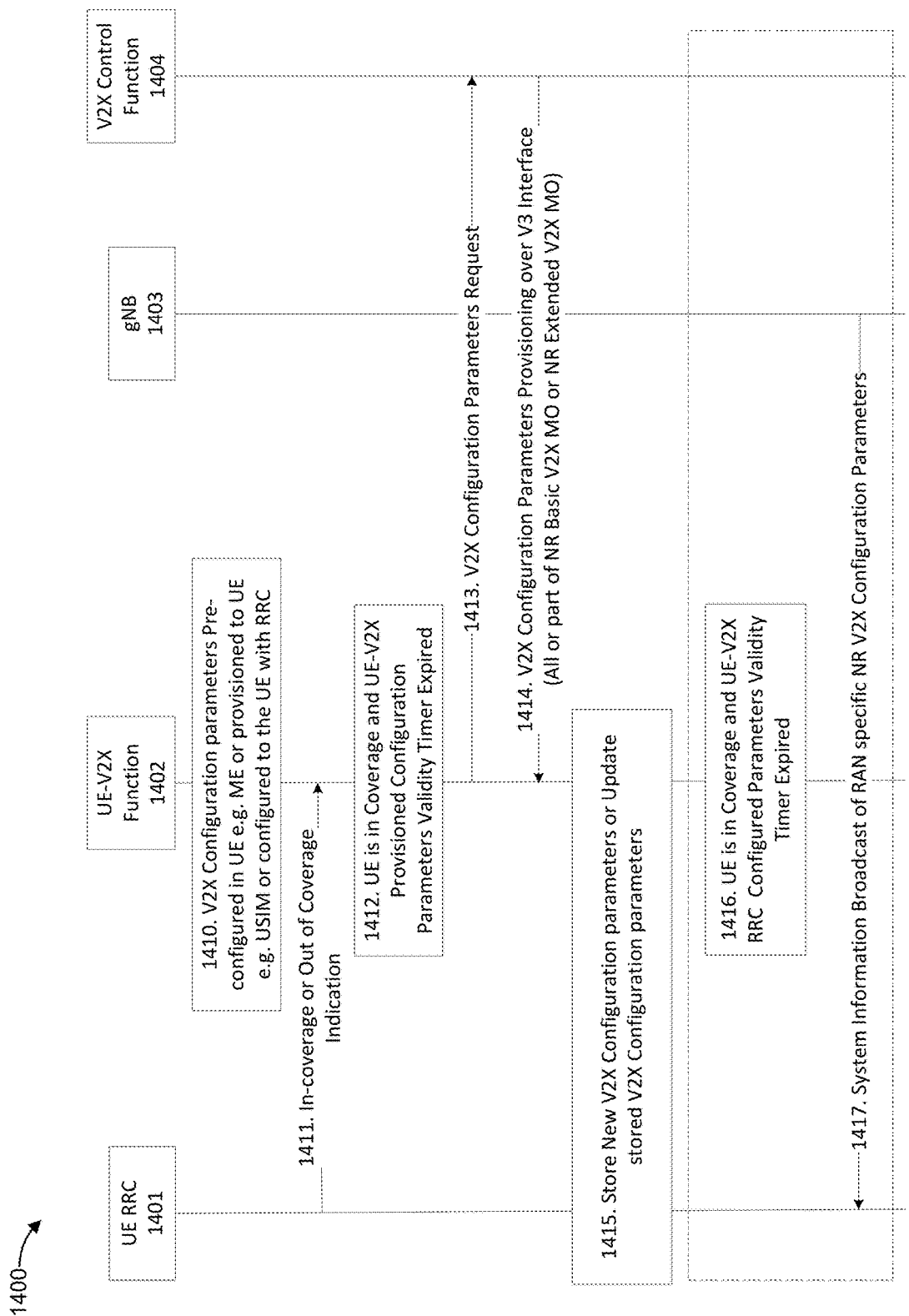
FIG. 14 is a diagram of provisioning of V2X Configuration parameters in a UE.

FIG. 14 depicts a procedure 1400 for the NR V2X provisioning of V2X configuration parameters into a UE by a V2X Control Function in accordance with one embodiment, which may be used in combination with any of the embodiments described herein. At step 1410, the UE-V2X Function 1402 may be pre-configured, or provisioned by a V2X Control Function 1404 over the V3 interface or an NR interface, with each of the V2X configuration parameters listed above. At step 111, the UE RRC 1401 may notify the UE-V2X Function 1402 of in-coverage and out-of-coverage events. For example, when the UE returned to coverage after being out of coverage, the UE RRC 1401 may detect an in-coverage event and may send a notification to the UE-V2X Function 1402 such that the latter may check the validity timer of the UE-V2X provisioned configuration parameters (step 1412) and if the validity timer has expired, it may trigger a configuration parameter request to the V2X Control Function 1404 (step 1413). Similarly, if the UE goes out of coverage, the UE-V2X Function 1402 may need to know so that it does not unnecessarily trigger configuration requests toward the network, for example, when configuration parameter validity timer(s) have expired while the UE is out of coverage. At step 1414, V2X configuration parameters may be provisioned by a V2X Control Function 1404 over the V3 interface or an NR interface to the UE-V2X Function 1402. At step 1415, the UE RRC 1401 and the UE-V2 Function 1402 may store new V2X configuration parameters or update stored V2X configuration parameters. At step 1416, the UE is in coverage and the UE-V2X Function 1402 may check the validity timer of the UE-V2X RRC configured configuration parameters. At step 1417, the gNB 1403 may send a system information broadcast of RAN specific NR V2 configuration parameters.

Figure 15:
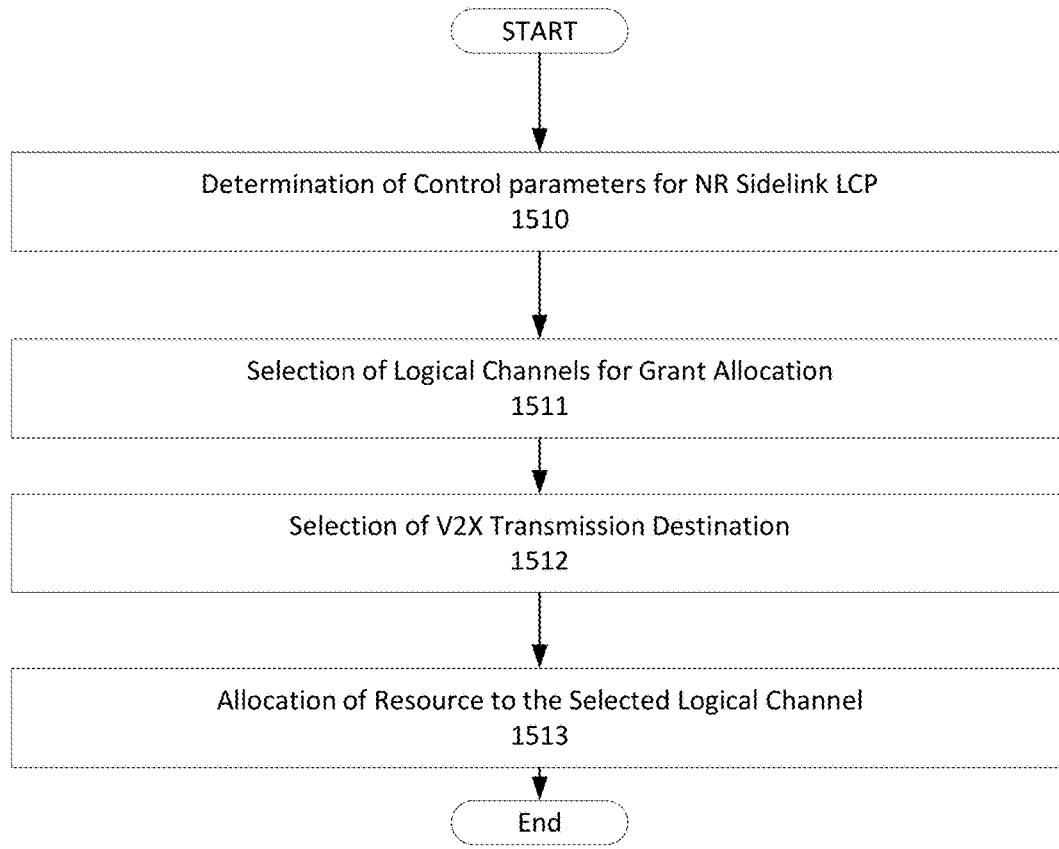
FIG. 15 is a diagram of a high level illustration of an NR V2X Logical Channel Prioritization Procedure.

FIG. 15 depicts a NR V2X sidelink LCP procedure 1500 is described herein in accordance with another embodiment, which may be used in combination with all of the embodiments described herein. At step 1510, control parameters for NR sidelink LCP may be determined. At step 1511, logical channels may be selected for grant allocation. At step 1512, a V2X transmission destination may be selected. At step 1513, resources may be allocated to the selected logical channel.

The NR V2X sidelink LCP procedure 1500 may be applied whenever a new transmission is performed. Each sidelink logical channel within the MAC entity may be configured with the following parameters:

(1) The sidelink logical channel priority, e.g. the PPPP associated with the sidelink logical channel, where an increasing priority value indicates a lower priority level. The logical channel priority may also be the priority determined based on the PQI indicated by the V2X application with the data being mapped to the logical channel. Further details on the mapping of V2X data to logical channels and determination of the corresponding logical channel priority are described below.

(2) The sidelink prioritized bit rate that sets the PBR, which may comprise the data rate that must be served on the sidelink logical channel before a sidelink logical channel of lower priority is served.

(3) The sidelink bucket size duration that sets the BSD for the sidelink, which may comprise the duration to fill up the bucket size at the rate of the PBR. The PBR together with the BSD define the size of a prioritized bucket for the sidelink logical channel. As long as there is data in the sidelink prioritized bucket, and there is a sidelink grant that may serve the sidelink logical channel, then the sidelink logical channel may be prioritized for a sidelink resource grant allocation over sidelink logical channels of lower priority.

(4) The Maximum Data Burst Volume.

(5) Bj may be denoted in the embodiments herein as the amount of data in the prioritized bucket associated with the sidelink logical channel j. The MAC entity may maintain a variable Bj for each sidelink logical channel j.

Additionally, mapping restrictions for an uplink resource grant to logical channel mapping may be configured for each sidelink logical channel. The mapping restriction for the uplink resource grant to logical channel may be one or more of the following:

Set of allowed V2X serving cells that set the allowed cell(s) for transmission. The allowed V2X serving cells may, for example, be expected to fulfill the following conditions: the carrier frequency of the serving cell is configured for each of the V2X services mapped to the logical channel; and the serving cell meets a data duplication requirement. For example, logical channels carrying duplicated data may be mapped to different serving cells.

List of allowed carrier frequencies.

Set of allowed V2X SCSs that set the allowed Subcarrier Spacing(s) for transmission.

Set of allowed V2X BWPs that set the allowed bandwidth parts for transmission.

Maximum Allowed SL-SCH duration that set the maximum SL-SCH duration allowed for transmission.

Allowed latency that set the maximum allowed latency from the time the data becomes available for sidelink transmission to the time the data transmission ends.

Allowed SL-SCH K2 duration that set the maximum allowed latency from the time the SL-SCH grant becomes available for sidelink transmission to the time the SL-SCH data transmission begins.

Allowed RATs that set the allowed RATs for transmission.

Allowed RAT versions that set the allowed RAT versions for transmission.

Allowed transmission profiles that set the allowed transmission profiles for transmission. The content of the transmission profile may comprise radio parameters for V2X transmission and may include RAT specific and RAT version specific radio parameter configurations. An example of transmission profile content may be the Rel-14 SL-V2X-Preconfiguration information element defined in TS 36.331 and captured for example as a radio parameter container in the V2X over the PC5 Communication MO illustrated in FIG. 3. The transmission profile may also include transmission reliability configuration parameters, for example the PPPR target value. The transmission profile may include NR specific V2X transmission parameters such as SCS value(s), BWP(s), maximum allowed latency, maximum allowed SL-SCH duration, and allowed V2X transmission frequencies.

Allowed transmission mode(s) e.g., unicast, groupcast or broadcast.

Allowed resource allocation mode(s) e.g., mode 1 or mode 2, e.g. scheduled grant or configured grant or autonomous resource grant.

Allowed transmission range(s).

The UE may determine control parameters for the sidelink LCP. The UE may determine how many logical channels to configure and the identity of each logical channel to be configured. Similarly, the UE may determine how many LCGs to configure and the identities of the LCGs. The UE may use V2X information, preconfigured into the UE or provisioned into the UE by the V2X Control Function (for example, as specified in the NR V2X MO described herein), to autonomously determine how many logical channels to configure, each logical channel identity, how many LCGs to configure, and each LCG identity.

The UE may use one or more of the following information, denoted herein as "logical channel derivation parameters":

One or more services in the list of allowed V2X services; one or more priority values in the PPPP list provisioned to the UE (for example, the PPPP to PDB mapping list in the NR V2X MO described herein);

One or more of the PPPP to PDB mappings in the PPPP to PDB mapping list;

One or more frequencies in the list of allowed carrier frequencies for one or more authorized V2X services;

One or more transmission profiles from the list of allowed transmission profiles for the one or more authorized V2X services;

One or more SCSs from the list of allowed SCSs for the one or more authorized V2X services;

One or more RATs from the list of allowed RATs for the one or more authorized V2X service;

One or more RAT versions from the list of allowed RAT versions for the one or more authorized V2X services; and One or more BWPs from the list of allowed BWPs for the one or more authorized V2X services.

The UE may configure the LCH or LCG to, for example, ensure that different LCHs or LCGs are configured for V2X messages with the same destination identity but are associated with different V2X frequency sets, different serving cell sets, or different BWP sets. Similarly, the UE may configure LCH to, for example, ensure that duplicated data are mapped to different LCHs that are in turn configured with different allowed serving cells or allowed carrier frequencies. Similarly, the UE may configure LCGs to, for example, ensure that logical channels configured for duplicate data are mapped to different LCGs. Alternatively, the UE may configure LCGs to, for example, ensure that only one logical channel configured for duplicate data is mapped to an LCG. Yet in another alternative, the UE may configure LCGs or mapping of LCHs to LCGs such that LCHs configured for data duplications are always mapped to the same LCG.

Instead of the UE autonomously configuring the LCH/LCG based on V2X parameters preconfigured or provisioned into the UE, the UE may be configured by the gNB through common RRC signaling (e.g. system information broadcast signaling) or dedicated RRC signaling (e.g., a RRC reconfiguration message) with one or more LCH identities and one or more LCG identities, and mapping of LCHs to LCGs for example as per the LCH to LCG mapping options described above. The UE may signal to the gNB, in the LTE-like UE Assistance Information message or the LTE like V2X UE Information message, one or more of the logical channel derivation parameters described above, to assist the gNB in configuring the UE with LCH and LCG information.

The UE may map V2X services to logical channels. The mapping may be a one-to-one mapping, more than one services mapped to one logical channel mapping, or one service mapped to more than one logical channel. The UE may use one or more of the logical channel derivation parameters described above in deciding the mapping of V2X service or V2X message to logical channel. Alternatively, the UE may be configured by the gNB through common RRC signaling (e.g. system information broadcast signaling) or dedicated RRC signaling (e.g., RRC reconfiguration message), the mapping of V2X services to logical channels. The UE may signal to the gNB, in the LTE-like UE Assistance Information message or the LTE like V2X UE Information message, one or more of the logical channel derivation parameters described above, to assist the gNB in configuring the UE with mapping between V2X services and logical channels. The base station or the scheduling entity may configure the UE with LCGs and the associated priorities, or with LCHs and the associated priorities. Additionally, the base station may configure the UE with mappings of V2X services to LCHs or with mappings of services to QoS Flows, and mapping of QoS Flows to Bearers and mapping of bearers to LCHs.

A sidelink logical channel priority may be assigned. The UE may assign a priority value to each logical channel from the PPPP values associated with the services or application data packets mapped to the logical channel. In one embodiment, the logical channel priority may be the highest priority PPPP (lowest PPPP value) among the PPPP values associated with services or application data packets mapped to the logical channel. The PPPP value associated with each service or application data packet may be as specified in the NR V2X MO described herein. Alternatively, the UE may be configured by the gNB through common RRC signaling (e.g., system information broadcast signaling or multicast information signaling to a group of UEs) or dedicated RRC signaling (e.g., RRC reconfiguration message) with the priority value for one or more logical channels. The UE may signal to the gNB, in the LTE-like UE Assistance Information message or the LTE like V2X UE Information message, one or more of the logical channel derivation parameters described above, to assist the gNB in configuring the UE with sidelink logical channel priority. Instead of logical channel priority as a sidelink QoS characteristic, any other sidelink QoS characteristics, including but not limited to a QoS flow, a transmission range, reliability, a PQI, or latency may be used.

The UE may assign a PBR value to each logical channel from the PBR values associated with the services or application data packets mapped to the logical channel. The PBR of the logical channel may be for example, the highest PBR among the PBRs of the services or application data packets mapped to the logical channel, or the sum of the PBRs of the services or application data packets mapped to the logical channel. The PBR for each V2X service may be determined as provisioned in the NR V2X MO described herein. Alternatively, the UE may be configured by the gNB through common RRC signaling (e.g. system information broadcast signaling) or dedicated RRC signaling (e.g., RRC reconfiguration message) with the PBR for each logical channel. The UE may signal to the gNB, in the LTE-like UE Assistance Information message or LTE like V2X UE Information message, the list of V2X communication logical channels and one or more of the following:

One or more PBRs for the services or application data packets mapped to each of the logical channel, as specified in the NR V2X MO described herein;

One or more allowed RAT, the allowed RAT version, or the allowed transmission profiles, for the services or application data packets mapped to each logical channel, as specified in the NR V2X MO described herein;

One or more SCSs for the services or application data packets mapped to each the logical channel, as specified in the NR V2X MO described herein; and The priority of each logical channel.

In response, the gNB may signal to the UE the PBR of each logical channel.

The UE may assign a BSD to each logical channel from the BSD values associated with the services or application data packets mapped to the logical channel. The BSD of the logical channel may be for example, the highest BSD among the BSDs of the services or application data packets mapped to the logical channel, or the sum of the BSDs of the services or application data packets mapped to the logical channel. The BSD for each V2X service may be determined as provisioned in the NR V2X MO described herein. Alternatively, the UE may be configured by the gNB through common RRC signaling (e.g., system information broadcast signaling) or dedicated RRC signaling (e.g., RRC reconfiguration message) with the bucket size duration for each logical channel. The UE may signal to the gNB, in the LTE-like UE Assistance Information message or LTE like V2X UE Information message, the list of V2X communication logical channels, and one or more of the following:

One or more PBRs for the services or application data packets mapped to each logical channel, as specified in the NR V2X MO described herein;

One or more allowed RAT, the allowed RAT version, or the allowed transmission profiles, for the services or application data packets mapped to each of the logical channel, as specified in the NR V2X MO described herein;

One or more SCSs for the services or application data packets mapped to each logical channel, as specified in the NR V2X MO described herein; and The priority of each of the logical channel.

In response, the gNB may signal to the UE, the BSD of each logical channel.

The UE may assign a list of allowed SCSs to each logical channel. The list of allowed SCSs of the logical channel may be a common subset of the list of allowed SCSs for each V2X service mapped to the logical channel. The list of allowed SCSs for each V2X service may be determined as provisioned in the NR V2X MO described herein. Alternatively, the UE may be configured by the gNB through common RRC signaling (e.g. system information broadcast signaling) or dedicated RRC signaling (e.g. RRC reconfiguration message) with the list of allowed SCS for each logical channel. The UE may signal to the gNB, in the LTE-like UE Assistance Information message or the LTE like V2X UE Information message, the list of V2X communication logical channels together with one or more of the following:

One or more of the allowed SCSs for the services or application data packets mapped to each logical channel, as provisioned in the NR V2X MO described herein;

One or more of the allowed carrier frequencies of the services or application data packets mapped to the logical channels;

One or more delay budgets or the most restrictive packet delay budget of the services or application data packets mapped to each logical channel;

Priority of the logical channel, PPPP values, or the highest PPPP value of each service or application data packet mapped to the logical channel; and The PBR for one or more of the services or an application data packet mapped to the logical channel. In response, the gNB may signal, to the UE, one or more allowed SCSs associated with each logical channel.

The UE may assign a list of allowed RATs, allowed RAT versions, or allowed transmission profiles to each logical channel. The list of allowed RATs, allowed RAT versions, or allowed transmission profiles of the logical channel may be a common subset of the list of allowed RATs, allowed RAT versions, or allowed transmission profiles for each V2X service mapped to the logical channel. The list of allowed RATs, allowed RAT versions, or allowed transmission profiles for each V2X service may be determined as provisioned in the NR V2X MO described herein. Alternatively, the UE may be configured by the gNB through common RRC signaling (e.g. system information broadcast signaling) or dedicated RRC signaling (e.g. RRC reconfiguration message) with the list of allowed RATs, allowed RAT versions, or allowed transmission profiles for each logical channel. The UE may signal to the gNB, in the LTE-like UE Assistance Information message or the LTE like V2X UE Information message, the list of V2X communication logical channels together with one or more of the following:

One or more of the allowed carrier frequencies of the services or application data packets mapped to each logical channel;

One or more of the allowed RATs of the services or application data packets mapped to each logical channels as specified in the NR V2X MO described herein;

One or more delay budgets or the most restrictive packet delay budget of the services or application data packet mapped to each logical channel;

Priority of the logical channel or PPPP values or the highest PPPP value of the services or application data packets mapped to each logical channel; and The PBR for one or more services or an application data packet mapped to each logical channel.

In response, the gNB may signal to the UE, one or more allowed RATs, allowed RAT versions, or allowed transmission profiles associated with each logical channel.

The UE may assign a maximum allowed latency to each logical channel. The UE may derive the allowed latency for each logical channel from the packet delay budget of the services or application data packets mapped to the logical channel. For example, the UE may use the most restrictive delay budget, e.g., the smallest delay budget among the delay budgets of the services or application data packets mapped to the logical channel to derive the allowed latency of the logical channel. The delay budgets of the services or application data packets mapped to the logical channel may be determined from provisioning as specified in the NR V2X MO described herein. Alternatively, the UE may be configured by the gNB through common RRC signaling (e.g., system information broadcast signaling) or dedicated RRC signaling (e.g., RRC reconfiguration message) with allowed latency. The UE may signal to the gNB, in the LTE-like UE Assistance Information message or the LTE like V2X UE Information message, the list of V2X communication logical channels together with one or more of the following:

One or more of the allowed PDBs or the most restrictive PDB for the services or application data packets mapped to each logical channels as provisioned in the NR V2X MO described herein;

Priority of the logical channel, one or more PPPP values, or the PPPP of the highest priority (e.g., the smallest PPPP value) of the service or application data packets mapped to each logical channel. In response, the gNB may signal to the UE, the allowed latency for each logical channel. Instead of latency as a sidelink QoS characteristic, any other sidelink QoS characteristics, including but not limited to: a QoS flow, a transmission range, reliability, a PQI, or a priority may be used.

The UE may assign a maximum allowed SL-SCH duration to each logical channel. The UE may derive the allowed SL-SCH duration for each logical channel from the packet delay budget of the services or application data packets mapped to the logical channel. For example, the UE may use the most restrictive delay budget, which may be the smallest delay budget among the delay budgets of the services or application data packets mapped to the logical channel, to derive the allowed SL-SCH duration of the logical channel. The delay budgets of the services or application data packets mapped to a logical channel may be determined from provisioning as specified in the NR V2X MO described herein. Alternatively, the UE may be configured by the gNB through common RRC signaling (e.g., system information broadcast signaling) or dedicated RRC signaling (e.g., RRC reconfiguration message) with allowed latency. The UE may signal to the gNB, in the LTE-like UE Assistance Information message or the LTE like V2X UE Information message, the list of V2X communication logical channels, together with one or more of the following:

One or more of the allowed PDBs or the most restrictive PDB for the services or application data packets mapped to each logical channel as provisioned in the NR V2X MO described herein;

Priority of the logical channel, one or more PPPP values, or the PPPP of highest priority (e.g. smallest PPPP value) of the service or application data packets mapped to each logical channel; and One or more of the allowed SCSs for the services or application data packets mapped to each logical channel as provisioned in the NR V2X MO described herein.

In response, the gNB may signal to the UE, the allowed latency for each logical channel.

The UE may assign a list of allowed V2X serving carrier frequencies to each logical channel. The list of allowed carrier frequencies of the logical channel may be a common subset of the list of the list of allowed carrier frequencies of each V2X service mapped to the logical channel. The list of allowed carrier frequencies for each V2X service may be determined as provisioned in the NR V2X MO described herein. Alternatively, the UE may be configured by the gNB through common RRC signaling (e.g., system information broadcast signaling) or dedicated RRC signaling (e.g., RRC reconfiguration message) with the list of allowed carrier frequencies for each logical channel. The UE may signal to the gNB, in the LTE-like UE Assistance Information message or LTE like V2X UE Information message, the list of V2X communication logical channels, together with one or more of the following:

One or more of the allowed carrier frequencies of the services or application data packets mapped to each logical channel;

One or more of the allowed RATs of the services or application data packets mapped to each logical channel as specified in the NR V2X MO described herein;

One or more delay budgets or the most restrictive packet delay budget of the services or application data packet mapped to each logical channel;

Priority of the logical channel, PPPP values, or the highest PPPP value of the services or application data packets mapped to each logical channel; and The PBR for one or more of the services or an application data packet mapped to each logical channel.

In response, the gNB may signal to the UE, one or more allowed carrier frequencies associated with each logical channel.

The UE may assign a list of allowed BWP to each logical channel. The list of allowed BWPs of the logical channel may be a common subset of the list of the list of allowed BWPs of each V2X service mapped to the logical channel. The list of allowed BWPs for each V2X service may be determined as provisioned in the NR V2X MO. Alternatively, the UE may be configured by the gNB through common RRC signaling (e.g., system information broadcast signaling) or dedicated RRC signaling (e.g., RRC reconfiguration message) with the list of allowed BWPs for each logical channel. The UE may signal to the gNB, in the LTE-like UE Assistance Information message or LTE like V2X UE Information message, the list of V2X communication logical channels, together with one or more of the following:

One or more of the allowed BWPs of the services or application data packets mapped to each logical channel;

One or more of the allowed carrier frequencies of the services or application data packets mapped to each logical channel;

One or more of the allowed RATs of the services or application data packets mapped to each logical channel as specified in the NR V2X MO described herein;

One or more delay budget or the most restrictive packet delay budget of the services or application data packet mapped to each logical channel;

Priority of the logical channel, PPPP values, or the highest PPPP value of the services or application data packets mapped to each logical channel; and The PBR for one or more of the services or an application data packet mapped to each logical channel.

In response, the gNB may signal to the UE, one or more allowed carrier frequencies associated with each logical channel.

The UE may assign a transmission mode to a logical channel. The mapping may be a one-to-one mapping, or more than one transmission mode may be mapped to one logical channel. The UE may use one or more of the logical channel derivation parameters described herein in determining the mapping of transmission mode to logical channel. Alternatively, the UE may be configured by the gNB through RRC signaling (e.g. system information broadcast signaling) or dedicated RRC signaling (e.g., an RRC reconfiguration message) with the mapping of transmission mode to logical channel. The UE may signal to the gNB, in the LTE-like UE Assistance Information message or LTE like V2X UE Information message, one or more of the logical channel derivation parameters described above, to assist the gNB is configuring UE with the mapping between transmission mode and logical channels. The base station may configure the UE with a mapping of V2X services to LCHs or in other words with a mapping of services to QoS Flows, a mapping of QoS Flows to Bearers, and a mapping of bearers to LCHs, thereby configuring transmission mode to service, QoS Flow, or bearer. Base station as used herein may refer to a scheduler or any other RAN network node or core network node. Alternative embodiments may be derived by substituting transmission mode with transmission range or resource allocation mode.

The LTE-like UE Assistance Information message or LTE like V2X UE Information message referred to herein may additionally include one or more of the following:

A list of PC5 Flow Identifiers (PFI);
A list of PC5 QoS Profile identifier (PQI);
Transmission range for a PFI or a PQI;
Transmission mode for PFI or a PQI;
Transmission resource allocation mode for a PFI or a PQI;
One or more QoS requirements such as priority requirement, reliability requirement, delay requirement, range requirement, transmission mode requirement, resource type e.g., guaranteed bit rate (GBR), delay-critical GBR, or non-GBR, guaranteed flow bite rate, maximum flow bite rate;
Mapping of transmission modes (unicast, groupcast or broadcast) and the V2X services e.g., PSID or ITS-AIDs of the V2X application;
Mapping of PC5 QoS Identifier (PQIs) and the V2X services;
Mapping of a transmission range and the V2X services (e.g., PSID or ITS-AIDs);
Allowed PC5 QoS rules where each QoS rule comprises the QFI of the associated QoS Flow, a packet filter set, and a precedence value;
Mapping of PFIs (QoS Flow Identifier) and PQIs, a mapping of PQIs and logical channels, a mapping of QFI and sidelink bearers, a mapping of PQIs to QoS characteristics, e.g. QoS Profiles, or a mapping of resource allocation modes and logical channel or mapping of resource allocation mode and QoS Flow.

The logical channel derivation parameters described above may also include any of the parameters described above.

Figure 16:
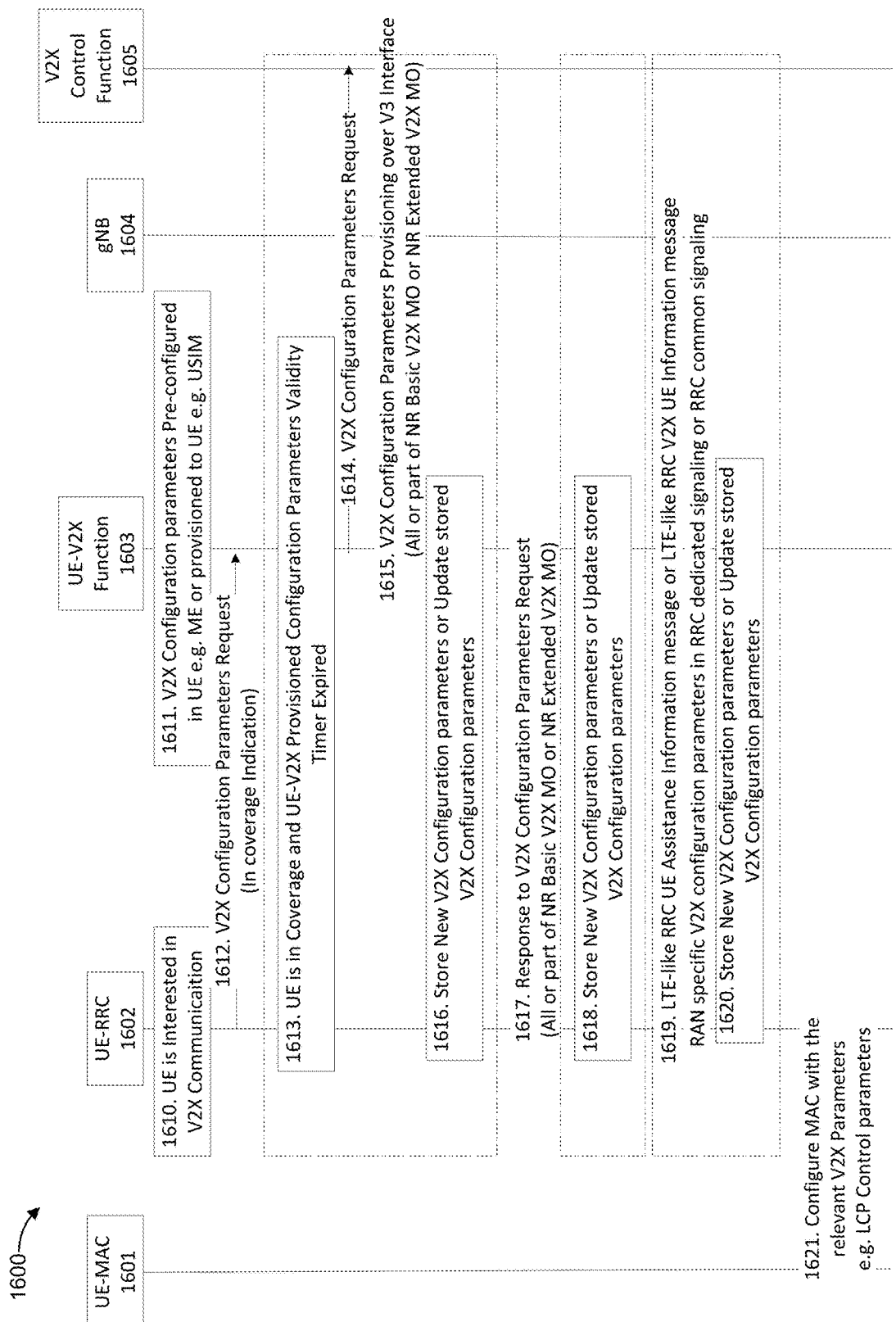
FIG. 16 is a diagram of a procedure for configuring the MAC with V2X configuration parameters.

FIG. 16 depicts a procedure for configuring the MAC with V2X configuration parameters 1600, which may be used in combination with any of the embodiments described herein. At step 1610, the UE-RRC may signal that the UE is interested in V2X communication. At step 1611, the UE-V2X function 1603 may pre-configure or provision in the UE V2X configuration parameters. At step 1612, the UE-RRC 1602 may send a V2X configuration parameters request with an in coverage indication to the UE-V2X function 1603. At step 1613, the UE-RRC 1602 and the UE-V2X function 1603 may determine that the UE is in coverage and the UE-V2 provisioned configuration parameters validity timer expired. At step 1614, the UE-V2X function may send a V2X configuration parameters request to the V2X control function 1605 via the gNB 1604. At step 1615, the V2X configuration parameters may be provisioned over the V3 interface (all or part of the NR basic V2X MO or NR extended V2XX MO). At step 1616, the UE-RRC 1602 and the UE-V2X function 1603 may store new V2X configuration parameters or update the stored V2X configuration parameters. At step 1617, a response to the V2X configuration parameters request may be received (all or part of the NR basic V2X MO or NR extended V2X MO). At step 1618, the UE-RRC 1602 and the UE-V2X function 1603 may store new V2X configuration parameters or update the stored V2X configuration parameters. At step 1619, the UE may signal to the gNB 1604 an LTE-like UE Assistance Information message or the LTE like V2X UE Information message with RAN specific V2X configuration parameters in RRC dedicated signaling or RRC common signaling. At step 1620, the UE-RRC 1602 and the UE-V2X function 1603 may store new V2X configuration parameters or update the stored V2X configuration parameters. At step 1621, the UE-MAC 1601 may be configured with relevant V2X parameters and LCP control parameters.

The UE may receive a sidelink transmission resource grant from the base station for a new sidelink transmission. The received sidelink resource grant may be a scheduled resource grant, wherein the sidelink resource grant is assigned to the UE via physical layer (PHY) signaling such as the PHY Sidelink Control Information (SCI) when the scheduling is performed over the sidelink interface, or the PHY Downlink Control Information (DCI) when the scheduling is performed over the Uu interface. Alternatively, the received sidelink resource grant may be a configured resource grant for example, a type 1-like resource grant or a type 2-like resource grant where type 1 resource grant and type 2 resource grant are as per the current definition of type 1 resource grant and type 2 resource grant in NR release 15. In another alternative, the received sidelink resource grant may be a sidelink resource grant autonomously selected by the UE from a resource pool (pre)configured into the UE by the network, e.g. the base station. In another embodiment, the received resource grant may be allocated according to the so-called resource allocation mode 1 or mode 2, more specifically mode 2d as being discussed in the context of release 16 NR.

When a new sidelink transmission is performed, the MAC entity may use one or more of the following conditions to determine the sidelink logical channels that are allowed to be served by the sidelink grant:

The set of allowed V2X serving cells of the sidelink logical channel, if configured, includes the cell information associated with the sidelink grant;

The set of allowed SCSs of the sidelink logical channel, if configured, includes the SCS associated with the sidelink grant;

The allowed latency of the sidelink logical channel, if configured, may be larger than or equal to the allowed latency associated with the sidelink grant;

The allowed SL-SCH duration of the sidelink logical channel, if configured, may be larger or equal to the SL-SCH duration associated with the sidelink grant;

The allowed SL-SCH K2 duration of the sidelink logical channel, if configured, may be larger or equal to the SL-SCH duration associated with the sidelink grant;

The set of allowed RATs of the sidelink logical channel, if configured, may include the RAT associated with the grant;

The set of allowed RAT versions of the sidelink logical channel, if configured, may include the RAT version associated with the sidelink grant;

The set of allowed BWPs of the sidelink logical channel, if configured may include the BWP associated with the sidelink grant;

The set of allowed transmission profiles of the sidelink logical channel, if configured, may include the transmission profile associated with the sidelink grant;

The allowed transmission mode of the sidelink logical channel, if configured, may include the transmission mode associated with the sidelink grant;

The allowed transmission range of the sidelink logical channel, if configured, may include the transmission range associated with the sidelink grant; and The allowed resource allocation mode of the sidelink logical channel, if configured, may indicate the resource allocation mode used for the resource grant.

The sidelink logical channels selected as per the mapping restrictions to sidelink logical channel grant as specified above, may be referred to as "selected sidelink logical channels."

When a new transmission is performed, the MAC entity may allocate resources to only the selected sidelink logical channels.

For the purpose of the selection of the V2X transmission destination as part of the logical channel selection procedure, the term "selected sidelink logical channel" may be used as described above, e.g. in reference to the sidelink logical channel selected as being allowed to be served by the sidelink resource grant, which may comprise the sidelink logical channel that fulfills the mapping restrictions to sidelink resource grant described above.

Selection of Destination is described herein in accordance with another embodiment, which may be used in combination with any of the embodiments described herein. In a first transmission destination selection method, the MAC entity may, when a new transmission is performed, select a ProSe Destination, e.g. a transmission destination having the selected sidelink logical channel with the highest priority among the selected sidelink logical channels having data available for transmission. Selected sidelink logical channels, as defined in the selection of logical channel solutions described herein, with same destination ID and having data available for transmission, may be multiplexed and assembled into one PDU.

When the UE supports multiple transmission chains, it may simultaneously transmit to multiple destinations. The UE selects the Prose destinations, one ProSe destination per transmission chain, in decreasing order of priority of the transmission destination. The priority of a transmission destination is the priority of the selected sidelink logical channel with the highest priority among the selected logical channels of that destination and having data available for transmission. The destination selected by the destination selection procedure may be denoted herein as a "selected destination."

Figure 17:
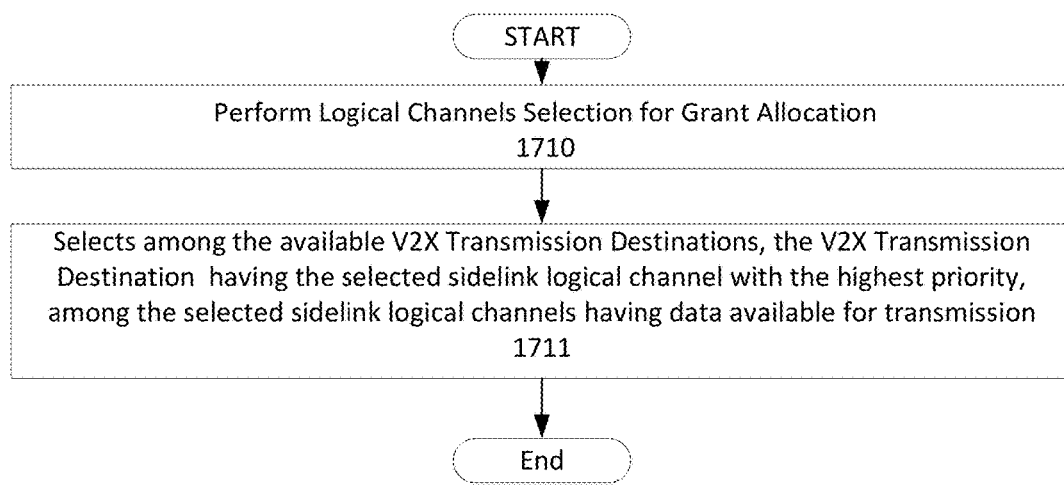
FIG. 17 is a diagram of a procedure for selection of a transmission destination in the case of a single transmission chain.

FIG. 17 depicts a V2X transmission destination selection procedure for a single transmission chain 1700. At step 1710, logical channel selection for grant allocation may be performed. At step 1711, a V2X transmission destination may be selected, among the available V2X transmission destinations, that has the selected logical channel having data available for transmission.

Figure 18:
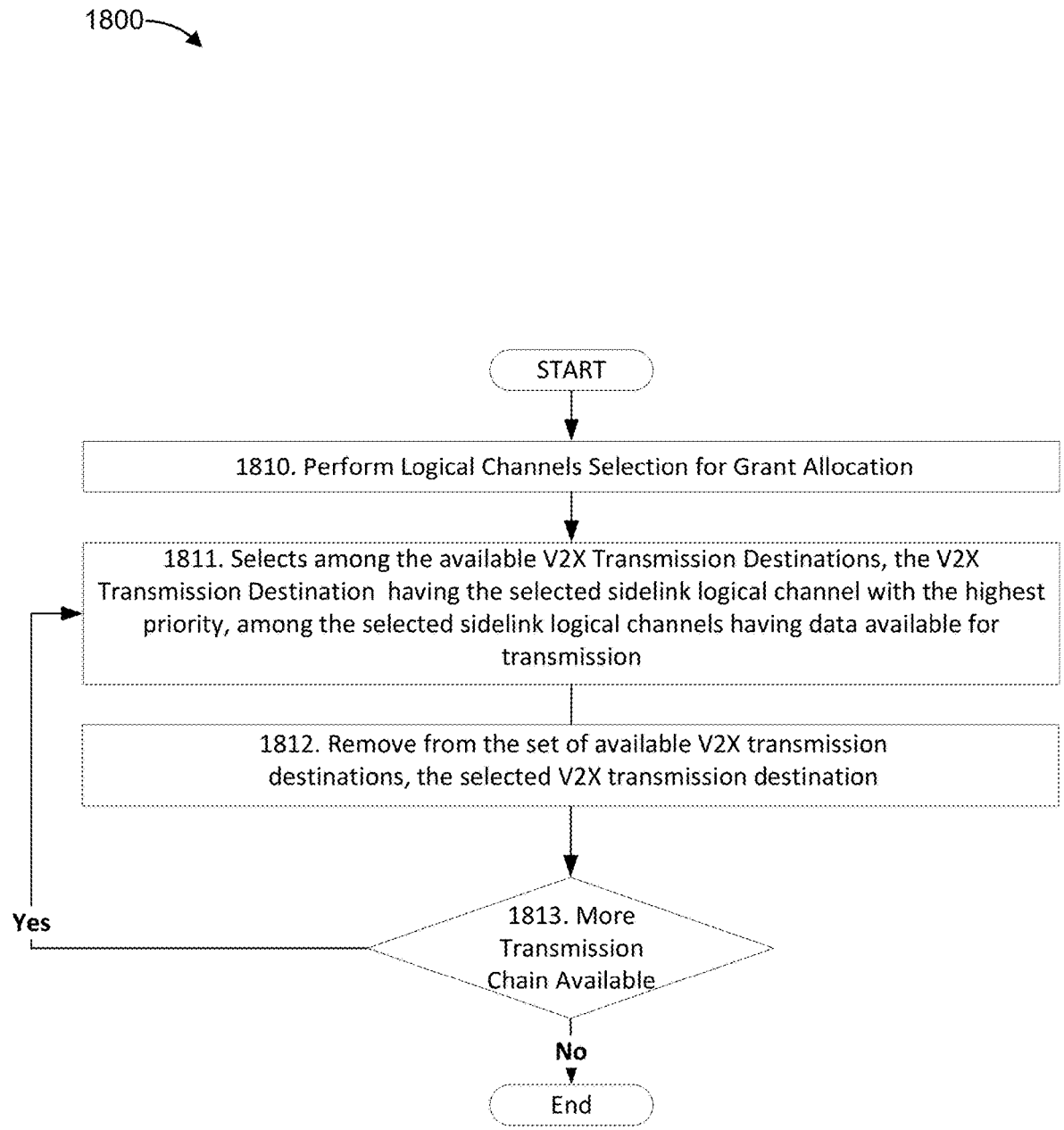
FIG. 18 is a diagram of a procedure for selection of a transmission destination in the case of multiple transmission chains.

FIG. 18 depicts a V2X transmission destination selection procedure for multiple transmission chains 1800. At step 1810, logical channel selection for grant allocation may be performed. At step 1811, a V2X transmission destination may be selected, among the available V2X transmission destinations, that has the selected logical channel having data available for transmission. At step 1812, the selected V2X transmission destination may be removed from the set of available V2X transmission destinations. At step 1813, it may be determined whether there are more transmission chains available, and if there are more transmission chains available, step 1811 is repeated.

The transmission mode may comprise broadcast, groupcast, or unicast. Transmission mode priority may be (pre) configured into the UE or specified. For example, a broadcast transmission may have a higher priority over a groupcast transmission, which may have a higher priority over a unicast transmission.

In an alternative transmission destination selection method, the MAC entity may, when a new transmission is performed, select a ProSe destination, e.g. a transmission destination having the selected sidelink logical channel with the highest priority among the selected sidelink logical channels having data available for transmission. In the case of a tie, for example, when more than one transmission destination having the highest priority selected logical channel with available data for transmission, the UE may select the transmission destination according to one of the following:

The destination among the tie-up destinations, having the highest selected priority logical channels among the selected logical channels having data available for transmission with the highest transmission mode priority. In other words, among the tie-up destinations, the selected logical channels having data for transmission with the highest transmission mode priority are identified. The transmission destination may then be selected as the destination that corresponds to the highest priority logical channel among the logical channels determined to have an available data transmission with the highest transmission mode.

The destination among the tie-up destinations, having the highest selected priority logical channel having data available for transmission with the higher transmission mode priority. In other words, among the tie-up destinations, the selected destination is the one whose selected highest priority channel with available data for transmission has a higher transmission mode.

The term "selected logical channel" may be used as described above in reference to sidelink logical channel selected as allowed to be served by the sidelink resource grant, which may comprise the sidelink logical channel that may fulfil the mapping restrictions to sidelink resource grant described above.

In another alternative transmission destination selection method, the UE may select the transmission destination having a logical channel with data available for transmission with the highest transmission mode priority and that fulfils the mapping restrictions of a logical channel to resources grant described above. In the case of a tie, the UE may select among the tie-up transmission destinations according to one of the following:

The destination having the highest priority logical channel that has data available for transmission with the highest transmission mode priority and fulfils the mapping restrictions of logical channel to resources grant described above.

The destination having the highest priority logical channel that has data available for transmission and may fulfil the mapping restrictions of a logical channel to resources grant described above.

In yet another alternative transmission destination selection method, the UE may select the transmission destination having the highest priority logical channel with data available for transmission with the highest transmission mode priority and may fulfil the mapping restrictions of logical channel to resources grant described above.

One or more of the alternative procedures may be used for resource allocation during a sidelink LCP procedure.

Figure 19:
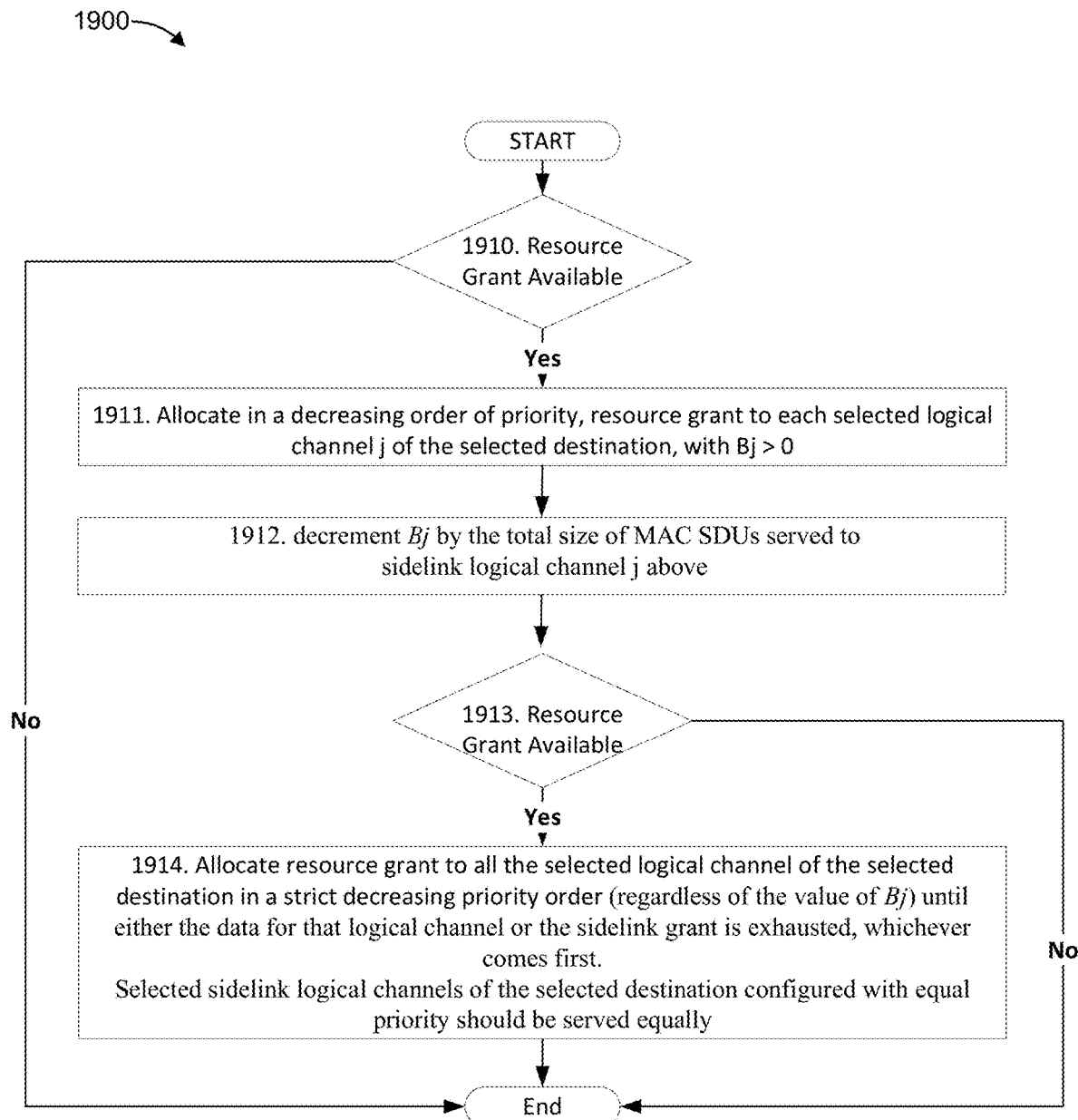
FIG. 19 is a diagram of one example resource allocation procedure during a NR V2X sidelink logical channel prioritization procedure.

FIG. 19 depicts one example resource allocation procedure 1900 during an NR V2X sidelink LCP procedure in accordance with one embodiment, which may be used in combination with any of the embodiments described herein. The entity may, when a new transmission is performed, allocate resources based on the procedure 1900.

At step 1910, it may be determined if there is a resource grant available. At step 1911, selected sidelink logical channels, LCHj with Bj>0, of the selected destination may be allocated resources in a decreasing priority order, wherein the selected logical channel and selected destination are as defined in the selection of logical channel solutions and in the selection of destination solutions described herein, respectively. If the PBR of a selected logical channel of the selected destination is set to "infinity", the MAC entity may allocate resources for all the data that is available for transmission on the selected sidelink logical channel before meeting the PBR of the lower priority selected sidelink logical channel(s). At step 1912, Bj may be decremented by the total size of MAC SDUs served to sidelink logical channel j above.

At step 1913, it may be determined if there is a resource grant available. At step 1914, if any resource grants remain, all the selected sidelink logical channels of the selected destination may be served in a strict decreasing priority order (regardless of the value of Bj) until either the data for that logical channel or the sidelink grant is exhausted, whichever comes first. Selected sidelink logical channels of the selected destination configured with equal priority may be served equally.

Figure 20:
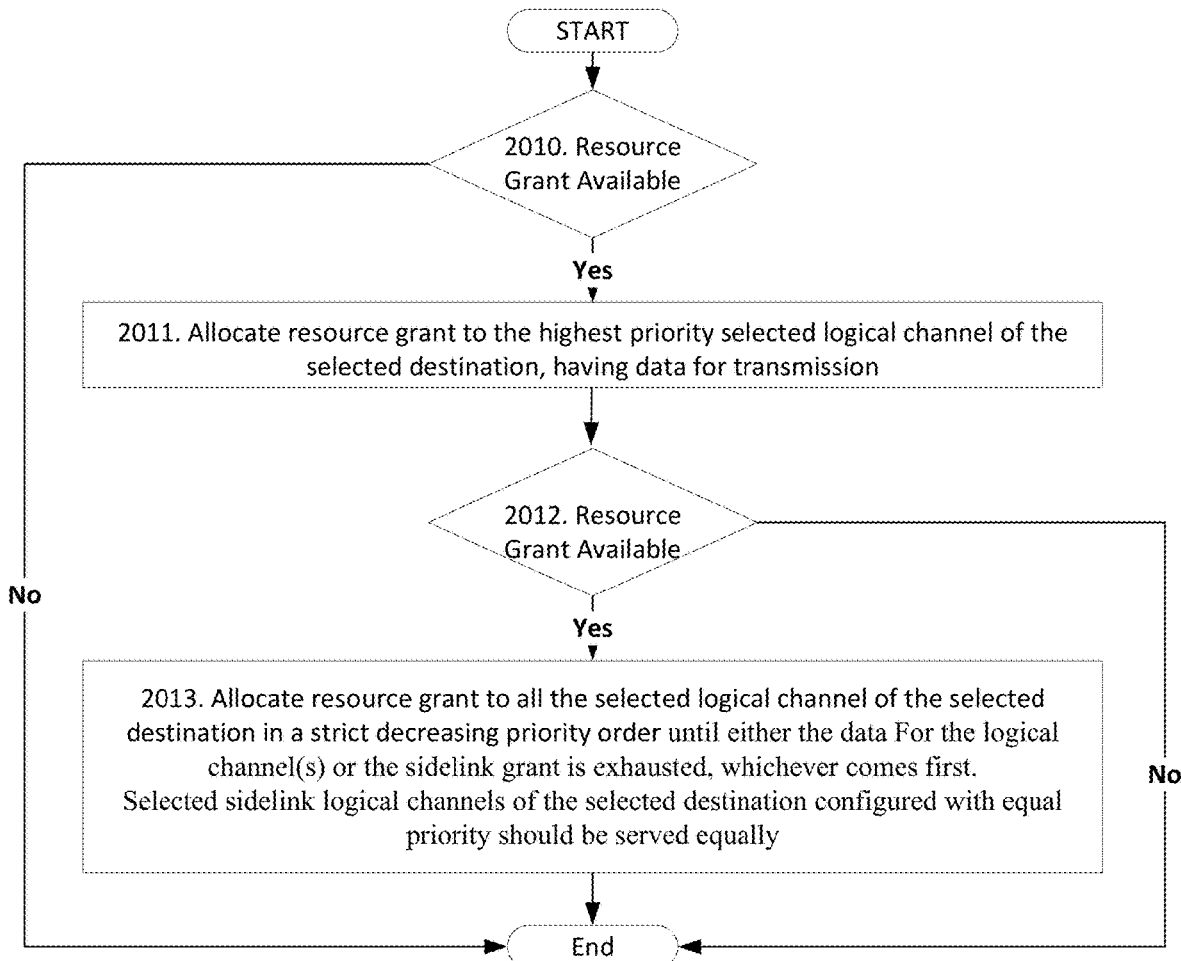
FIG. 20 is a diagram of another example resource allocation procedure during a NR V2X sidelink logical channel prioritization procedure.

FIG. 20 depicts another example resource allocation procedure 2000 during an NR V2X sidelink LCP procedure in accordance with another embodiment, which may be used in combination with any of the embodiments described herein. The entity may, when a new transmission is performed, allocate resources to the logical channel based on the procedure 2000. At step 2010, it may be determined if there is a resource grant available. At step 2011, resources may be allocated to the highest priority selected sidelink logical channel of the selected destination and having data for transmission, wherein the selected logical channel and the selected destination are as defined in the selection of logical channel solutions and in the selection of destination solutions described herein respectively. At step 2012, it may be determined if there is a resource grant available. At step 2013, if any resources remain, selected sidelink logical channels belonging to the selected destination may be served in a strict decreasing priority order until either the data for the selected sidelink logical channel(s) or the sidelink grant is exhausted, whichever comes first. Selected sidelink logical channels of the selected destination, configured with equal priority may be served equally.

Figure 21:
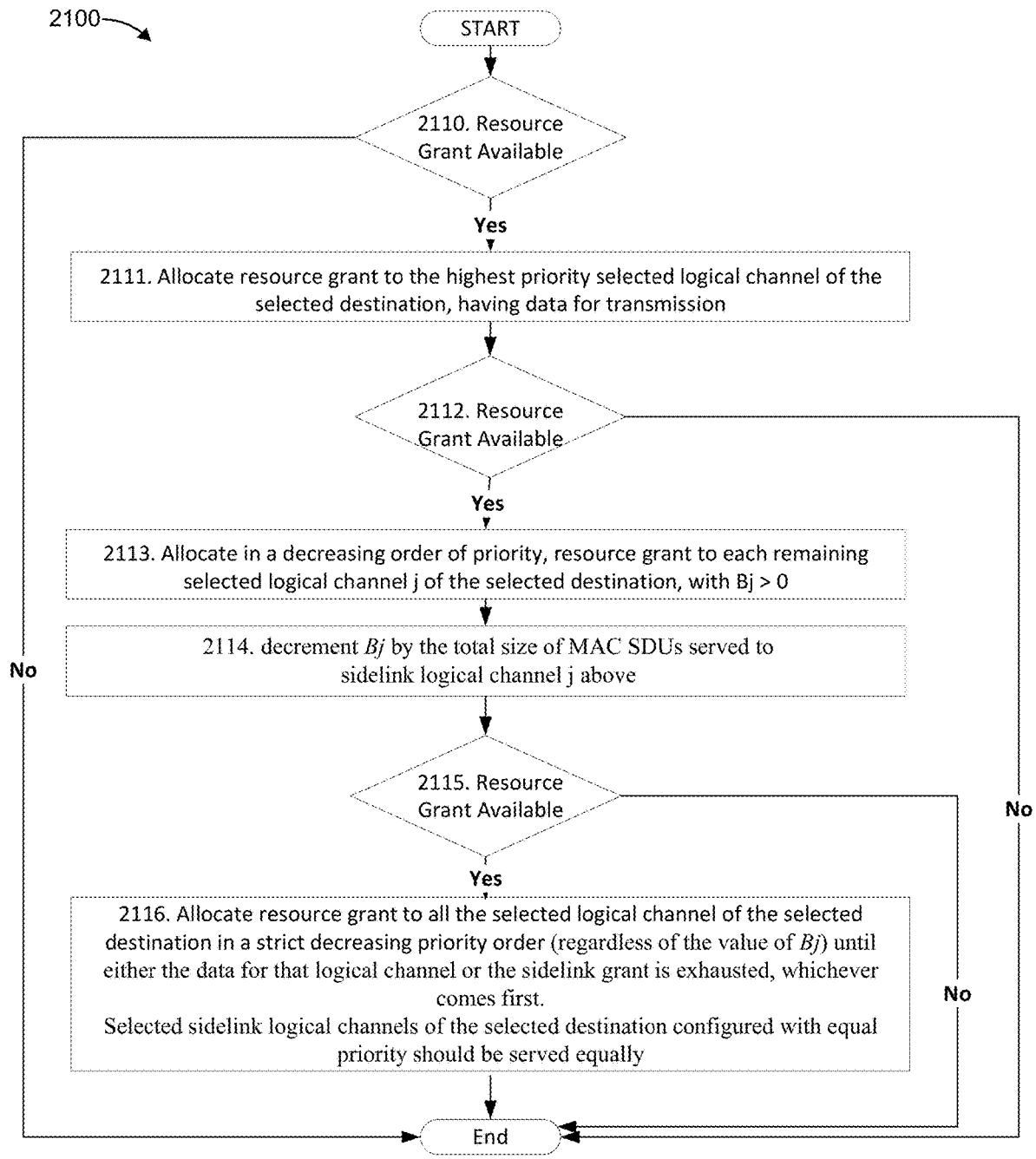
FIG. 21 is a diagram of another example resource allocation procedure during a NR V2X sidelink logical channel prioritization procedure.

FIG. 21 depicts yet another example resource allocation procedure 2100 during a NR V2X sidelink LCP procedure in accordance with another embodiment, which may be used in combination with any of the embodiments described herein. The entity may, when a new transmission is performed, allocate resources to the logical channel based on procedure 2100. At step 2110, it may be determined if there is a resource grant available. At step 2111, resources may be allocated to the highest priority selected sidelink logical channel of the selected destination and having data for transmission, wherein the selected logical channel and selected destination are as defined in the selection of logical channel solutions and in the selection of destination solutions described herein respectively. At step 2112, it may be determined if there is a resource grant available. At step 2113, if any resources remain, selected sidelink logical channels, LCHj with Bj>0, of the selected destination, may be allocated resources in a decreasing priority order, wherein the selected logical channel and selected destination are as defined in the selection of logical channel solutions and in the selection of destination solutions described herein respectively. If the PBR of a selected sidelink logical channel of the selected destination is set to "infinity", the MAC entity may allocate resources for all the data that is available for transmission on the sidelink logical channel before serving a lower priority selected sidelink logical channel(s).

At step 2114, Bj may be decremented by the total size of MAC SDUs served to sidelink logical channel j above. At step 2115, it may be determined if there is a resource grant available. At step 2116, if any resources remain, all the selected sidelink logical channels of the selected destination may be served in a strict decreasing priority order (regardless of the value of Bj) until either the data for that logical channel or the UL grant is exhausted, whichever comes first. Selected sidelink logical channels of the selected destination configured with equal priority may be served equally.

Solutions for Uplink Data Logical Channel Prioritization are described herein in accordance with another embodiment, which may be used in combination with any of the embodiments described herein. This solution is related to impacts of sidelink related transmission on NR uplink data logical channel prioritization procedure e.g. logical channel prioritization procedure over NR Uu interface.

In Rel-15 LTE, a non-padding BSR is prioritized over non-padding sidelink BSR, which is prioritized over data from any Logical Channel, except data from UL-CCCH. Similarly, in Rel-15 NR, a non-padding BSR is prioritized over data from any Logical Channel, except data from UL-CCCH. With the introduction of NR V2X, the prioritization of a non-padding BSR versus sidelink BSR may follow the same prioritization order between uplink transmission and sidelink transmission, e.g. if sidelink transmission is prioritized over uplink transmission then the corresponding sidelink BSR may be prioritized over the corresponding uplink transmission BSR. Specifically, the non-padding V2X sidelink BSR may be prioritized over non-padding BSR, if the following conditions are met:

(1) if UL data contributing to the BSR are not prioritized by upper layer over sidelink data contribution to the sidelink BSR; and (2) if the value of the highest priority of the sidelink logical channel(s) for the sidelink data contributing to the sidelink BSR is lower than the sidelink transmission prioritization threshold value (thresSL-TxPrioritization), if this value is configured.

The second of the conditions above assumes an absolute V2X sidelink threshold for the prioritization of sidelink communication over non-emergency uplink communication regardless of the priority of the uplink communication. As described above, this condition may not be sufficient for the prioritization of NR V2X sideline communications versus uplink transmissions. Therefore, in accordance with one embodiment, the priority of the uplink transmission may also used in the prioritization of the V2X sidelink transmission over the uplink transmission. Therefore, examples of alternatives to the second condition above may include the following:

(1) if the value of the highest priority of the sidelink logical channel(s) for the sidelink data contributing to the sidelink BSR is lower than the value of the highest priority of the logical channel(s) for the UL data contributing to the BSR.

(2) if the value of the highest priority of the sidelink logical channel(s) for the sidelink data contributing to the sidelink BSR is lower than the sidelink transmission prioritization threshold value (thresSL-TxPrioritization), if this value is configured, and the value of the highest priority of the sidelink logical channel(s) for the sidelink data contributing to the sidelink BSR is lower than the value of the highest priority of the logical channel(s) for the UL data contributing to the BSR. The priority threshold parameter (thresSL-TxPrioritization) may be used to indicate the threshold used to determine whether SL V2X transmission is prioritized over uplink transmission if they overlap in time. It may be pre-configured into the UE, or configured into the UE through RRC dedicated signaling RRC common signaling for example RRC broadcast signaling.

(3) if the value of the highest priority of the sidelink logical channel(s) for the sidelink data contributing to the sidelink BSR is lower than the sidelink transmission prioritization threshold value (thresSL-TxPrioritization), if this value is configured, and the value of the highest priority of the logical channel(s) for the UL data contributing to the BSR, is higher than the uplink transmission down-prioritization threshold value (thresUL-TxPriortization), if this value is configured. The priority threshold parameter thresUL-TxPrioritization may be used to indicate the threshold used to determine whether UL transmission is down prioritized over sidelink communication, if they overlap in time. It may be pre-configured into the UE, or configured into the UE through RRC dedicated signaling RRC common signaling for example RRC broadcast signaling.

(4) if the value of the highest priority of the sidelink logical channel(s) for the sidelink data contributing to the sidelink BSR is lower than the sidelink transmission prioritization threshold value (thresSL-TxPrioritization), if this value is configured, and the value of the highest priority of the logical channel(s) for the UL data contributing to the BSR, is higher than the uplink transmission down-prioritization threshold value (thresUL-TxPriortization), if this value is configured, and the value of the highest priority of the sidelink logical channel(s) for the sidelink data contributing to the sidelink BSR is lower than the value of the highest priority of the logical channel(s) for the UL data contributing to the BSR.

Solutions for sidelink Data Versus Uplink Data Prioritization are described herein in accordance with another embodiment, which may be used in combination with any of the embodiments described herein. As described above, in the legacy LTE V2X, the transmission of V2X sidelink communication is prioritized over uplink transmission if the following conditions are met:

(1) if the MAC entity is not able to perform uplink transmissions and transmissions of V2X sidelink communication simultaneously at the time of the transmission; and (2) if uplink transmission is not prioritized by upper layer; and (3) if the value of the highest priority of the sidelink logical channel(s) in the MAC PDU is lower than the sidelink transmission prioritization threshold value (thresSL-TxPrioritization), if this value is configured.

The third of the three conditions above assumes an absolute V2X sidelink threshold for the prioritization of sidelink communication over non-emergency uplink communication regardless of the priority of the uplink communication. As described above, this third condition may not be sufficient for the prioritization of NR V2X sidelink communications versus uplink transmissions. Therefore, in accordance with one embodiment, the priority of the uplink transmission may also be used in the prioritization of the V2X sidelink transmission over the uplink transmission by replacing this third condition with one of the following alternatives:

(1) if the priority value of V2X sidelink transmission is lower than the priority value of the uplink transmission. While this criterion may be used for all sidelink transmission modes, this criterion may be specifically used for example in the case of unicast transmission.

(2) if the priority value of the V2X sidelink transmission is lower than the sidelink transmission prioritization threshold value (thresSL-TxPrioritization), if this value is configured, and the priority value of V2X sidelink transmission is lower than the priority value of the uplink transmission. The priority threshold parameter thresSL-TxPrioritization may be used to indicate the threshold used to determine whether SL V2X transmission is prioritized over uplink transmission if they overlap in time. It may be pre-configured into the UE, or configured into the UE through RRC dedicated signaling RRC common signaling for example RRC broadcast signaling. While this criterion may be used for all sidelink transmission modes, this criterion may be specifically used for broadcast transmission or groupcast transmission.

(3) if the priority value of the V2X sidelink communication is lower than the sidelink transmission prioritization threshold value (thresSL-TxPrioritization), if this value is configured, and the priority value of the uplink transmission is higher than the uplink transmission down-prioritization threshold value (thresUL-TxPriortization), if this value is configured. The priority threshold parameter thresUL-TxPrioritization may be used to indicate the threshold used to determine whether UL transmission is down prioritized over sidelink communication, if they overlap in time. It may be pre-configured in the UE, or configured in the UE through RRC dedicated signaling RRC common signaling for example RRC broadcast signaling. While this criterion may be used for all sidelink transmission modes, this criterion may be specifically used for broadcast transmission or groupcast transmission.

(4) if the priority value of the V2X sidelink transmission is lower than the sidelink transmission prioritization threshold value (thresSL-TxPrioritization), if this value is configured, and the priority value of the uplink transmission is higher than the uplink transmission down-prioritization threshold value (thresUL-TxPriortization), if this value is configured, and the priority value of V2X sidelink transmission is lower than the priority value of the uplink transmission. While this criterion may be used for all sidelink transmission modes, this criterion may be specifically used for broadcast transmission or groupcast transmission.

In the above, the priority value of a V2X sidelink transmission may be the value of the highest priority of the sidelink logical channel(s) in the MAC PDU. Similarly, the priority value of an uplink transmission may be the value of the highest priority of the uplink logical channel(s) in the MAC PDU. The lower the priority value of a logical channel, the higher the priority of the logical channel may be. Similarly, the lower the priority value of a transmission, the higher the priority of the transmission may be.

(5) if the value of the highest priority of the sidelink logical channel(s) in the MAC PDU is lower than the sidelink transmission prioritization threshold value (thresSL-TxPrioritization), if this value is configured, wherein the parameter thresSL-TxPrioritization may be (pre) configured into the UE specific to each sidelink transmission destination, or specific to each transmission mode or specific to each sidelink transmission destination and transmission mode. The V2X sidelink transmission PPPR or the uplink transmission PPPR may also be taken into account by the UE in deciding on prioritizing V2X sidelink transmission versus uplink transmission. Similarly, the amount of radio resource at risk of being lost if one transmission is prioritized over the other may be taken into account by the UE in deciding on prioritizing V2X sidelink transmission versus uplink transmission. For example, the third condition above, may be modified as follows:

(1) if the priority value of V2X sidelink transmission is lower than the priority value of the uplink transmission. In the case of equal priority, the V2X sidelink communication may be prioritized if its PPPR value is higher than the PPPR value of the uplink transmission, or alternatively, in the case of equal priority, the V2X sidelink communication may be prioritized if the amount of resource grant for its transmission is higher than the amount of resource transmission for the uplink transmission. While this criterion may be used for all sidelink transmission modes, this criterion may be specifically used for example in the case of unicast transmission.

(2) if the priority value of the V2X sidelink transmission is lower than the sidelink transmission prioritization threshold value (thresSL-TxPrioritization), if this value is configured, and the priority value of V2X sidelink transmission is lower than the priority value of the uplink transmission. In case of equal priority between V2X sidelink communication priority and uplink transmission priority, the V2X sidelink communication may be prioritized if its PPPR value is higher than the PPPR value of the uplink transmission, or alternatively, in the case of equal priority, the V2X sidelink communication may be prioritized if the amount of resource grant for its transmission is higher than the amount of resource transmission for the uplink transmission. While this criterion may be used for all sidelink transmission modes, this criterion may be specifically used for broadcast transmission or groupcast transmission.

(3) if the priority value of the V2X sidelink transmission is lower than the sidelink transmission prioritization threshold value (thresSL-TxPrioritization), if this value is configured, and the priority value of the uplink transmission is higher than the uplink transmission down-prioritization threshold value (thresUL-TxPriortization), if this value is configured, and the priority value of V2X sidelink transmission is lower than the priority value of the uplink transmission. In case of equal priority between V2X sidelink communication priority and uplink transmission priority, the V2X sidelink communication may be prioritized if its PPPR value is higher than the PPPR value of the uplink transmission, or alternatively, in the case of equal priority, the V2X sidelink communication may be prioritized if the amount of resource grant for its transmission is higher than the amount of resource transmission for the uplink transmission. While this criterion may be used for all sidelink transmission modes, this criterion may be specifically used for broadcast transmission or groupcast transmission.

In the above, the PPPR value of a V2X sidelink transmission is the value of the highest PPPR value of the sidelink logical channel(s) in the MAC PDU. Similarly, the reliability value of an uplink transmission is the value of the highest PPPR value of the uplink logical channel(s) in the MAC PDU. The higher the PPPR value of a logical channel, the higher the reliability requirement of the logical channel may be. Similarly, the higher the PPPR value of a transmission, the higher the reliability requirement of the transmission may be.

As discussed above with respect to the embodiments described herein for UL LCP, the BSR with the exception of BSR included for padding as well as the sidelink BSR with the exception of sidelink BSR included for padding may also be prioritized over data from any logical channel, except data from UL-CCCH. Following, the prioritization approaches described in the embodiments described herein for UL LCP regarding prioritization of non-padding BSR versus non-padding sidelink BSR, the BSR prioritization versus sidelink transmission may be in accordance with the relative prioritization between the UL data contributing to the BSR and the sidelink data. Similarly, the sidelink BSR prioritization versus UL data transmission may be in accordance with the relative prioritization between the sidelink data contributing to the sidelink BSR and the UL data.

The non-padding V2X sidelink BSR may be prioritized over UL data, if the following conditions are met:
(1) if the MAC entity is not able to perform uplink transmissions and transmissions of V2X sidelink communication simultaneously at the time of the transmission; and
(2) if UL data is not prioritized by upper layer over sidelink data contribution to the sidelink BSR; and
(3) if the value of the highest priority of the sidelink logical channel(s) for the sidelink data contributing to the sidelink BSR is lower than the sidelink transmission prioritization threshold value (thresSL-TxPrioritization), if this value is configured.

Examples of alternatives to the third condition above may include the following:
(1) if the value of the highest priority of the sidelink logical channel(s) for the sidelink data contributing to the sidelink BSR is lower than the value of the highest priority of the logical channel(s) in the UL MAC PDU. While this criterion may be used for all sidelink transmission modes, this criterion may be specifically used for example in the case where the highest priority sidelink logical channel(s) for the sidelink data contributing to the sidelink BSR corresponds to unicast transmission.

(2) if the value of the highest priority of the sidelink logical channel(s) for the sidelink data contributing to the sidelink BSR is lower than the sidelink transmission prioritization threshold value (thresSL-TxPrioritization), if this value is configured, and the value of the highest priority of the sidelink logical channel(s) for the sidelink data contributing to the sidelink BSR is lower than the value of the highest priority of the logical channel(s) in the UL MAC PDU. The priority threshold parameter thresSL-TxPrioritization may be used to indicate the threshold used to determine whether SL V2X transmission is prioritized over an uplink transmission if they overlap in time. It may be pre-configured into the UE, or configured into the UE through RRC dedicated signaling RRC common signaling for example RRC broadcast signaling. While this criterion may be used for all sidelink transmission modes, this criterion may be specifically used for example in the case where the highest priority sidelink logical channel(s) for the sidelink data contributing to the sidelink BSR corresponds to groupcast or broadcast transmission.

(3) if the value of the highest priority of the sidelink logical channel(s) for the sidelink data contributing to the sidelink BSR is lower than the sidelink transmission prioritization threshold value (thresSL-TxPrioritization), if this value is configured, and the value of the highest priority of the logical channel(s) in the UL MAC PDU, is higher than the uplink transmission down-prioritization threshold value (thresUL-TxPriortization), if this value is configured. The priority threshold parameter thresUL-TxPrioritization may be used to indicate the threshold used to determine whether UL transmission is down prioritized over sidelink communication, if they overlap in time. It may be pre-configured into the UE, or configured into the UE through RRC dedicated signaling RRC common signaling for example RRC broadcast signaling. While this criterion may be used for all sidelink transmission modes, this criterion may be specifically used for example in the case where the highest priority sidelink logical channel(s) for the sidelink data contributing to the sidelink BSR corresponds to groupcast or broadcast transmission.

(4) if the value of the highest priority of the sidelink logical channel(s) for the sidelink data contributing to the sidelink BSR is lower than the sidelink transmission prioritization threshold value (thresSL-TxPrioritization), if this value is configured, and the value of the highest priority of the logical channel(s) in the UL MAC PDU, is higher than the uplink transmission down-prioritization threshold value (thresUL-TxPriortization), if this value is configured, and the value of the highest priority of the sidelink logical channel(s) for the sidelink data contributing to the sidelink BSR is lower than the value of the highest priority of the logical channel(s) in the UL MAC PDU. While this criterion may be used for all sidelink transmission modes, this criterion may be specifically used for example in the case where the highest priority sidelink logical channel(s) for the sidelink data contributing to the sidelink BSR corresponds to groupcast or broadcast transmission.

(5) if the value of the highest priority of the sidelink logical channel(s) for the sidelink data contributing to the sidelink BSR is lower than the sidelink transmission prioritization threshold value (thresSL-TxPrioritization), if this value is configured, wherein the parameter thresSL-TxPrioritization may be (pre)configured into the UE specific to each sidelink transmission destination, or specific to each transmission mode or specific to each sidelink transmission destination and transmission mode.

The V2X sidelink transmission may be prioritized over a non-padding BSR, if the following conditions are met:

(1) if the MAC entity is not able to perform uplink transmissions and transmissions of V2X sidelink communication simultaneously at the time of the transmission; and (2) if UL data contributing to the BSR is not prioritized by upper layer over sidelink data; and (3) if the value of the highest priority of the sidelink logical channel(s) in the sidelink MAC PDU is lower than the sidelink transmission prioritization threshold value (thresSL-TxPrioritization), if this value is configured. While this criterion may be used for all sidelink transmission modes, this criterion may be specifically used for example in the case of unicast transmission.

Examples of alternatives to the third condition may include the following:

(1) if the value of the highest priority of the sidelink logical channel(s) in the sidelink MAC PDU is lower than the value of the highest priority of the logical channel(s) for the UL data contributing to the BSR. While this criterion may be used for all sidelink transmission modes, this criterion may be specifically used for example in the case of unicast transmission.

(2) if the value of the highest priority of the sidelink logical channel(s) in the sidelink MAC PDU is lower than the sidelink transmission prioritization threshold value (thresSL-TxPrioritization), if this value is configured, and the value of the highest priority of the sidelink logical channel(s) in the sidelink MAC PDU is lower than the value of the highest priority of the logical channel(s) for the UL data contributing to the BSR. The priority threshold parameter thresSL-TxPrioritization may be used to indicate the threshold used to determine whether SL V2X transmission is prioritized over uplink transmission if they overlap in time. It may be pre-configured into the UE, or configured into the UE through RRC dedicated signaling RRC common signaling for example RRC broadcast signaling. While this criterion may be used for all sidelink transmission modes, this criterion may be specifically used for broadcast transmission or groupcast transmission.

(3) if the value of the highest priority of the sidelink logical channel(s) in the sidelink MAC PDU is lower than the sidelink transmission prioritization threshold value (thresSL-TxPrioritization), if this value is configured, and the value of the highest priority of the logical channel(s) for the UL data contributing to the BSR, is higher than the uplink transmission down-prioritization threshold value (thresUL-TxPriortization), if this value is configured. The priority threshold parameter thresUL-TxPrioritization may be used to indicate the threshold used to determine whether UL transmission is down prioritized over sidelink communication, if they overlap in time. It may be pre-configured into the UE, or configured into the UE through RRC dedicated signaling RRC common signaling for example RRC broadcast signaling. While this criteria may be used for all sidelink transmission modes, this criteria may be specifically used for broadcast transmission or groupcast transmission.

(4) if the value of the highest priority of the sidelink logical channel(s) in the sidelink MAC PDU is lower than the sidelink transmission prioritization threshold value (thresSL-TxPrioritization), if this value is configured, and the value of the highest priority of the logical channel(s) for the UL data contributing to the BSR, is higher than the uplink transmission down-prioritization threshold value (thresUL-TxPriortization), if this value is configured, and the value of the highest priority of the sidelink logical channel(s) in the sidelink MAC PDU is lower than the value of the highest priority of the logical channel(s) for the UL data contributing to the BSR. While this criterion may be used for all sidelink transmission modes, this criterion may be specifically used for broadcast transmission or groupcast transmission.

In the sidelink transmission versus uplink transmission prioritization solutions described herein, the parameter thresSL-TxPrioritization may be (pre) configured into the UE and may be specific to each sidelink transmission destination, or specific to each transmission mode or specific to each sidelink transmission destination and transmission mode. Such configuration signaling may be done using Uu RRC signaling, PC5-RRC signaling, or PC3-S signaling.

While priority as one of the QoS characteristics is used in the prioritization of sidelink transmission versus uplink transmission, any other QoS characteristic may be used instead of priority or in combination with priority. For example, in the prioritization methods described above, priority may be replaced by any other QoS metric such that the sidelink transmission is prioritized over UL transmission if the sidelink transmission QoS requires prioritization over UL transmission. Similarly, sidelink BSR such as non-padding sidelink BSR may be prioritized over UL transmissions, including UL BSR if the logical channel(s) of the data contributing to the sidelink BSR requires prioritization over UL transmission or UL BSR. Example of QoS characteristics that may be used in the prioritization methods described above, instead of priority may be latency, range, a combination of priority, latency, range or any other single metric that may be used to represent QoS such as PQI (PC5 QoS Identifier).

Examples of different overlapping grant scenarios are illustrated in FIG. 7, FIG. 8, FIG. 9, FIG. 10, and FIG. 11.

FIG. 7 illustrates a case where both the grants fully overlap, the earliest allowed transmission starting points are the same but the two grants have different durations. Similarly, FIG. 8, illustrates a case where both the grants fully overlap, the latest allowed transmission end points are the same but the two grants have different durations. FIG. 9 and FIG. 10 illustrate a case where the grants are of different durations, partially overlap where either the earliest allowed transmission starting point and the latest allowed transmission end point of each of the grants are different. FIG. 11 illustrates a case where the grants are of different durations, fully overlap where the earlier allowed transmission starting and the latest allowed transmission end point of each of the grant are different.

In LTE V2X, the first condition for sidelink communication prioritization over uplink transmission prioritization as discussed above is "if the MAC entity is not able to perform uplink transmissions and transmissions of V2X sidelink communication simultaneously at the time of the transmission". The statement "at the time of the transmission" may be confusing and is not clear enough in the context of overlapping grant. Therefore, the condition "if the MAC entity is not able to perform uplink transmissions and transmissions of V2X sidelink communication simultaneously at the time of the transmission" needs to be clarified, updated or enhanced in order to avoid ambiguous UE behavior. For example, considering a scenario where a transmission is underway on the uplink and then later a transmission is triggered on the sidelink, and accordingly to the existing LTE V2X transmission prioritization rule the sidelink transmission may be prioritized. In this scenario, it is not clear how to handle the ongoing uplink transmission (e.g. interrupting or discarding the uplink transmission may be performed). Therefore, the first condition of the three LTE V2X conditions for prioritizing V2X sidelink transmission over uplink transmission may be enhanced with one of the following conditions:

(1) if the MAC entity is not able to perform uplink transmissions and transmissions of V2X sidelink communication simultaneously at the time of the transmission. The prioritization may not force an uplink TB already submitted to the lower layer for transmission for this uplink transmission period, to be discarded. Example of scenarios where the prioritization rule of LTE V2X rule may have forced uplink transmission to be discarded where it is impractical or infeasible to do so may be scenario of a sidelink and uplink transmission overlap as illustrated in FIG. 8, FIG. 10, and FIG. 11.

Alternatively, a fourth condition for prioritizing V2X sidelink transmission over uplink transmission may be the following:

(1) The prioritization may not force an uplink TB already submitted to the lower layer for transmission for this uplink transmission period, to be discarded.

Regarding random access transmission, the sidelink transmission may be prioritized over random access e.g., over random access message 1 transmission if the priority of the sidelink transmission is higher than the event that triggers the random access. For example, if random access is triggered by UL data arrival during RRC CONNECTED when there are no PUCCH resources for SR available, and the UL data may be of lower priority than the sidelink transmission then the sidelink transmission should be prioritized over the random access.

Determination of the transmission parameters associated with a radio resource grant is described herein. One issue that needs to be addressed is how the MAC determines the transmission parameters associated with a resource grant whether it is scheduled grant or configured or autonomous grant.

Determination of allowed transmission mode(s) associated with a radio resource grant may comprise the following steps:

The UE MAC may determine the transmission mode(s) allowed for a radio resource grant based on one or more of the following:

The grant may include an indication of the allowed transmission mode(s) associated with the grant.

The PHY may indicate to the MAC the allowed transmission mode(s) associated with the grant.

sidelink radio resources (e.g., Physical sidelink Shared Channel resources) (pre) configured into the UE e.g., by RRC may include configurations of allowed transmission mode(s) associated with the resources. The sidelink radio resources (e.g., Physical sidelink Shared Channel resources) (pre) configured into the UE e.g., by RRC may be transmission mode specific. When a scheduled e.g. a dynamic grant or mode 1 grant is assigned to the UE, the MAC may determine the transmission mode of the grant based on allowed transmission mode(s) of the sidelink radio resources configured into the UE, to which the grant maps.

sidelink resource pool(s) (pre)configured into the UE e.g., by RRC, may include configurations of allowed transmission mode(s) associated with the resources. The sidelink radio resource pool(s) (pre) configured into the UE e.g., by RRC may be transmission mode specific. When an autonomous grant or mode 2 grant is selected by the UE, the MAC may determine the transmission mode of the grant based on allowed transmission mode(s) of the sidelink radio resource pool(s) configured into the UE, to which the grant maps.

Determination of allowed transmission range(s) associated with a radio resource grant may comprise the following steps:

The UE MAC may determine the transmission range(s) allowed for radio resource grant based one or more of the following:

The grant may include an indication of the allowed transmission range(s) associated with the grant.

The PHY may indicate to the MAC the allowed transmission range(s) associated with the grant.

sidelink radio resources (e.g., Physical sidelink Shared Channel resources) (pre) configured into the UE e.g., by RRC, may include configurations of allowed transmission range(s) associated with the resources. The sidelink radio resources (e.g., Physical sidelink Shared Channel resources) (pre) configured into the UE e.g., by RRC, may be transmission range specific. When a scheduled, e.g. a dynamic grant or mode 1, grant is assigned to the UE, the MAC may determine the transmission range of the grant based on allowed transmission range(s) of the sidelink radio resources configured into the UE, to which the grant maps.

sidelink resource pool(s) (pre)configured into the UE e.g., by RRC, may include configurations of allowed transmission range(s) associated with the resources. The sidelink radio resource pool(s) (pre) configured into the UE e.g., by RRC, may be transmission range specific. When an autonomous grant or mode 2 grant is selected by the UE, the MAC may determine the transmission range of the grant based on the allowed transmission mode(s) of the sidelink radio resource pool(s) configured into the UE, to which the grant maps.

The base station may figure out the transmission mode associated with a Buffer Status Report (BSR), based on the Logical channel (LCH) or Logical Channel Group (LCG) included or associated with the BSR, or a combination of LCG & destination or a combination of LCH and destination included or associated with the BSR.

Similarly, the base station may figure out the transmission range associated with a BSR, based on the LCH or LCG included or associated with the BSR, or a combination of LCG & destination or a combination of LCH and destination associated or included in the BSR.

Based on (pre)configuration information in the UE, the UE may associate the LCH or LCG with a transmission mode. Similarly, based on (pre)configuration information into the UE, the UE may associate LCH or LCG with transmission range.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 22A:
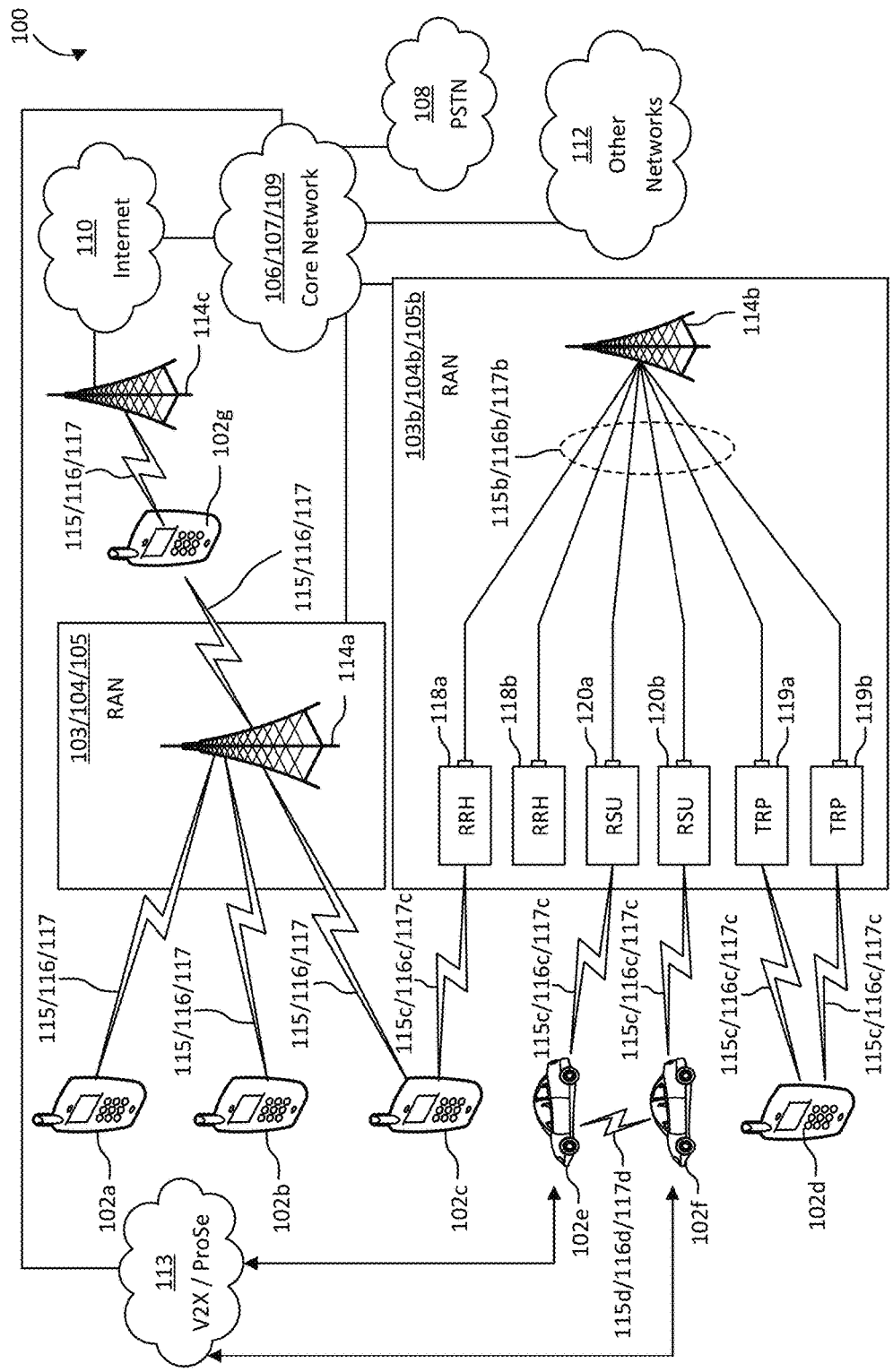
FIG. 22A illustrates one embodiment of an example communications system in which the methods and apparatuses described and claimed herein may be embodied.

FIG. 22A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 22A-22E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 22A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 22A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 22A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 22A may be configured to communicate with the base station 114a, which may employ a cellular-based radio technology, and with the base station 114c, which may employ an IEEE 802 radio technology.

Figure 22B:
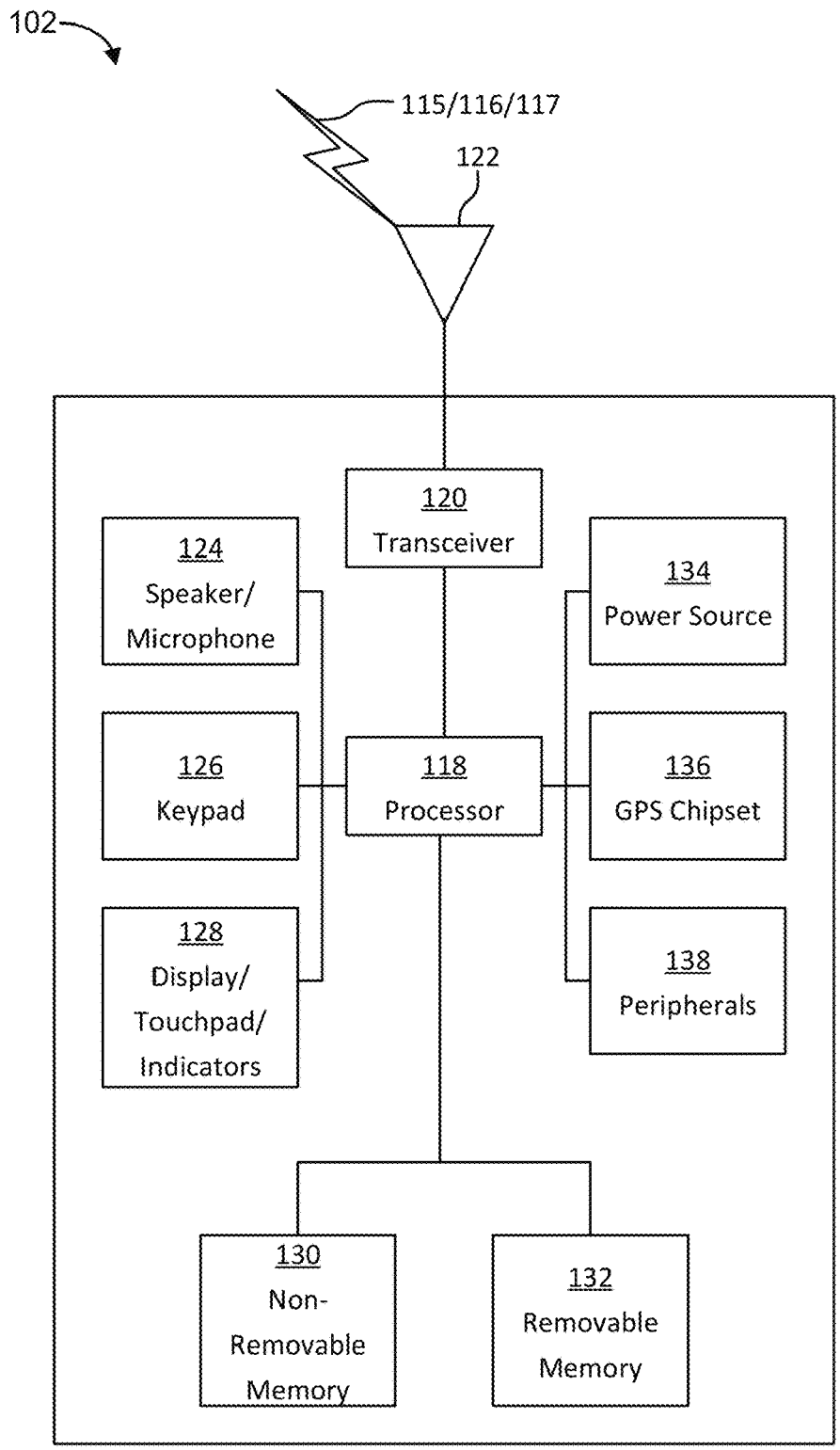
FIG. 22B is a block diagram of an example apparatus or device configured for wireless communications in accordance with the embodiments illustrated herein.

FIG. 22B is a block diagram of an example apparatus or device configured for wireless communications in accordance with the embodiments illustrated herein, such as for example, a WTRU 102. As shown in FIG. 22B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 22B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 22B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 22B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 22C:
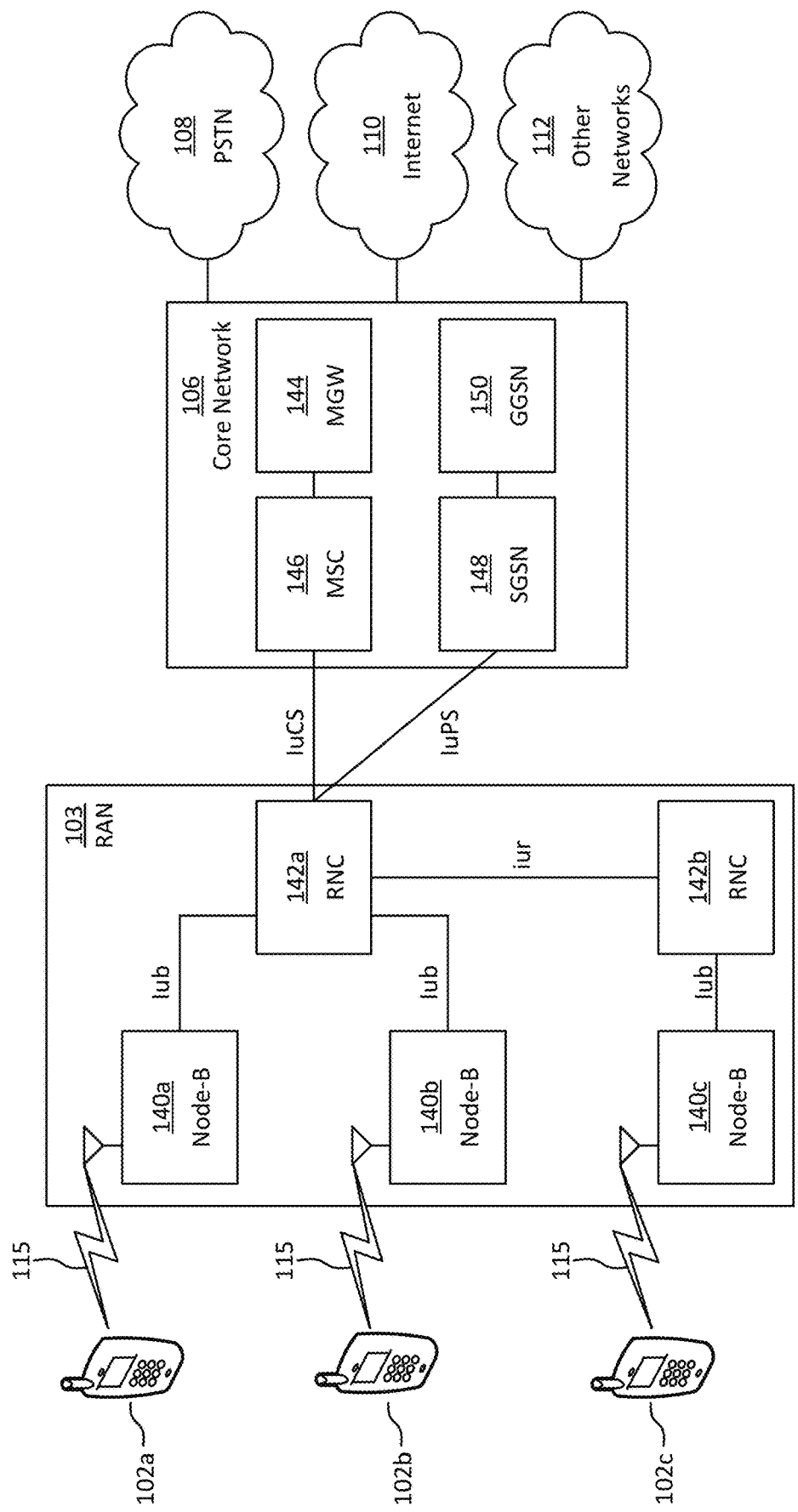
FIG. 22C is a system diagram of a RAN and core network according to an embodiment.

FIG. 22C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 22C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 22C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 22C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 22D:
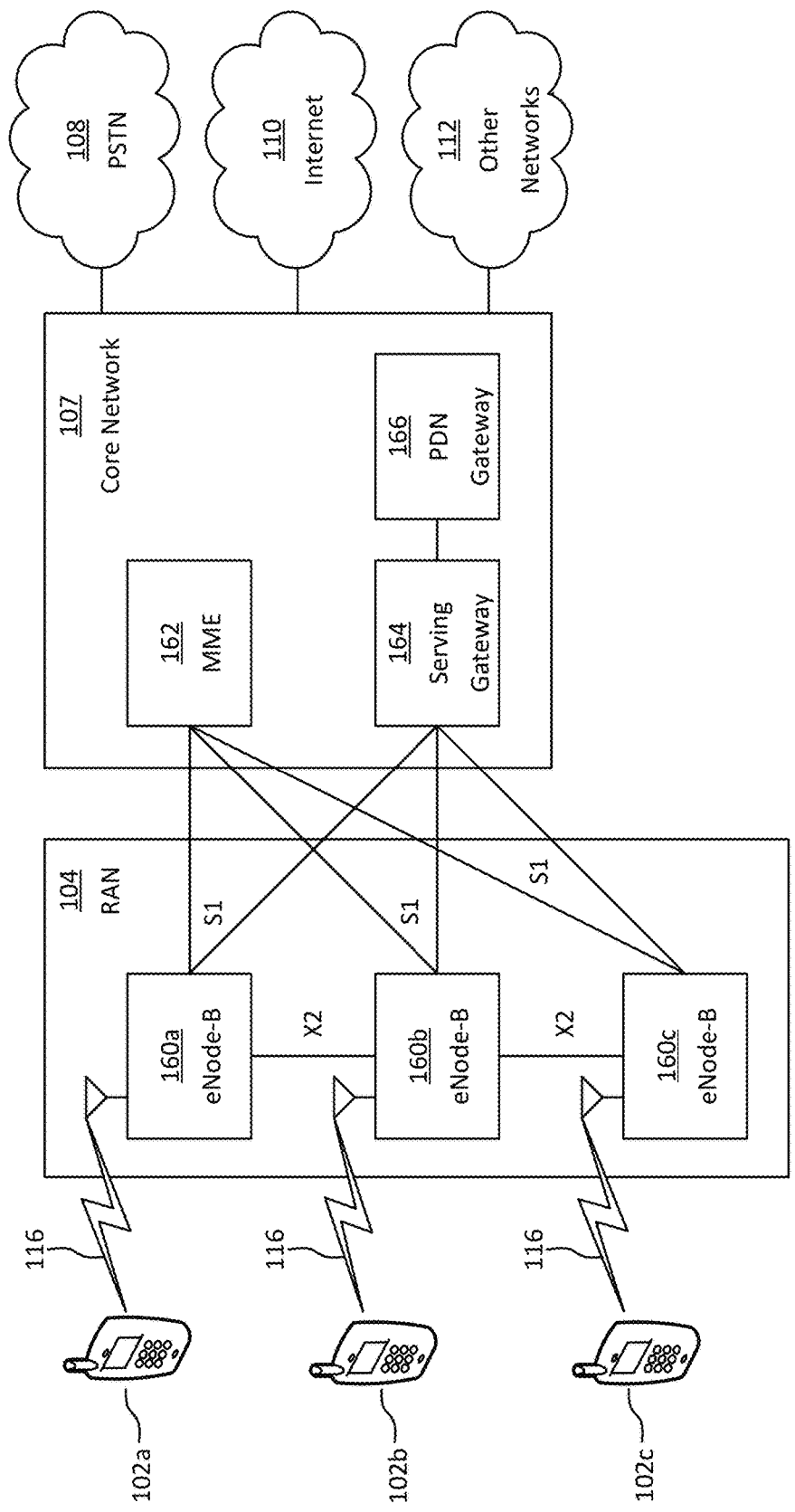
FIG. 22D is a system diagram of a RAN and core network according to an embodiment.

FIG. 22D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 22D, the eNode-Bs 160a, 160b, 160c may communicate with one another over an X2 interface.

The core network 107 shown in FIG. 22D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 22E:
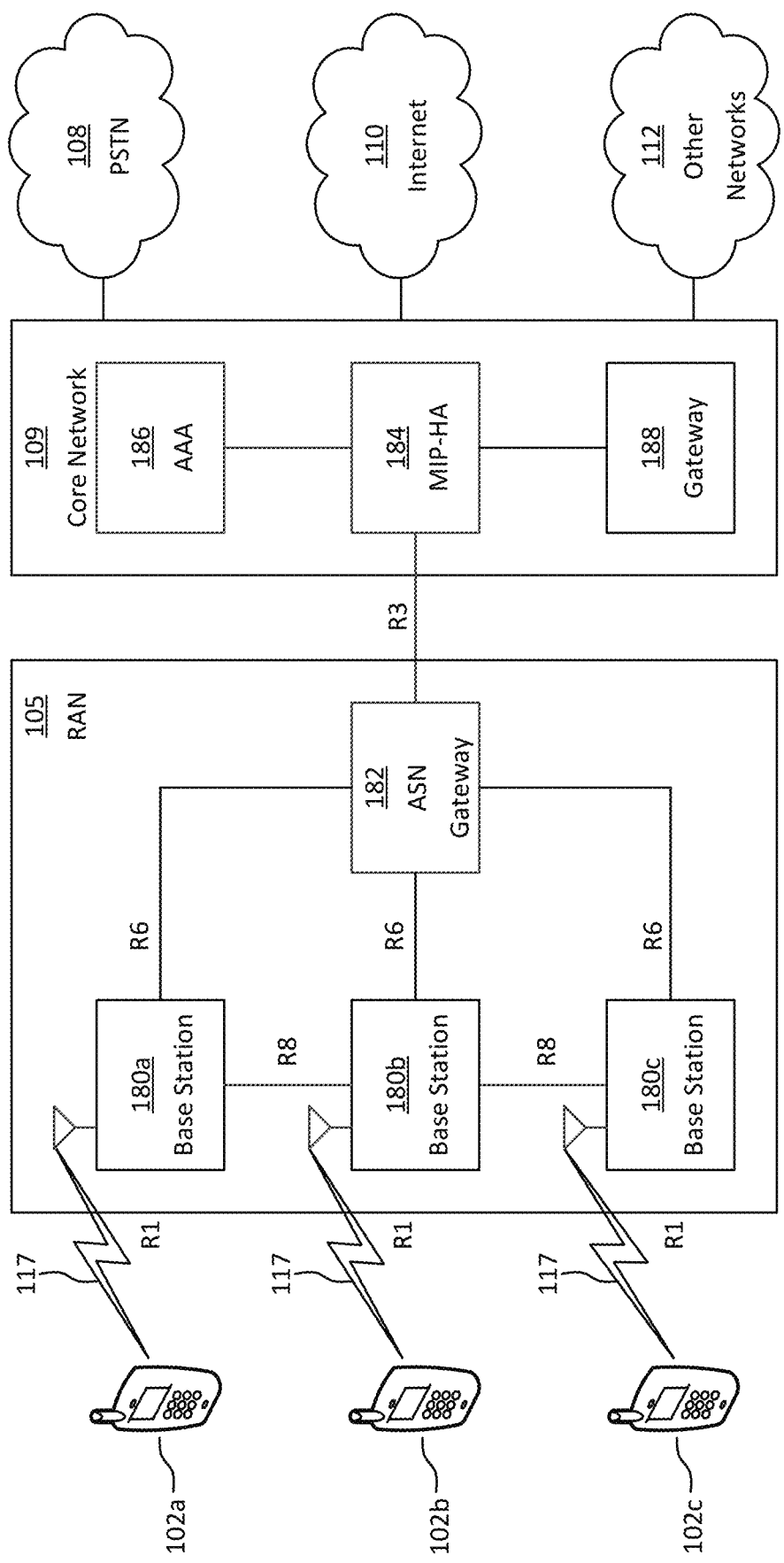
FIG. 22E is a system diagram of a RAN and core network according to an embodiment.

FIG. 22E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 22E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 22E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 22E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 22A, 22C, 22D, and 22E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 22A, 22B, 22C, 22D, and 22E are provided by way of example only, and it is understood that the subject matter disclosed and claimed herein may be embodied or implemented in any similar communication system, whether presently defined or defined in the future.

Figure 22F:
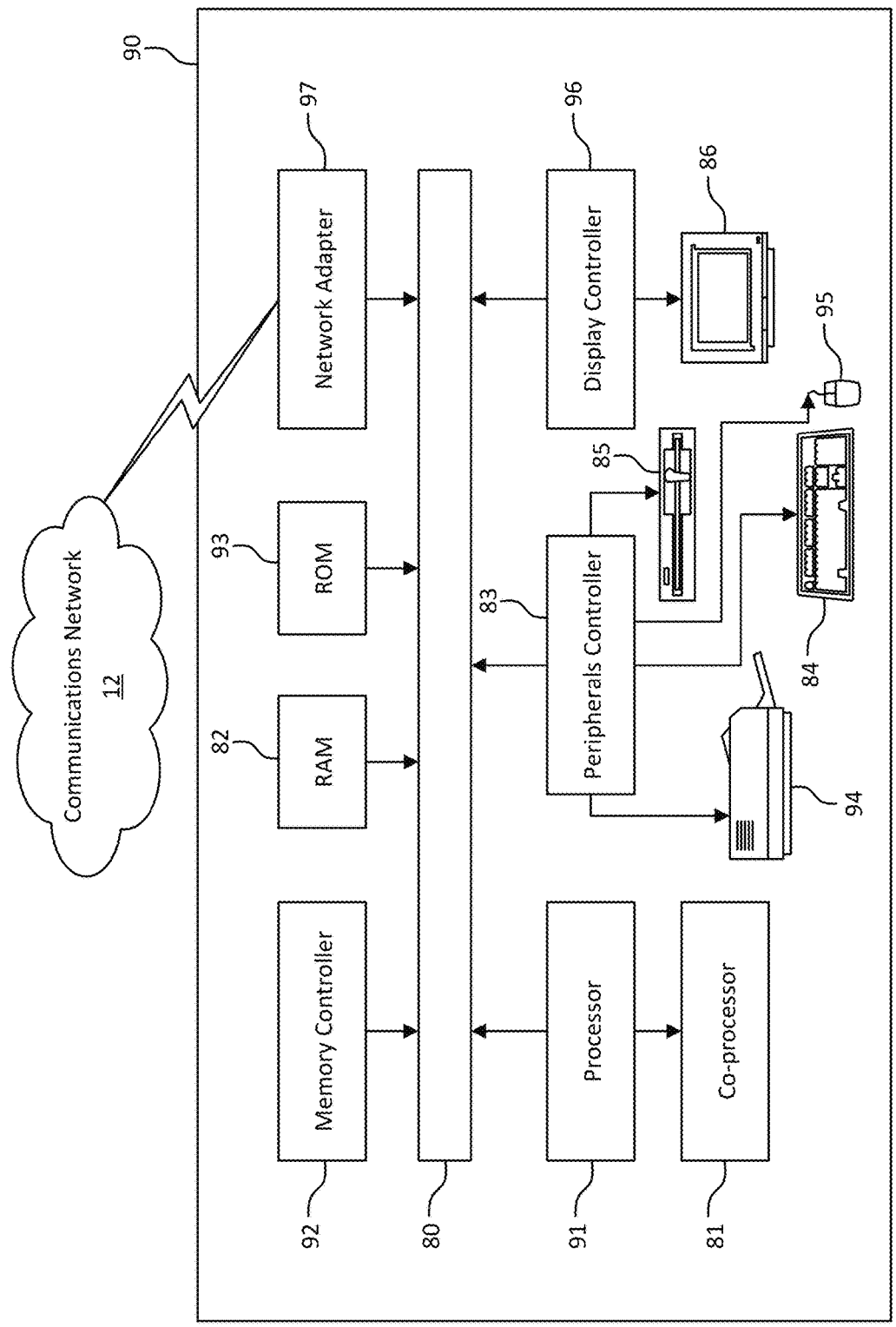
FIG. 22F is a block diagram of an exemplary computing system in which one or more apparatuses of the communications networks illustrated in FIGS. 22A, 22C, 22D and 22E may be embodied.

FIG. 22F is a block diagram of an exemplary computing system 90 in which one or more apparatuses of the communications networks illustrated in FIGS. 22A, 22C, 22D and 22E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 22A, 22B, 22C, 22D, and 22E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 22G:
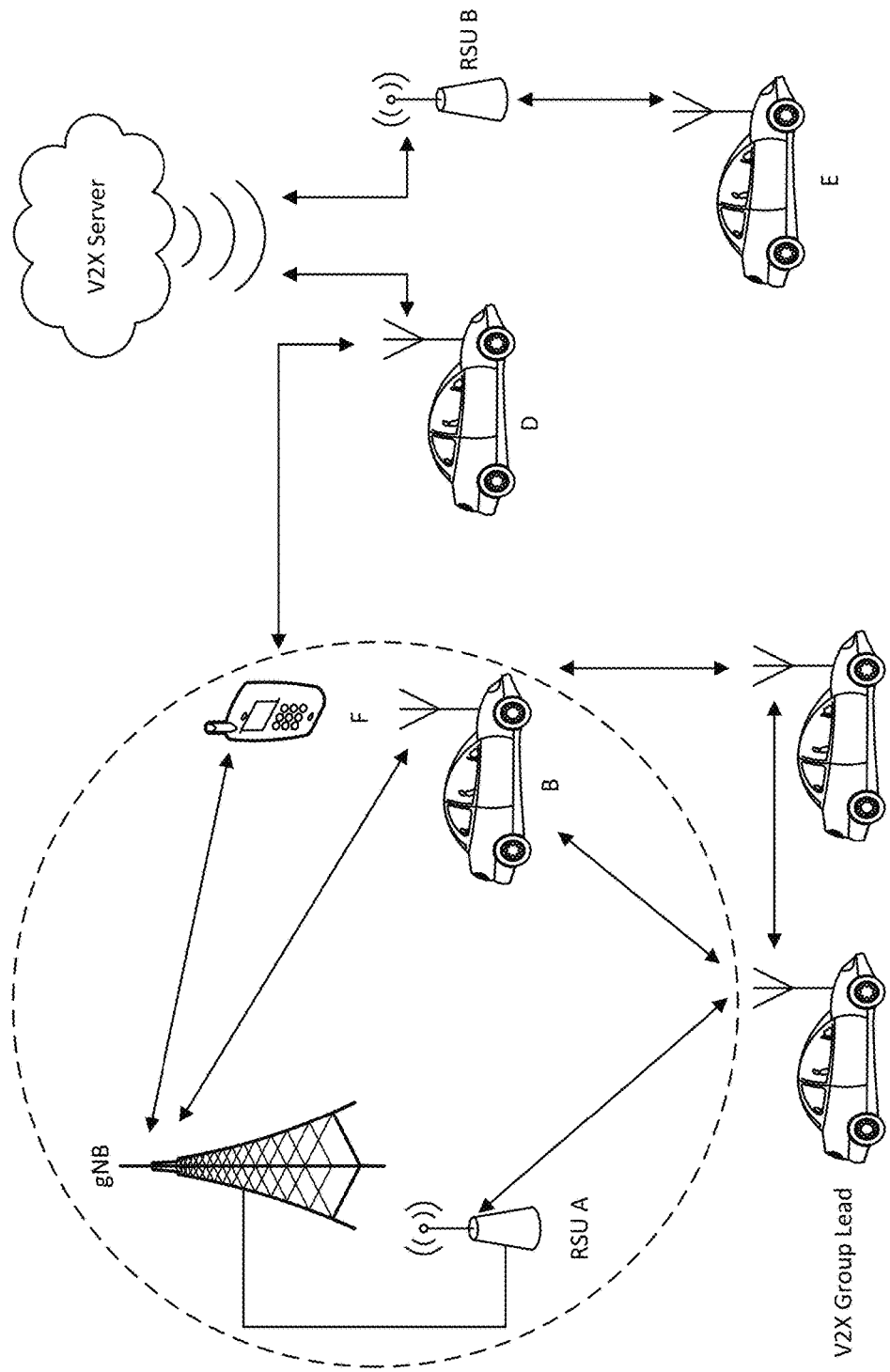
FIG. 22G illustrates one embodiment of an example communications system 111 in which the methods and apparatuses described and claimed herein may be embodied.

FIG. 22G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless/transmit receive unit (WTRU) comprising:
a receiver configured to receive, from a network node, one or more configuration parameters associated with sidelink communication, wherein the one or more configuration parameters comprise a logical channel configuration;
the receiver further configured to receive a sidelink resource grant;
one or more processors configured to:
select, based on the logical channel configuration, one or more sidelink logical channels to be served by the sidelink resource grant, and
generate a medium access control (MAC) protocol data unit (PDU) comprising data associated with the selected one or more sidelink logical channels; and
a transmitter configured to transmit the generated MAC PDU using the received sidelink resource grant.

2. The WTRU of claim 1,
wherein the transmitter is further configured to transmit, to the network node, one or more assistance parameters associated with sidelink communication, wherein the one or more assistance parameters comprise one or more quality of service (QoS) parameters;

wherein the receiving, from the network node, the one or more configuration parameters associated with sidelink communication is in response to the transmitted assistance information.

3. The WTRU of claim 1, wherein the network node comprises a gNB, a UE, a vehicle-to-x communication (V2X) Application Server, a Policy Control Function (PCF), a V2X Control Function, or a relay node.

4. The WTRU of claim 1, wherein the selecting the one or more sidelink logical channels is further based on:
a resource allocation mode of the sidelink resource grant being an allowed resource allocation mode of the selected one or more sidelink logical channels.

5. The WTRU of claim 1, wherein the one or more configuration parameters comprise at least one of: a sidelink logical channel (SL-LCH) priority, a SL-LCH prioritized bite rate, or a SL-LCH bucket size duration.

6. The WTRU of claim 1, wherein the selecting the one or more sidelink logical channels is further based on selecting one or more transmission destinations of a plurality of transmission destinations.

7. The WTRU of claim 1, wherein a transmission destination is selected based on having a highest priority among the selected one or more sidelink logical channels having data available for transmission.

8. The WTRU of claim 1,
wherein the receiver is further configured to receive an uplink resource grant; and
the one or more processors are further configured to:
determine that the uplink resource grant overlaps in time with the sidelink resource grant; and
determine, based on the determining that the uplink resource grant overlaps in time with the sidelink resource grant, a priority of a sidelink transmission relative to an uplink transmission.

9. The WTRU of claim 8, wherein the determining the priority of the sidelink transmission relative to the uplink transmission is based on an uplink prioritization threshold indicating that the uplink transmission can be down-prioritized and a sidelink prioritization threshold indicating whether the sidelink resource grant has a higher transmission priority.

10. The WTRU of claim 8, wherein the determining the priority of the sidelink transmission relative to the uplink transmission is based on an uplink prioritization threshold indicating that the uplink transmission can be down-prioritized and a sidelink prioritization threshold indicating that the sidelink transmission can be prioritized over the uplink transmission and the one or more processors are further configured to:
determine a priority of the sidelink transmission;
determine a priority of the uplink transmission; and
determine whether the priority of sidelink transmission or the priority of uplink transmission indicates a higher transmission priority.

11. The WTRU of claim 1,
wherein the receiver is further configured to receive an uplink resource grant;
the one or more processors are further configured to:
determine that a nonpadding uplink Buffer Status Report (BSR) overlaps in time with a nonpadding sidelink BSR;
determine that a nonpadding uplink BSR and a nonpadding sidelink BSR cannot be transmitted simultaneously; and
determine a priority of the nonpadding sidelink BSR relative to a priority of the nonpadding uplink BSR.

12. The WTRU of claim 11, wherein the determining the priority of the nonpadding sidelink BSR relative to the priority of the nonpadding uplink BSR is based on an uplink prioritization threshold indicating that the nonpadding uplink BSR can be down-prioritized and a sidelink prioritization threshold indicating that the nonpadding sidelink BSR can be prioritized over the nonpadding uplink BSR and the one or more processors are further configured to:
determine a priority of the nonpadding sidelink BSR;
determine a priority of the nonpadding uplink BSR; and
determine whether the priority of nonpadding sidelink BSR or the priority of nonpadding uplink BSR indicates a higher transmission priority.

13. The WTRU of claim 1,
wherein the receiver is further configured to receive first provisioned configuration parameters for sidelink communication;
wherein the one or more processors are further configured to:
start a validity timer for the first provisioned configuration parameters;
at the expiry of the validity timer, stop the use of the first provisioned configuration parameters; and
wherein the transmitter is further configured to send a request for second provisioned configuration parameters.

14. The WTRU of claim 13, wherein the provisioned configuration parameters are provided through a Management Object, with V2X configuration parameters for each V2X service, including: PBR, BSD, allowed RATS, allowed carrier frequencies, allowed Transmission Profiles, transmission mode, transmission range, and QoS parameters.

15. The WTRU of claim 1, wherein the one or more configuration parameters further comprise:
a mapping of a QoS flow to a sidelink radio bearer, and
a mapping of the sidelink radio bearer to a sidelink logical channel of a plurality of sidelink logical channels of the apparatus.

16. A method for use in a wireless/transmit receive unit (WTRU), the method comprising:
receiving, from a network node, one or more configuration parameters associated with sidelink communication, wherein the one or more configuration parameters comprise a logical channel configuration;
receiving a sidelink resource grant;
selecting, based on the logical channel configuration, one or more sidelink logical channels to be served by the sidelink resource grant;
generating a medium access control (MAC) protocol data unit (PDU) comprising data associated with the selected one or more sidelink logical channels; and
transmitting the generated MAC PDU using the received sidelink resource grant.

17. The method of claim 16, further comprising:
transmitting, to the network node, one or more assistance parameters associated with sidelink communication, wherein the one or more assistance parameters comprise one or more quality of service (QoS) parameters;
wherein the receiving, from the network node, the one or more configuration parameters associated with sidelink communication is in response to the transmitted assistance information.

18. The method of claim 16, wherein the selecting the one or more sidelink logical channels is further based on a resource allocation mode of the sidelink resource grant being an allowed resource allocation mode of the selected one or more sidelink logical channels.

19. The method of claim 16, wherein the one or more configuration parameters comprise at least one of: a sidelink logical channel (SL-LCH) priority, a SL-LCH prioritized bite rate, or a SL-LCH bucket size duration.

20. The method of claim 16, wherein the one or more configuration parameters further comprise a mapping of a QoS flow to a sidelink radio bearer and a mapping of the sidelink radio bearer to a sidelink logical channel of a plurality of sidelink logical channels of the apparatus.

* * * * *